(12) United States Patent
Wang et al.

(10) Patent No.: US 10,681,095 B1
(45) Date of Patent: Jun. 9, 2020

(54) DISTRIBUTED MESSAGING COMMUNICATION SYSTEM INTEGRATED WITH A CROSS-ENTITY COLLABORATION PLATFORM

(71) Applicant: Sure Market, LLC, San Marino, CA (US)

(72) Inventors: Luojia Wang, San Marino, CA (US); Douglas R. Heckmann, Pasadena, CA (US); Greg T. Roberts, Pasadena, CA (US)

(73) Assignee: Sure Market, LLC, San Marino, CA (US)

( * ) Notice: Subject to any disclaimer, the term of this patent is extended or adjusted under 35 U.S.C. 154(b) by 0 days.

(21) Appl. No.: 16/248,529

(22) Filed: Jan. 15, 2019

Related U.S. Application Data

(60) Provisional application No. 62/618,577, filed on Jan. 17, 2018.

(51) Int. Cl.
  *H04L 29/06* (2006.01)
  *H04L 12/46* (2006.01)
  *H04L 29/08* (2006.01)

(52) U.S. Cl.
  CPC ........ *H04L 65/403* (2013.01); *H04L 12/4633* (2013.01); *H04L 12/4641* (2013.01); *H04L 63/029* (2013.01); *H04L 63/0272* (2013.01); *H04L 63/0428* (2013.01); *H04L 67/06* (2013.01); *H04L 67/1097* (2013.01); *H04L 67/24* (2013.01)

(58) Field of Classification Search
  CPC ... H04L 65/403; H04L 67/24; H04L 63/0272; H04L 63/0428; H04L 63/029

USPC ......................................................... 709/204
See application file for complete search history.

(56) References Cited

U.S. PATENT DOCUMENTS 5,893,079 A    4/1999  Cwenar
7,499,972 B1 * 3/2009  Buonanno .............. G06Q 10/10
                                               379/221.12

(Continued)

FOREIGN PATENT DOCUMENTS

CN        202887252 U      4/2013
CN        106779917 A      5/2017

(Continued)

*Primary Examiner* — Hee Soo Kim
(74) *Attorney, Agent, or Firm* — Knobbe, Martens, Olson & Bear LLP

(57) ABSTRACT

A communication/collaboration system enables a first user at a first entity to define a collaboration object, and to invite a second entity to collaborate on the collaboration object in accordance with a hierarchy with corresponding permissions. A second user at a second entity is enabled to collaborate on the collaboration object. A communications log regarding the collaboration between the first user and the second user is maintained. A communications log between the first user and other users at the first entity is maintained. A communication interface is displayed on the first user computer system that displays the log of communications between the first user and the second user on the collaboration object, together with the log of communications regarding the collaboration object between the first user and other users at the first entity, and excluding communications regarding the collaboration object between the second user and other users at the second entity.

28 Claims, 84 Drawing Sheets

(56) References Cited

U.S. PATENT DOCUMENTS

| | | | |
|---|---|---|---|
| 7,970,686 B1 | 6/2011 | Irwin et al. | |
| 8,280,779 B2 | 10/2012 | Davis et al. | |
| 8,510,204 B2 | 8/2013 | Lord | |
| 8,738,720 B2* | 5/2014 | De Kezel | G06Q 10/107 |
| | | | 705/300 |
| 8,977,754 B2 | 3/2015 | Curry, Jr. et al. | |
| 9,595,056 B2 | 3/2017 | Taylor et al. | |
| 2001/0049634 A1 | 12/2001 | Stewart | |
| 2002/0156719 A1 | 10/2002 | Finebaum et al. | |
| 2007/0233786 A1* | 10/2007 | Rothley | G06Q 10/06 |
| | | | 709/204 |
| 2011/0153759 A1* | 6/2011 | Rathod | G06Q 10/00 |
| | | | 709/206 |
| 2011/0179114 A1* | 7/2011 | Dilip | G06Q 30/02 |
| | | | 709/204 |
| 2012/0109774 A1* | 5/2012 | Chernenko | G06Q 30/0611 |
| | | | 705/26.4 |
| 2012/0316962 A1* | 12/2012 | Rathod | G06Q 10/107 |
| | | | 705/14.54 |
| 2013/0227007 A1* | 8/2013 | Savage | G06Q 10/101 |
| | | | 709/204 |
| 2013/0332861 A1* | 12/2013 | D'Agnese | G06Q 10/103 |
| | | | 715/753 |
| 2014/0250186 A1* | 9/2014 | Huynh | H04L 65/403 |
| | | | 709/204 |
| 2014/0278764 A1 | 9/2014 | Noyes | |
| 2015/0324877 A1 | 11/2015 | Shaw et al. | |

FOREIGN PATENT DOCUMENTS

| | | |
|---|---|---|
| CN | 206162692 U | 5/2017 |
| KR | 1020130106054 A | 9/2013 |

* cited by examiner

| Access to 1 | Access to 2 | Access to 3 | Access to 4 | Access to 5 | Access to 6 | Access to 7 | Access to 8 | Access to 9 | Access to 10 | Access to 11 |
|---|---|---|---|---|---|---|---|---|---|---|
| Ryan | Ryan | Ryan | Ryan | Ryan | Ashley | Shawn | Alex | Brittany | Luke | Ryan |
|  | Claire | Claire | Claire | Claire | Brittany | Brittany | Brittany | Luke |  | Claire |
|  |  | Jenny | Katy | Jenny | Luke | Luke | Luke |  |  | Katy |
|  |  |  |  | Ashley |  |  |  |  |  | Alex |
|  |  |  |  | Brittany |  |  |  |  |  | Brittany |
|  |  |  |  | Luke |  |  |  |  |  | Luke |

FIG. 1E

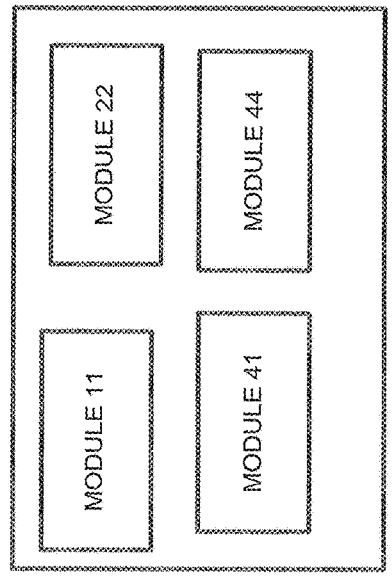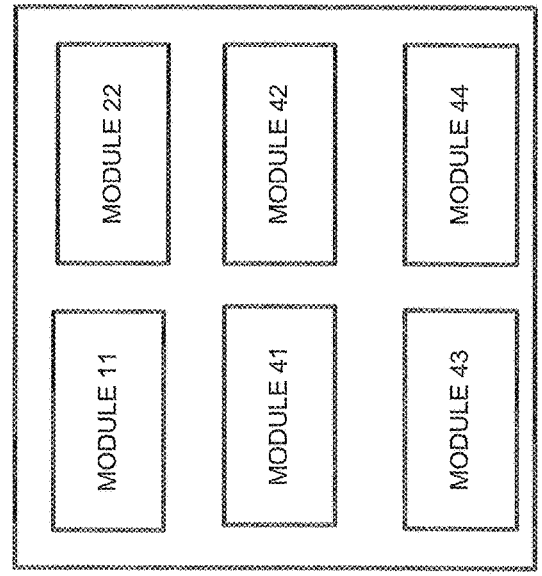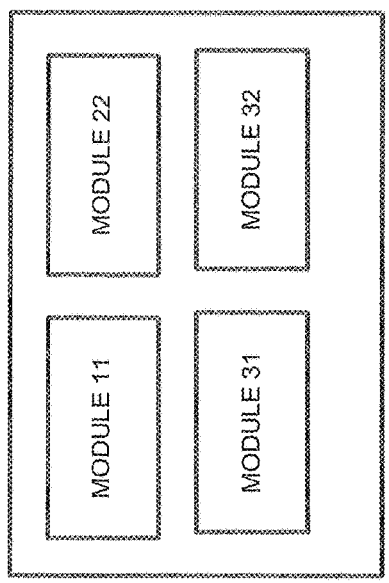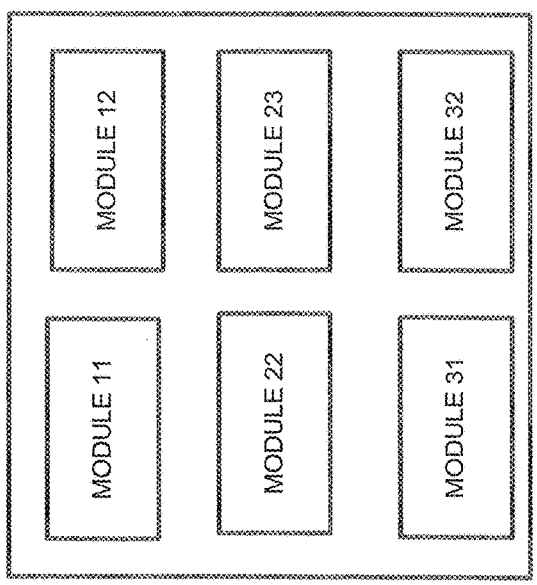
FIG. 1M

Fig. 3A1

Fig. 3A2

| Product | | Category | Size (L × W × H) | Cases / Cube | FOB | List Price | Date | Status |
|---|---|---|---|---|---|---|---|---|
| LH55321 Single Square Collapsible Structured Fabric Hamper with Magnetic Top Lid, and Front... | | Furniture | 15.00" × 15.00" × 26.00" | 6 / 1.82 ft³ | Qingdao | 12.76 | Modified 01/12/18 Created 01/12/18 | |
| LH55732 Single Rectangular Foldable Fabric Laundry Hamper with Rope Handles, Round Metal... | | Furniture | 18.00" × 14.00" × 20.00" | 6 / 1.89 ft³ | Qingdao | 5.82 | Modified 01/12/18 Created 01/12/18 | |
| LH55731 Single Rectangular Foldable Fabric Laundry Hamper with Rope Handles, Round Metal... | | Furniture | 18.00" × 14.00" × 20.00" | 6 / 1.89 ft³ | Qingdao | 5.82 | Modified 01/12/18 Created 01/12/18 | |
| LH55722 Single Round Foldable Fabric Laundry Hamper with Rope Handles, Round Metal grommets an... | | Furniture | 18.00" × 18.00" × 20.00" | 6 / 1.89 ft³ | Qingdao | 5.82 | Modified 01/12/18 Created 01/12/18 | |
| LH55721 Single Round Foldable Fabric Laundry Hamper with Rope Handles, Round Metal grommets an... | | Furniture | 18.00" × 18.00" × 20.00" | 6 / 1.89 ft³ | Qingdao | 5.82 | Modified 01/12/18 Created 01/12/18 | |
| LH55841 Single Oval Fabric Laundry Bag with Magnetic Circle Handles Gray Fabric | | Furniture | 21.00" × 11.00" × 25.00" | 6 / 2.21 ft³ | Qingdao | 8.51 | Modified 01/12/18 Created 01/12/18 | |
| LH55823 Single Round Fabric Bag with 2 Back Straps, Exterior Zippered Pocket and Adjustable String... | | Furniture | 15.50" × 15.50" × 27.50" | 6 / 0.86 ft³ | Qingdao | 6.17 | Modified 01/12/18 Created 01/12/18 | |
| LH55812 Single Round Fabric Canvas Bag with Webbing Fabric handles and Adjustible Strings Washed... | | Furniture | 15.50" × 15.50" × 27.50" | 6 / 0.86 ft³ | Qingdao | 6.16 | Modified 01/12/18 Created 01/12/18 | |
| LH55811 Single Round Fabric Canvas Bag with Webbing Fabric handles and Adjustible Strings Washed... | | Furniture | 15.50" × 15.50" × 27.50" | 6 / 0.86 ft³ | Qingdao | 6.16 | Modified 01/12/18 Created 01/12/18 | |

Fig. 3C1

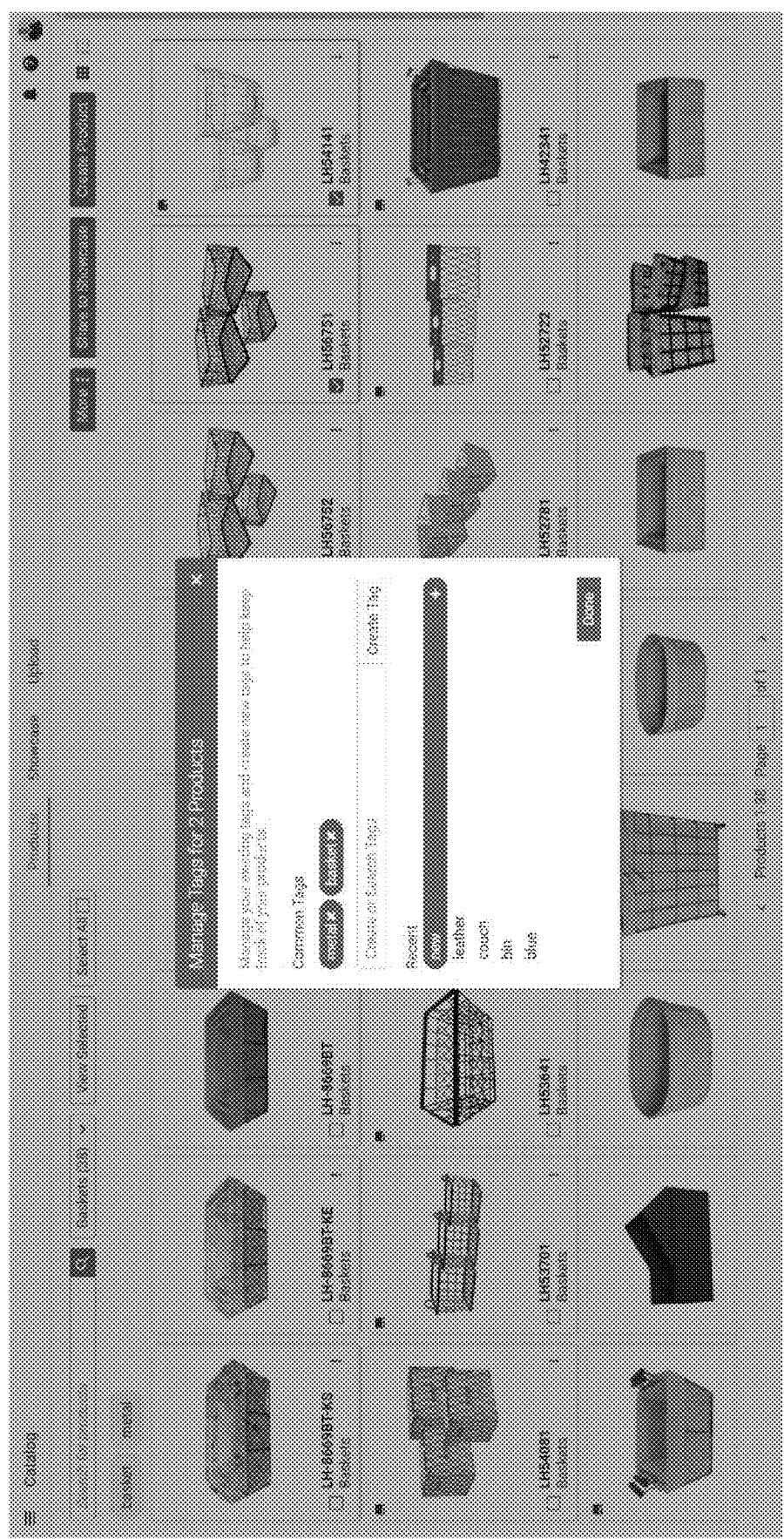
Fig. 3C2

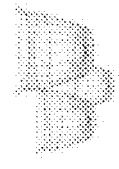
Fig. 3C3

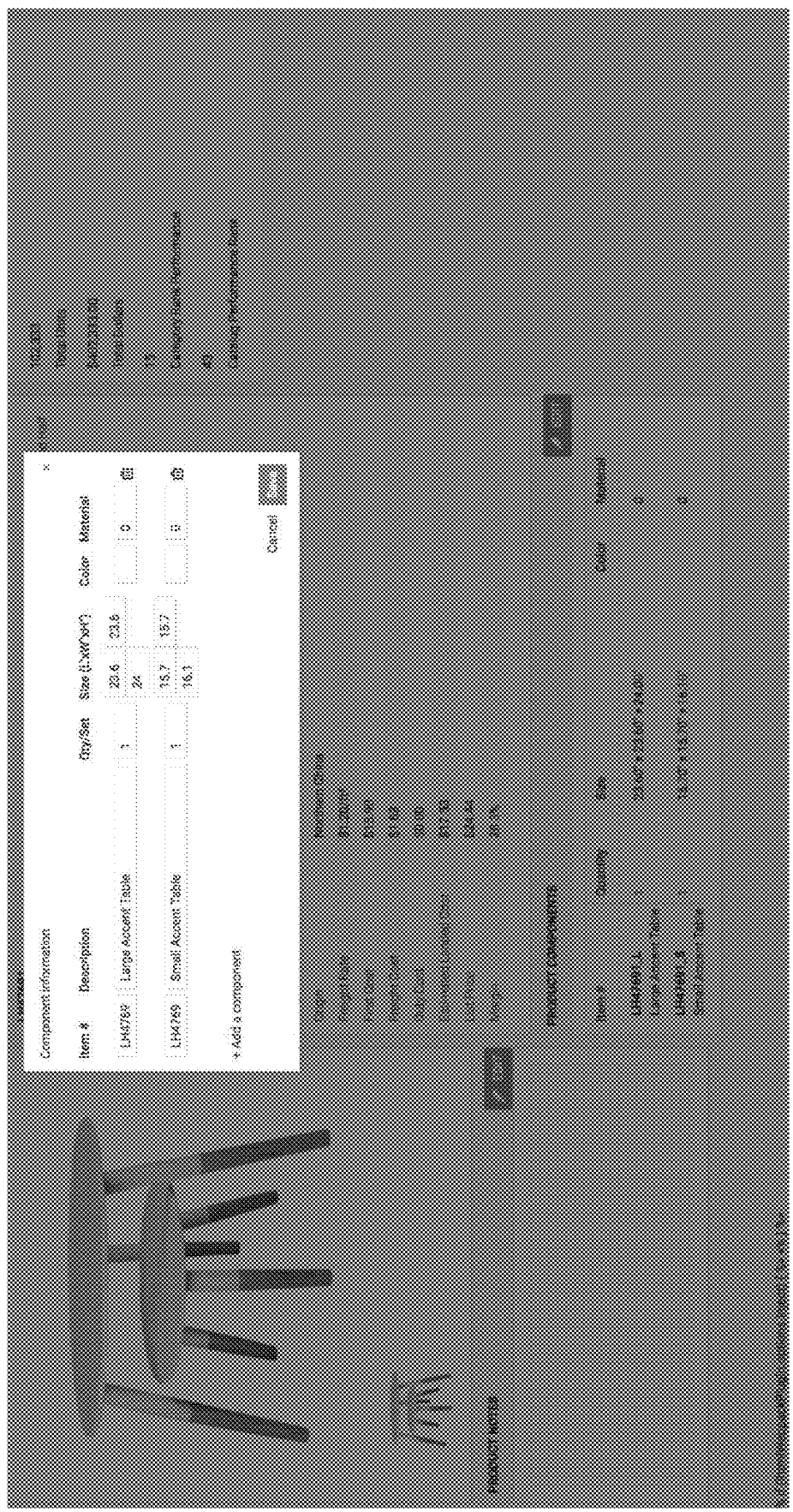
Fig. 3F1

Catalog > Baskets > LH58373

Product Details | Sales History

| Customer | Order | Program | Exp Receipt | Ship Date | FOB Point | Unit Price | Est Landed Cost | Margin | Quantity | Amount |
|---|---|---|---|---|---|---|---|---|---|---|
| Acme Retail > Storage | 14660 | Back To School 2018 | 10/01/18 | 12/31/18 | 0 | $20.9800 | $22.09 | -5.24% | 1,000 | $20,980.00 |

| Product | Origin | Case Pack | Cases | Cube | Unit Price | Quantity | Total Cube | Amount |
|---|---|---|---|---|---|---|---|---|
| LH55871 Single Rectangular Patio... | | 6 | 33 | 4.06 | $9.39 | 200 | 135.33 | $1,278.00 |
| LH55851 Single Tapered Round C... | | 6 | 33 | 5.57 | $6.45 | 200 | 185.67 | $1,290.00 |
| LH55741 Single Tapered Round ... | | 6 | 33 | 7.33 | $7.38 | 200 | 244.33 | $1,476.00 |
| LH47691 2 PC KD Round MDF &... | | 1 | 100 | 1.36 | $23.50 | 100 | 136.00 | $2,350.00 |
| LH47691_L Large Accent Table | | 1 | 100 | | | 100 | | |
| LH47691_S Small Accent Table | | 1 | 100 | | | 100 | | |
| LH55742 Single Tapered Round ... | | 6 | 17 | 6.23 | $6.85 | 100 | 103.83 | $685.00 |
| LH55872 Single Rectangular Patio... | | 6 | 33 | 4.06 | $6.50 | 200 | 135.33 | $1,300.00 |
| LH47701 2 PC KD Teardrop MDF ... | | 1 | 100 | 1.47 | $31.61 | 100 | 147.06 | $3,161.00 |
| LH47701_L Large Accent Table | | | | | | 100 | | |
| LH47701_S | | | | | | 100 | | |

Fig. 4R2

Acme Retail / Storage

Acme Spring Offer (Draft) — JA Home

OFFER SUMMARY

| Program | Offer Type | Ship Point | Load Location | | | | | |
|---|---|---|---|---|---|---|---|---|
| Back To School 2018 | Domestic Collect | Los Angeles | 02/27/19 | | | | | |

| | | | | | | Cube | Amount |
|---|---|---|---|---|---|---|---|
| | | | | | | 222.40 ft³ | $2,623.40 |

OFFER PRODUCTS

| Product | Origin | Case Pack | Cases | Cube | Unit Cost | Freight Rate | Freight | Duty | Landed Cost | Unit Price | Margin | Quantity | Total Cube | Amount |
|---|---|---|---|---|---|---|---|---|---|---|---|---|---|---|
| LH55892 Single Rectangular Fabric... | Northern China | 6 | 10 | 2.92 | $4.00 | /ft³ | $0.59 | $0.00 | $4.58 | $6.63 | 30 % | 60 | 29.20 | $397.80 |
| LH47691 2 PC K/D Round MDF & Pin... | Northern China | 1 | 10 | 7.36 | $15.90 | /ft³ | $1.93 | $0.00 | $17.83 | $24.54 | 28 % | 10 | 73.60 | $244.40 |
| LH47691.L Large Accent Table | | | | | | | | | | | | 10 | | |
| LH47691.S Small Accent Table | | | | | | | | | | | | 10 | | |
| LH55901 Single Rectangular Tapered... | Northern China | 6 | 10 | 3.88 | $3.18 | /ft³ | $0.78 | $0.00 | $3.96 | $4.69 | 15 % | 60 | 38.80 | $281.40 |
| LH58872 Single Rectangular Fabric... | Northern China | 6 | 10 | 4.08 | $4.20 | /ft³ | $0.81 | $0.00 | $5.01 | $6.50 | 22 % | 60 | 40.80 | $390.00 |
| LH55741 Single Tapered Round Met... | Northern China | 6 | 10 | 7.33 | $4.89 | /ft³ | $1.47 | $0.00 | $6.36 | $7.38 | 13 % | 60 | 73.30 | $442.80 |
| LH55331 Single Square Collapsible... | Northern China | 6 | 10 | 2.69 | $9.25 | /ft³ | $0.54 | $0.00 | $9.79 | $14.35 | 32 % | 60 | 26.90 | $867.00 |

DISTRIBUTED MESSAGING COMMUNICATION SYSTEM INTEGRATED WITH A CROSS-ENTITY COLLABORATION PLATFORM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Communications associated with various types of networked transactions have become essential in many industries. However, with the enormous flow of such communications, it has become increasingly challenging to manage and intelligently present such communications. The failure of conventional systems to adequately manage and present related communications has hindered users from collaborating in an efficient, error-free manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to enabling a first entity to establish a hierarchy of permissions with respect to transactions with other entities and to maintaining a record of communications between such entities organized by object. The hierarchy of permissions may control which users of the first entity may communicate regarding an object with users of the second entity. The hierarchy of permissions may control what object-related data users of the first entity may access and what object-related data users of the second entity may access.

An aspect of the present disclosure relates to a communication/collaboration system enables a first user at a first entity to define a collaboration object (e.g., a document, transaction, program, etc.), and to invite a second entity to collaborate on the collaboration object in accordance with a hierarchy with corresponding permissions. A second user at a second entity is enabled to collaborate on the collaboration object. A communications log regarding the collaboration between the first user and the second user is maintained. A communications log between the first user and other users at the first entity is maintained. A communication interface is displayed on the first user computer system (e.g., a desktop, laptop, smart, smart television, smart wearable, etc.) that displays the log of communications between the first user and the second user on the collaboration object, together with the log of communications regarding the collaboration object between the first user and other users at the first entity, and excluding communications regarding the collaboration object between the second user and other users at the second entity.

An aspect of the present disclosure relates to a communication and collaboration system comprising: one or more processing devices; a network interface; non-transitory memory that stores instructions that when executed by the one or more processing devices are configured to cause the communication and collaboration system to perform operations comprising: enable a first entity to establish a first hierarchy of permissions comprising communication permissions with respect to users of the first entity; enable a second entity to establish a second hierarchy with corresponding permissions comprising communication permissions with respect to users of the second entity; detect a first user of the first entity accessing the communication and collaboration system, the first user at a first position in the first hierarchy; enable the first user to define a first collaboration object; access the first hierarchy with corresponding permissions; enable the first user to invite a second entity to collaborate on the first collaboration object in accordance with the first hierarchy with corresponding permissions; in response to receiving over a network via the network interface from a first computer system of the first user an invite instruction for the second entity, the invite instructions regarding collaboration on the first collaboration object, transmit the invitation to collaborate on the first collaboration object to the second entity, the second entity associated with a second user; receive from a second computer system of the second user an acceptance of the invitation to collaborate on the first collaboration object; access the second hierarchy with corresponding permissions the second user at a first position in the second hierarchy; enable the second user to collaborate on the first collaboration object in accordance with the second hierarchy with corresponding permissions; generate a log of communications regarding the collaboration between the first user and the second user on the first collaboration object; generate a log of communications regarding the first collaboration object between the first user and one or more other users at the first entity; generate a log of communications regarding the first collaboration object between the second user and one or more other users at the second entity; provide for display on the first computer system of the first user the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and provide for display on the second computer system of the second user the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the present disclosure relates to a communication system: one or more processing devices; a network interface; non-transitory memory that stores instructions that when executed by the one or more processing devices are configured to cause the communication system to perform operations comprising: detect a first user of a first entity accessing the communication system; access permissions associated with the first user; enable the first user to define a first collaboration object; enable the first user to invite a second entity to collaborate on the first collaboration object in accordance with the permissions associated with the first user; in response to receiving over a network via the network interface from a computer system of the first user an invite instruction for the second entity, the invite instructions regarding collaboration on the first collaboration object, transmit the invitation to collaborate on the first collaboration object to the second entity, the second entity associated with a second user; enable the second user to collaborate on the first collaboration object in accordance permissions associated with the second user; maintain a log of communications regarding the collaboration between the first user and the second user on the first collaboration object; maintain a log of communications regarding the first collaboration object between the first user and one or more other users at the first entity; maintain a log of communications regarding the first collaboration object between the second user and one or more other users at the second entity; enable the first computer system of the first user to display the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and enable the second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

An aspect of the present disclosure relates to a computer-implemented method, the method comprising: accessing permissions associated with a first user; enabling the first user to define a first collaboration object; enabling the first user to invite a second entity to collaborate on the first collaboration object in accordance with the permissions associated with the first user; in response to receiving over a network via the network interface from a computer system of the first user an invite instruction for the second entity, the invite instructions regarding collaboration on the first collaboration object, causing the invitation to collaborate on the first collaboration object to be transmitted to the second entity, the second entity associated with a second user; enabling the second user to collaborate on the first collaboration object with the first user; maintaining a log of communications regarding the collaboration between the first user and the second user on the first collaboration object; maintaining a log of communications regarding the first collaboration object between the first user and one or more other users at the first entity; enabling the first computer system of the first user to display the log of communications regarding the collaboration between the first user and the second user on the first collaboration object, together with the log of communications regarding the first collaboration object between the first user and one or more other users at the first entity; and enabling the second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

BRIEF DESCRIPTION OF THE DRAWINGS

FIGS. 1D and 1E illustrate example communication/transaction threads and permissions.

FIG. 1M illustrates example user interfaces rendered based on a virtual page.

FIGS. 2A-2L illustrate example user interfaces.

FIGS. 3A1-3L illustrate additional example user interfaces.

FIGS. 4A1-4M illustrate additional example user interfaces.

FIGS. 4O-4V illustrate additional example user interfaces.

FIGS. 6A-6F illustrates additional example user interfaces.

DETAILED DESCRIPTION

Figure 1A:
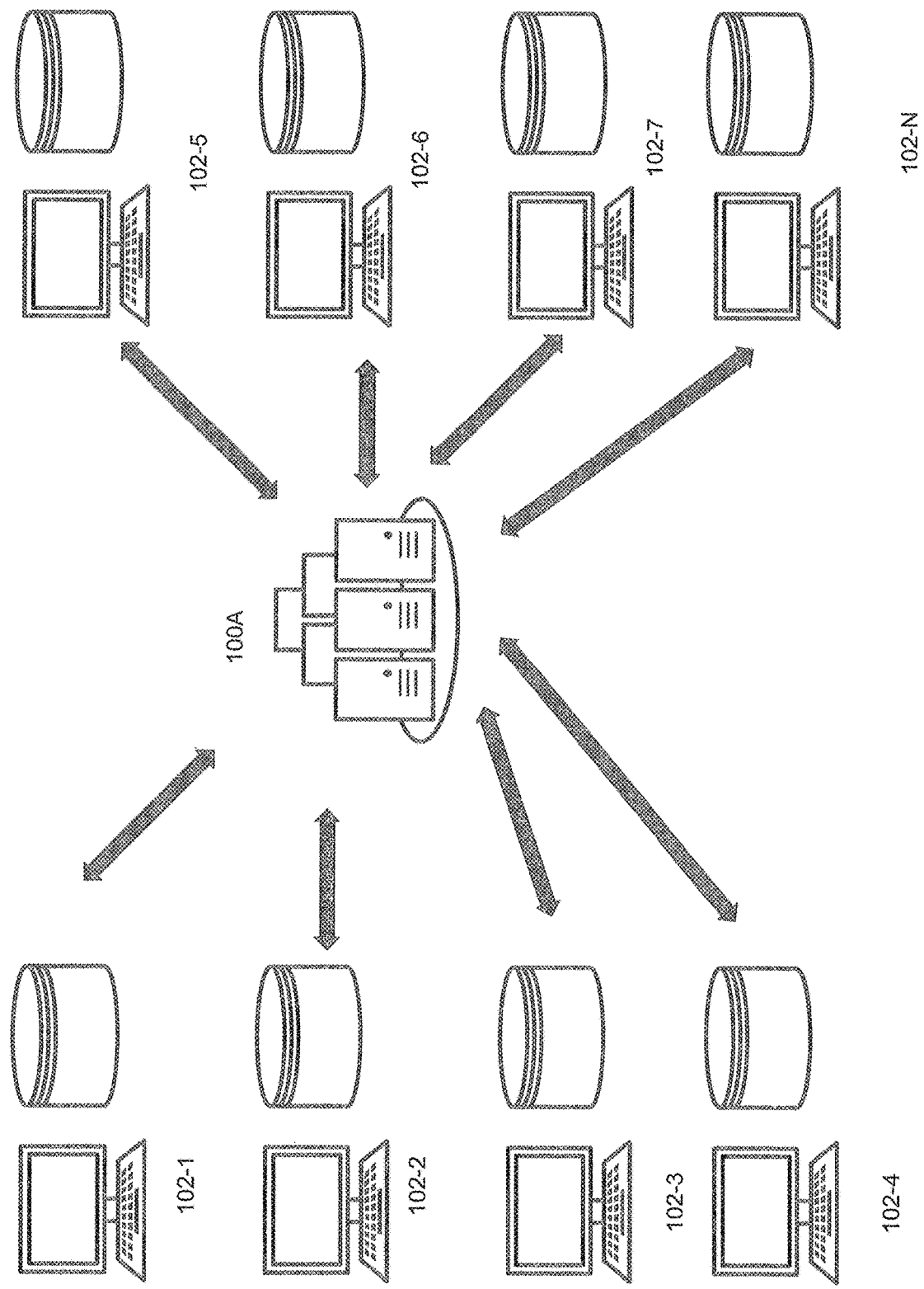
FIG. 1A illustrates an example distributed communication and collaboration architecture.
Figure 1B:
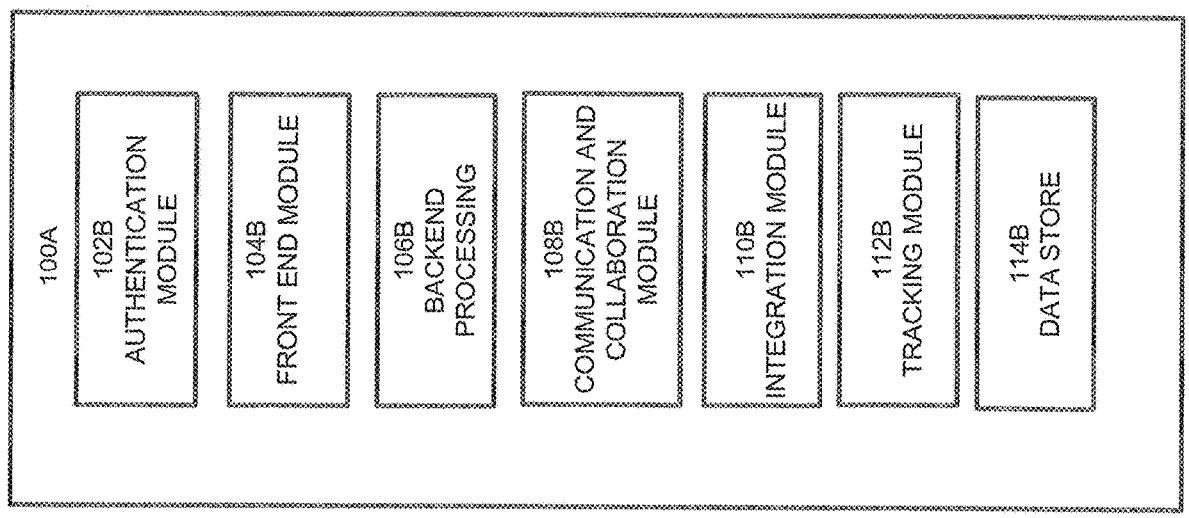
FIG. 1B illustrates an example architecture of a communication/collaboration system.

Methods and systems are described for secure communication over a network among multiple systems enabling secure inter-entity and intra-entity collaboration over the network.

As will be described, technologies are provided that enable threaded communication to be associated with an object and that enable such threaded communications to be selectively provided to users in accordance with respective permissions, in a display-efficient and organized manner. Such display of communications may reduce errors with respect to conducting shared transactions related to such object.

By way of illustration, systems may be associated with respective entities. For example, the systems may include a first set of systems associated with an entity, such as an acquirer of products (e.g., a retailer). The systems may include a second set of systems associated with another entity, such as a product provider (e.g., a manufacturer, distributor, etc.). It is understood that an entity may be both an acquirer of products and a provider of products. The systems may include a third set of systems associated with a communications/collaboration service provider.

The transmitted data may be secured by establishing a virtual private network (VPN) which establishes an encrypted transmission path between the communication/collaboration service provider system and that of the first set of systems and the second set of systems. The systems may communicate with each other using Secure Sockets Layer (SSL), a secure transfer tunnel, which may be used to encrypt data in transit between the systems. Optionally, some or all of the communicated information may be stored using file encryption. Optionally, respective encryption keys may be stored physically separate from the data being encrypted (e.g., on different physical servers) to provide added security.

Optionally, the communication/collaboration system may comprise a secure, cloud based system of co-located and/or geographically distributed server systems.

As discussed in greater detail herein, the communication/collaboration system may enable sensitive data to be siloed, so that only authorized users may access the sensitive data while still enabling users at different entities with different levels of authorization to collaborate. A hierarchy of users or user types may be defined, where those lower on the hierarchy have relatively less access to sensitive data than those higher on the hierarchy. In addition, the hierarchy of users or user types may be defined to indicate which users or types of users may edit which types of data.

The disclosed communication/collaboration system enables communications to be associated with an object, such as a project. Thus, by accessing a project-related user interface, communications related to the project may be viewed together. As will be discussed elsewhere herein, a control may be provided which enables the user to specify whether only communications within a chat window are to be displayed, whether only communications with an external entity are to be displayed, or whether both internal communications and communications with external entities are to be displayed, thereby making efficient use of screen real estate by filtering the data presented to a user to the data of interest.

As discussed in greater detail herein, the disclosed communication/collaboration system further enables a user to generate a dynamic document that includes one or more editable fields, and one or more fields that display data automatically generated by one or more formulas associated with one or more fields (e.g., one or more editable fields). Changes to the document made by a user of a first entity may be selectively transmitted to a user of a second entity. Optionally, a communication (e.g., a chat entry, text message, audio communication, video communication, still image, emoji entry, and/or other communication-type) may be generated and displayed that provides a summary of the change to the document. Optionally, the chat entry may be displayed at the same time as the document. For example, if the document is a submission from a product provider offering to sell items to a retailer, the submission may be made available to a retailer. As will be discussed elsewhere herein, the submission may include price per unit, number of items in a unit, shipping volume, weight, materials, and/or other information. If the retailer requests or makes a change to a product material specified by the product provider (e.g., a change of a basket from plastic to bamboo), a chat entry may be generated the reflects the change (e.g., "Jane has requested that the basket material be changed from plastic to bamboo") and displayed on a user terminal of the retailer and on a user terminal of the product provider in a chat pane at the same time as the changed document is displayed. Certain other data entered by a user at a first entity, such as desired profit margin, may be inhibited from being provided to a user at a second entity, and indeed, may be inhibited from being provided with users without the appropriate permissions at the first entity.

Optionally, changes to a given object may only be made by the entity that created the object, and the other entities collaborating on the object may only request, but not make, a change. For example, optionally, If an acquirer requests a product, only the supplier can change product information belonging to supply side (e.g., materials, weight, etc.), while only the acquirer may be permitted to specify or make changes to an acquisition price.

By way of further example, if an acquirer announces a purchase program or issues a request for quote (RFQ) for a product, the acquirer may specify desired product specification. A supplier may then respond by submitting a supplier product, wherein only the supplier is permitted to change properties of the supplier product.

As discussed in greater detail herein, the communication/collaboration system enables communications between users to be restricted so that a given user at a given entity may only be permitted to contact certain designated users at other entities, and may further restrict communications to those designated users to only certain designated subjects/object-types. For example, as will be discussed in greater detail herein, a user (e.g., a buyer) at a retailer may be limited, via the system, to communicate only with certain product providers, and only with certain designated users at such product providers, and only regarding designated product categories (e.g., outdoor furniture). By way of further example, a given user at a product provider may only be permitted to communicate with certain retailers regarding certain product categories.

By way of yet further example, a given user at a product provider may only be permitted to communicate with a given user at a retailer if the retailer user invited the product provider to submit a bid for a given retailer program. For example, a retailer program may provide a description (e.g., a high level and/or a low level description), a trend board (e.g., a presentation of images of one or more products indicating current product trends), a colorway (e.g., a range of combinations of colors in which a design or product type is available), a target price, and/or a quantity of product the retailer is seeking to acquire. The retailer program may have been specified by a retailer user with a specified of level of rights. For example, a hierarchy of user levels may be specified with different user levels having different rights. For example, a relatively high level manager may be authorized to add product suppliers to an approved provider list, may be authorized to specify a retailer program/project, may be authorized to access confidential information of a highest level of confidentiality, and may be authorized to approve purchases up to a first threshold level. A level down manager may be authorized to specify a retailer program/project, may be authorized to access confidential information of a second level of confidentiality (lower than the first level of confidentiality), and may be authorized to approve purchases up to a second threshold level (which is lower than the first threshold). A still lower level buyer may be authorized to access confidential information of a third level of confidentiality (lower than the second level of confidentiality), may be authorized to select product providers from the approved product provider list and submit invitations to the selected product providers to submit bids to the retailer to supply products for a specified retailer program.

A user interface may be provided that enables a given user (e.g., a manager) to specify a project goal by units (e.g., purchase 100 units) and/or by price (e.g., purchase $10,000 of units). The goal may be assigned to a department and on a sub-department level and/or on a user level. For example, 20% of the goal may be assigned to a first department, 45% of the goal may be assigned to a second department, and 35% of the goal may be assigned to a third department. Sub-sub-goals may be assigned to users within a sub-department. Progress towards the respective sub-goals may be tracked and aggregated in real time. The progress towards the subgoals and the aggregated progress towards the overall goal may be reported (e.g., via text and/or graph) in real time to the appropriate user (e.g., manager).

Further, a given entity may act as both a seller and a buyer of items. For example, a furniture manufacturer may purchase materials to make the furniture (e.g., wood, nails, screws, brackets, etc.), and may then sell the furniture to a retailer. A given user at an entity may be restricted to only buying or only selling items, or may perform both buying and selling of items, based on the permissions assigned to the user. Thus, a user with appropriate permissions may, via a single sign-in to the system, access both seller user interfaces and data, and buyer user interfaces and data. When the user is acting in a buyer function, the user may be permitted to communicate with a first set of entities (e.g., product providers), and corresponding sets of users associated with the first set of entities. When the user is acting in a seller function, the user may be permitted to communicate with a second set of entities (e.g., retailers), and corresponding sets of users associated with the second set of entities.

Unique graphical user interfaces are described that enable a user to flexibly control what data is presented. Further, graphical user interfaces are described that enable fast paced communication and inter-entity and intra-entity collaboration. Further, user interfaces are described that organize communications around objects (e.g., projects, product offers, purchase programs, etc.), to create a better sense of organization, auditability, and insight of and into artifacts. In addition, chat interfaces are described that include not just user-to-user messages, by that also include events detected by the system, such as bids, price changes, field updates, and/or the like. Thus, user interfaces are described that solve problems with prior graphical user interfaces devices in the computerized product-related transaction area, improving speed, accuracy and usability as compared to conventional user interfaces.

Advantageously, in order to speed processing, reduce processing loads, and reduce memory utilization, a given virtual page may be associated with a given object (e.g., a project or transaction). The virtual page may include different modules with a variety of sensitive and confidential data and/or communications that are not to be shared with unauthorized users. Further, a virtual page may include certain data that is not of interest to certain entities or to certain users at certain entities. When multiple users are collaborating on the same object, each time new data and/or data types are to be displayed to users, the communication/collaboration system may optionally determine which entity a given user is associated with, which user(s) at a given collaborating entity the given user is collaborating with, the permissions associated with a given user, and/or the job function of a given user. The communication/collaboration system may use some or all the foregoing information to determine what data and/or communications are to be shown to a given collaborating user. The communication/collaboration system may then determine which modules of the virtual page are to be displayed to a given user. The modules may then be rendered with the corresponding modules and module data (which may already have been present in the virtual page) via a terminal display of a given user. Thus, different users within the same entity may see different versions of the virtual page, with different data. Further, users at different entities may see different versions of the virtual page, with different data. Thus, the foregoing process may advantageously use the same virtual page in rendering the different pages for the different users. As noted above, this technique reduces processor and memory utilization, as the system does not generate, de novo, a new page with data separately accessed for each user.

A virtual page may be used as part of a workflow. A workflow may be associated with several virtual pages. A first user, at a first entity at a given state of a collaboration workflow being performed in collaboration with a second entity, may be presented with the same virtual modules (but different data) as a second user (with the same permission level as the first user) at the first entity at the given state of the collaboration workflow being performed in collaboration with a third entity. Thus, advantageously, users at a given permission level at a given entity will utilize the same workflow even when working with different entities, so that the workflow is agnostic as which entity is being collaborated with.

Certain aspects will now be discussed with reference to the figures.

The communication/collaboration system optionally enables a centralized workflow between different entities that enables the different entities (e.g., organizations) to collaborate on an object across a network. For example, a given entity may be an acquirer (e.g., a buyer) and/or a supplier (e.g., a seller) of items. With reference to FIG. 1A an example communication/collaboration system 100A manages communications and data transfers between a plurality of entity systems 102-1 . . . 102-n, such as between entities on the acquisition side and entities on the supply side. The entity systems 102 may include standalone computers (e.g., desktop, laptop, tablet, smart phone, or other computer device), a centralized computer system, and/or a cloud computing system.

A given entity system 102 may include a data store hosting an enterprise database/warehouse/repository. The enterprise database may optionally store data such as item or service data (e.g., product data) and/or order data. By way of example, the product or service data may include specifications and attributes of the products and services offered by an entity, such as dimensions, weight, color, configuration, cost, and/or the like. The order data may include data such as buying information (e.g., buying program data), inventory data of items, quantity of items needed, shipping location, buying terms, and/or the like. As discussed elsewhere herein, the communication between the different entities may be via a secure communication channel, where data is encrypted. Further, data stored by the communication/collaboration system 100A may be encrypted and/or otherwise secured.

The communication/collaboration system 100A is configured to accommodate differing informational access and differing artifact ownership within a given workflow depending on the organization and organization user accessing the given information and/or artifact.

The communication/collaboration system 100A is optionally a web based and/or app based SaaS platform that connects entities, such as retailers and suppliers. Unlike conventional platforms, the disclosed platform is a shared system, built for collaboration and the shared workflows and needs of item acquirers (e.g., retailers or other buyers) and suppliers (e.g., manufacturers). For example, a retailer may wish to order products from a supplier, where the ordered products will need to be manufactured for the retailer in accordance with the order. As a shared software platform, the communication/collaboration system 100A bridges the gap that conventionally exists between systems at suppliers and retailers. The disclosed communication/collaboration system 100A increases speed of deploying products (e.g., new products) to market by decreasing the friction in information transfer between organizations and their systems by removing or decreasing the human error in reconciling informational differences instance by instance. The communication/collaboration system 100A may optionally be configured to be the final platform accessed by "suppliers" (e.g., companies offering items to be resold) as information flows out of their company via actions of salespersons, and may optionally be configured to be the first platform accessed by "retailers" (e.g., companies purchasing items) as they encounter information on products and orders. As noted above, a given entity may be both a supplier of items and an acquirer of items.

An item supplier can publish items and/or services via the communication/collaboration system 100A to one or more other entities (e.g., item acquirers). Optionally, the supplier may specify which entities can view the published items and/or services, or the published items and/or services may be made accessible to all users of the communication/collaboration system 100A. Conversely, acquirers can publish acquisition plans and selectively invite certain suppliers (e.g., within or outside of the acquirer's current supply network), review item/service offers, communicate with suppliers, iteratively negotiate specifications, attributes, pricing of items and services, other transaction terms, and generate purchase orders. Advantageously, the use of a shared communication/collaboration system 100A by an acquirer and supplier will reduce the need for duplicative, error prone, arduous data entry by each party.

Thus, for example, a given entity/organization may comprise various units (e.g., business units, such as subsidiaries, divisions, groups, departments, or the like), where a given user may be associated with an organization unit. An organization may have a complex hierarchical structure, with many layers of units. The communication/collaboration system 100A may enable connections to be defined to link units within an organization to enable users within an organization to collaborate on an object. In addition, the communication/collaboration system 100A may enable connections to be defined to link units across organizations to enable a user at a unit of one organization to collaborate with users at one or more other linked-to organizations. A given connection may have an upstream side (e.g., where the user on the upstream side performs an item acquisition workflow) and a downstream side (e.g., where the user on the downstream side performs an item supply workflow).

FIG. 1A-2 illustrates an example implementation of the communication/collaboration system 100A. The system 100A may optionally be a cloud-based system including a hosted computing environment that includes a collection of physical computing resources that may be remotely accessible and may be rapidly provisioned as needed. Further, the system 100A may include a hosted storage environment that includes a collection of physical data storage devices that may be remotely accessible and may be rapidly provisioned as needed (sometimes referred to as "cloud" storage). The example communication/collaboration system 100A includes an authentication module, a front end module 104B, backend processing module 106B, a communication and collaboration module 108B, an integration module 110B, a tracking module 112B, and a data store 114B (which may include cloud storage).

The data store 114B may host one or more databases. A given database may be a relational database (e.g., an SQL database) or a non-relational database (a nonSQL database, such as NoSQL). For example, a relational database may advantageously use the same uniform language (e.g., DDL) for different user roles (developer, user, administrator), may use a standardized language for different relational database management systems, may use an advanced and non-structural querying language, and may comply with ACID principles (atomicity, consistency, isolation, durability), thus ensuring stability, security, and predictability both of the entire database and each transaction. A nonSQL database may be used rather than an SQL database as it better scales out horizontally across distributed systems and so can handle large number of transactions (e.g., millions of transactions at a time). Further, a nonSQL database may be schema-free and so better utilized with unstructured and semi-structured data. Thus the selection of the database technology may be based on the particular use scenario (e.g., the need for stability and uniformity offered by SQL databases v. the need to process large amounts of unstructured and semi-structured data as provided by a nonSQL database).

Optionally, a cloud-based object database (e.g., to store images, audio and videos) may be used. Optionally, text messages may be stored in a specialized text database that is document-oriented. Optionally, a graph database (rather than a database organized as a table with rows and columns) may be used to store hierarchy data, where the graph database provides index-free adjacency, where a given element in the database contains a direct link to its adjacent element and index lookups are not required.

The communication/collaboration system 100A may provide interfaces to and utilize one or more microservices from one or more remote system to thereby provide additional features and/or enhance system performance. For example, an intercom microservice may be used for customer communication and technical support. An email automation service may be used to manage emails. An event-driven, serverless computing platform may be used to manipulate images. An error tracking service may be used to track and report bugs. A cloud based automated load and performance testing service may be used to monitor system performance.

The data store 114B may store data published by various entities using the system 100A, data accessed from respective enterprise databases of the systems 102, communications between entities, purchase orders, and/or other data discussed herein. The data store 114B may store an identifier associated with the creator/provider of a given item of data. The identifier may include identification information on the user's unit and organization, and may include creation and/or editing timestamps.

The data store 114B may optionally host a connections database storing information on connections between organizations, organization units, and organization/unit users, and data communicated and/or stored relating to such connections.

The data store may provide data in response to user or system queries. Optionally, an interface may be provided (e.g., via the front end module 104B) that enables queries to be submitted with respect to analytics. For example, a user can submit a query as to what is the most popular color (e.g., in general, for a specific item-type, or for a specific model of an item, for a specific SKU, etc.), what is the best-selling item in a given category (e.g., what is the best-selling desk chair), how many of a given item have been sold (e.g., in general, by a specific entity, to a specific entity, etc.), and/or the like. The response may be generated using data from the data store 114B and/or from data accessed from the enterprise databases of the entity systems 102.

The authentication module 102B may be used to determine a user access and permissions based on user login information (e.g., UserID, password, and/or biometric data). Based on a user's access authorization and permissions, a user may be granted access to certain enterprise data within the entity to which the user belongs, and the user may also access to certain enterprise data shared by other entities that have connections to the user's own entity. For example, certain users may be permitted to view certain data and not other data, may be permitted to access certain user interfaces and not other user interfaces, may be permitted to communicate with certain users at certain entities and not other users at a given entity and not other entities, and/or may be permitted to conduct certain transactions and not other transactions. By way of further example, certain data in the connection database referenced above may be accessed by users on the acquisition side of a given connection, certain data in the connection database referenced above may be accessed by users on the supply side of the given connection, and certain data may be accessible to users on both sides of the given connection.

By way of yet further illustrative example, based on the specified permissions and access, a given user may be permitted to only conduct purchases and not sales, sales and not purchases, or both purchases and sales of certain items/services. The permissions may be based on a user's position in a hierarchy of users (e.g., a hierarchy of users defined by an organization's administrator). By way of example, a user associated with an organization unit may be granted access and permission to enterprise data and workflows of the units below the user's unit in the hierarchy, but not necessarily to enterprise data and workflows of the units above the user's unit in the hierarchy.

The front end module 104B (which may include a web server) may generate and provide for display or reproduction on user systems user interfaces configured to display data, receive data from the user or user system, download data, and/or upload data. Data may include text, graphic, still image, video, and/or audio data. Optionally, the user interfaces may include sounds that are triggered by a corresponding event. For example, each time a transaction of a specified type is generated (e.g., a final purchase order), a corresponding sound and/or animation may be generated. The sounds may include non-verbal sounds (e.g., beeps, horn honking, a tune, etc.) and/or words providing information and/or positive feedback to the user (e.g., "Purchase order completed. Great job!"). The animation may likewise provide positive feedback to the user (e.g., an animation or video of fireworks, a waving flag, a tooting horn, etc.).

Optionally, a threshold needs to be reached in order for certain sounds/animations/videos/emojis to be rendered to the user. For example, the user may need to have finalized a threshold number of purchase orders in order for a corresponding sound/graphic to be generated and provided to the user. By way of further example, a purchase order may need to be for a threshold dollar amount and/or quantity of product in order for a corresponding sound/graphic to be generated and provided to the user.

The sounds, animations, and thresholds may be different for different entities and may be different depending on the user function. For example, an entity may be able to custom-specify sounds, animations, and thresholds for a given event or transaction type. By way of further example, different sounds/animations/videos/emojis may be used for a user at a supplier entity and for a user at an acquirer entity if though both users are negotiating the same transaction (e.g., the same purchase order). Further, different sounds/animations/videos/emojis may be provided based on the user level in a hierarchy at the user's entity. For example, a sales person may be provided with different sounds/animations/videos/emojis than a supervisor of the sales person for a given transaction.

The front end module 104B optionally determines the screen resolution of a target device (e.g., by querying the target device regarding the height and width layout in pixels). The front end module 104B may then dynamically format the user interfaces accordingly. For example, different user interfaces may be used for phones, tablets, laptop, and desktop displays, to enable information to be appropriately presented for easy viewing while reducing navigation through multiple layers of user interfaces. Optionally, the front end module 104B may utilize a flexible layout that enables a given user interface to dynamically scale to different screen sizes, densities, and/or aspect ratios. By way of illustration, a given user interface layout may be defined using density and scale independent pixels (dp) instead of using absolute pixels. User interface elements may be placed and sized relative to other user interface elements. Elements may be dynamically sized based at least in part on their content.

The backend processing system 106B is configured to perform computations, data processing, filtering, query servicing, business intelligence, analytics, graph generation, diagram generation, dashboard generation, and report generation. For example, the backend processing system 106B may be configured to process and analyze vast amounts of data being published by acquirers and suppliers of products and/or services to identify trends. Examples of trends which may be identified include which products are or are becoming popular (e.g., becoming increasingly offered or purchased over a specified time frame), and which products are unpopular or becoming unpopular (e.g., trending downwards with respect to offers and/or purchases over a specified time frame). Such trend information may be reported to a user (e.g., at an entity using the system 100A) textually, via a graph, and/or otherwise.

Optionally, the backend processing system 106B includes an artificial intelligence module. The artificial intelligence module may include a machine learning engine, such as a neural network, that identifies such trends and/or that identifies anomalies in the offer and/or purchases of products/services. In addition or instead, statistical predictive algorithms may be used to predict trends.

For example, optionally a deep, convolutional, neural network model trained using historical data (e.g., data published by supplier entities and/or acquirer entities, data acquired from enterprise databases of the entities, data obtained from purchase orders, sales data from remote databases, etc.) to identify trends with respect to the popularity of products and product types may be used. The deep neural network may include an input layer, an output layer, and one or more levels of hidden layers between the input and output layers. The deep neural network may be configured as a feed forward network. Optionally, the deep neural network may be may be used to analyze, optionally in real time, data published by product suppliers, product acquirers, and other data sources. In addition, the deep neural network may be may be used to analyze transaction data (e.g., data included in a purchase order).

The convolutional deep neural network may be configured with a shared-weights architecture and with translation invariance characteristics. The hidden layers may be configured as convolutional layers, pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

The trend spotting data may be stored in data store 114B. Advantageously, the neural network, configured to derive trend data from complicated or imprecise data, can be used to extract patterns and detect trends that are too complex to be identified by humans or conventional computer techniques.

Thus, the backend processing system 106B may be configured to determine trends, generate forecasts (e.g., in the purchase or sales of a product or product-type), perform prescriptive analytics, identify value drivers that make a given product more desirable (e.g., increases sales and/or enables an increase in prices without reducing sales), identify key segments correlations, identify anomalies, compare and rank sales performs of various items (e.g., where an item is associated with a corresponding SKU (Stock Keeping Unit)), and perform a what-if analysis. By way of example, the backend processing system 106B may use determined trends to recommend to a supplier what products to offer in the future, and may recommend to an acquirer what products to acquire (e.g., for resale) in the future.

The communication and collaboration module 108B enables inter-entity and intra-entity communication, such as chat, messaging, video, audio, and/or email communication (e.g., between established connections). As will be discussed elsewhere, the communications may be threaded, and communications associated with a given object (e.g., a given transaction) may be presented together in an organized fashion. Thus, for example, a user from one business unit of an entity (e.g., a subsidiary, division, group, or department of the entity) can communicate in real time via messaging/chat/video conferencing/audio with one or more users of the same business unit or with members of other business units which have connections to the user's business unit.

The integration module 110B can connect to the existing system infrastructure of a given entity via an application programming interface (API), using XML, JSON, EDI, and/or other data exchange format. The integration module 110B can perform data sharing, exchanging, and/or synchronization with other systems. In addition, the integration module may perform a data validation process, such as to determine which data item is most current (e.g., which SKU for a given product is most current and should be used). The integration module 110B may identify data conflicts, generate a warning message and cause the warning message to be displayed which such a conflict is detected, and inhibit the overwriting of data when such a conflict is detected until the module 110B receives a user or other instruction enabling the overwrite to be performed. The synchronization of data from an enterprise database or other data store of an entity system 102 with the data store 114B may be performed periodically and/or in response to a detected event (e.g., the generation of a final purchase order or other agreement for a transaction between two entities).

Optionally, in response to detecting a given entity publishing information on a new product or an offer to supply a product, the integration module 110B can broadcast in batch mode some or all of the published information on the new product or the offer to user interfaces (e.g., communication interfaces, dashboards, etc.) displayed by systems 102 of other entities. Such broadcast may be filtered so that it is only available to entities specified by the given entity, only available to those with which the given entity has conducted a transaction with via the system 100A within a specified time period, and/or only available to those entities that have opted-in to receive such broadcast from the given entity. This approach reduces network bandwidth usage and memory usage by inhibiting the broadcast of data to certain destinations while still ensuring that the data reaches the appropriate destinations in a timely manner. Further, the batch broadcast may be performed in response to detecting or predicating that the system 100A communications interface is otherwise at low utilization to thereby avoid overburdening the communication interface.

The communication/collaboration system 100A may be configured to accommodate the differing leverage between entities (e.g., retailers and suppliers). For example, the communication/collaboration system 100A is optionally configured to provide workflows, features, and functions that operate in one-to-many relationships with the retailer (acquisition side company) being "one" and the suppliers (supply side companies) being "many". This enables acquisition side companies to communicate buying needs, specifications, and/or timelines to many supply side companies with the same or similar degree of effort as communicating with just one other company. Under the same or similar relationship, data from the many supply side companies flows many to the one acquisition side company. As such, acquisition side companies are enabled to improve acquisition decisions through comparison of similar offerings from many supply side companies (e.g., using a central repository of data). Further, the communication/collaboration system 100A is optionally configured to provide workflows, features, and functions that operate in one-to-many relationships with the supply side company being "one" and the acquisition side companies (e.g., retailers) being "many".

The communication/collaboration system 100A may also be configured to provide workflows, features, and functions that operate in many-to-many relationships, enabling multiple supply side companies to interact with multiple acquisition side companies, and enabling multiple acquisition side companies to interact with multiple supply side companies.

Thus, for example, a supply side company may use the same communication/collaboration system 100A and interfaces to provide offers and process sales with multiple acquisition side companies. A given user at an entity may access data and user interfaces via a user device (e.g., a desktop computer, laptop computer, tablet computer, phone, smart television, virtual or augmented reality system, or other computing device). A given user device may be equipped with a processor, memory, a network interface, a display (e.g., a touch display), a microphone, a speaker, a point device (e.g., a mouse, touchpad, stylus), a printing device, and/or other interfaces. The user device may communicate with the communication/collaboration system described herein via a respective network interface.

The tracking module 1128 may optionally be deployed in the system 100A to provide additional services, such as logistics (e.g., when is a given order scheduled to ship, what orders have shipped, when is a given order expected to arrive, what is the origination location for a shipment, what is the destination location for a shipment, etc.), invoicing services, billing services, or the like. Such services may be provided using data accessed from the data store 114B and/or from the entity systems.

Figure 1C:
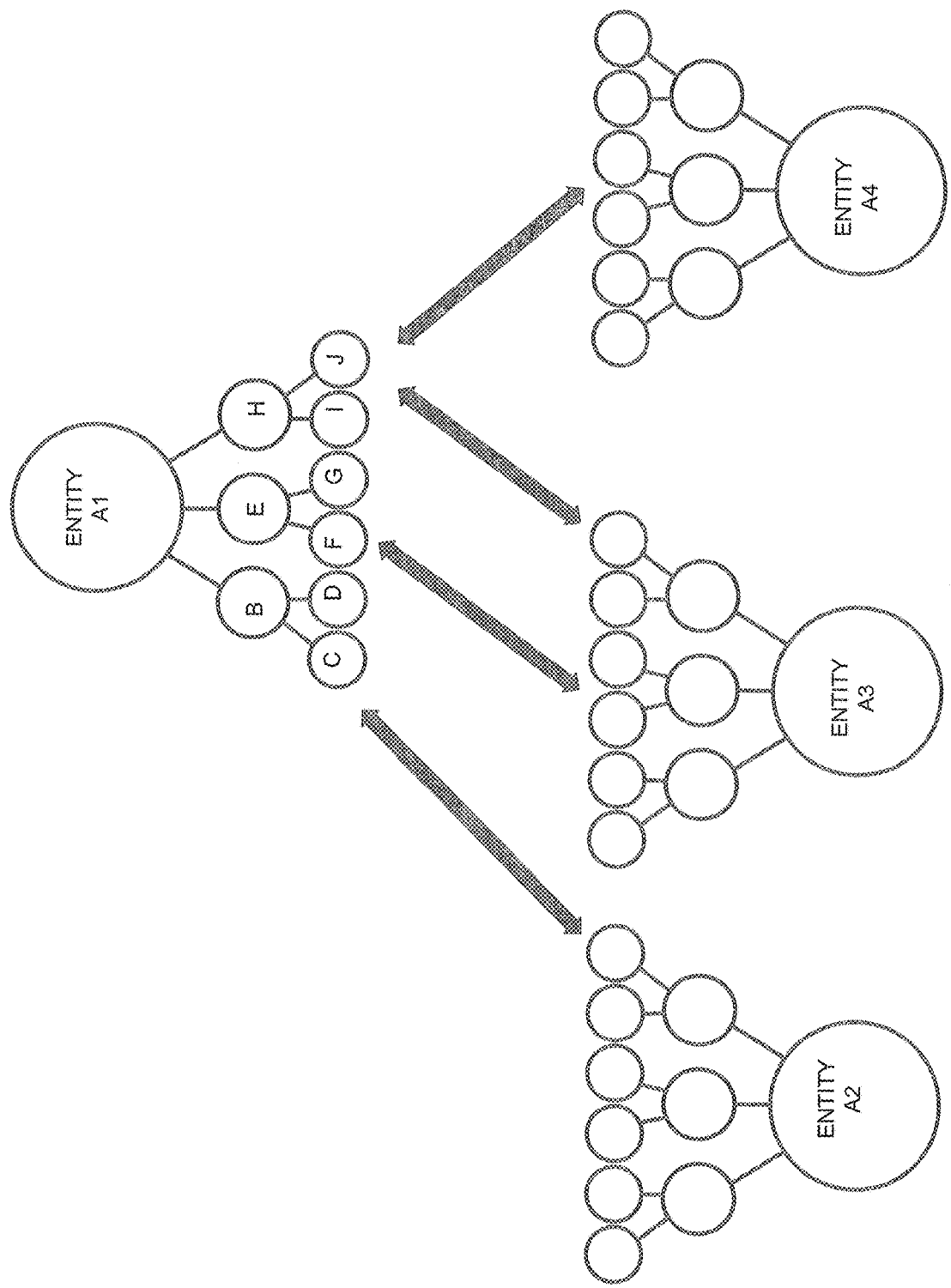
FIG. 1C illustrates an example communication hierarchy.
Figure 1D:
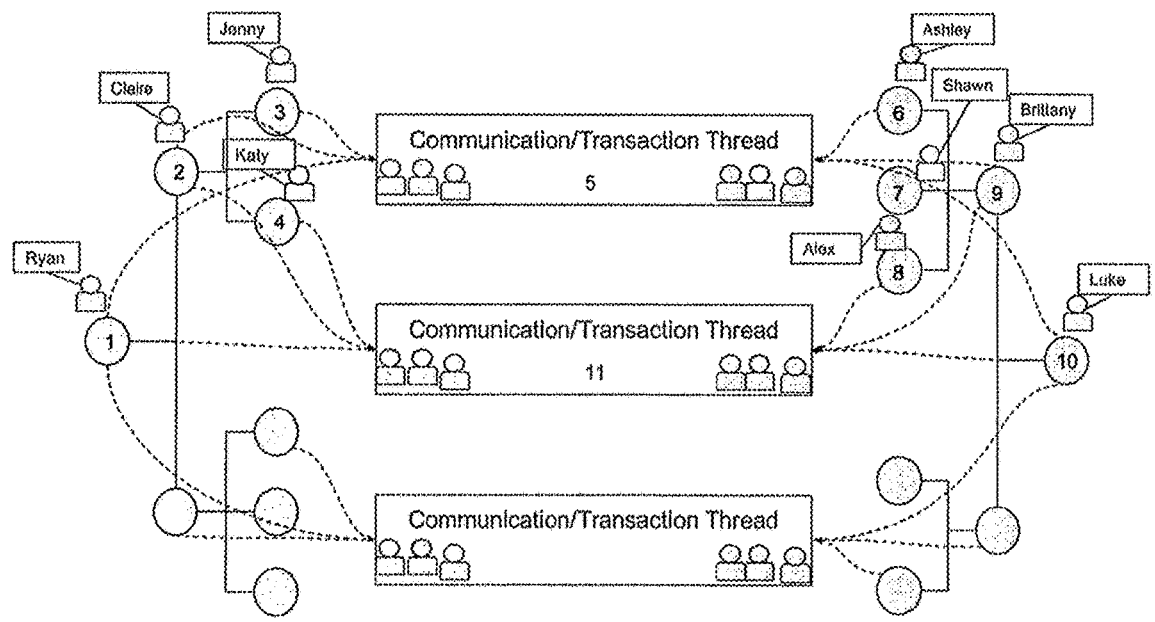

As illustrated in FIGS. 1C, 1D, 1E, as a platform configured to be utilized by many different entities, the communication/collaboration system enables users to set up their account and rules by incorporating their organizational hierarchy as conditionally accessible nodes into the communication/collaboration system. The hierarchy and associated permissions and access rights may be specified by an authorized user via a user interface. Permissions and access rights may be assigned to a role, rather than a particular user. For example, a given position on the hierarchy may be assigned certain permissions and access rights. A user may then me assigned to the given position and will inherit those permissions and access rights. If the user then is no longer in the given position (e.g., the user quits), and a new user is assigned to the given position, the new user will inherit the position permissions and access rights and the old user will lose those permissions and access rights.

For example, with reference to FIG. 1C, a given organization may have multiple levels of hierarchy. A given hierarchy level may correspond to a given authority (e.g., management) level. A given branch of the hierarchy may correspond to a department, business unit, or the like. For example, roles B, C, and D (to which respective users are assigned) may be members of a first department (where role B is a supervisor role with respect to roles C and D), roles E, F, G may be members of a second department (where role E is a supervisor role with respect to roles F and G), and roles H, I, J may be members of a second department (where role H is a supervisor role with respect to roles I and J). Users assigned to a supervisor role may be provided with access to all of the data and communications of each of their subordinates but not of the subordinates of other supervisors on the same hierarchy level. Further, users assigned to roles on a lower hierarchy level may not be able to access all the data and communications of users assigned to roles on a relatively higher hierarchy level. As illustrated, a given user (e.g., assigned to roles C, D, F, G, I, or J) of an entity may be permitted to communicate with one or more users of one more other entities and not other entities or other users.

Referring to FIG. 1D, a given node contains information, artifacts, and communications (e.g., organized as communication/transaction threads) that are conditionally accessible by users. Within an entity, access to a given node is set by an authorized entity administrator and is subject to a hierarchical inheritance scheme determined by the nodes comprising the organizational hierarchy as similarly discussed above. By way of illustrative example, across internal organizations, a buy side company administrator may designate which nodes a given sell side company can access, and authorized sell side company administrators may then designate which users within the sell side company can access those nodes.

After organizational hierarchies are established, buy side companies have been connected multiple sell side companies via a given node, and users for both companies have been assigned access, users generate information, artifacts, and communication within that node that are contained within (associated with) that node. The communication/collaboration system enables a given user's permission to access a given node to be removed (e.g., by an administrator or manager) and enables granting, to new users, access to the system. The communication/collaboration system further enables granting to new or existing users access to all or select items of information, artifacts, and/or communications generated by users (e.g., generated during the entire existence of the node or a select time frame thereof). For example, as discussed above, access and permissions may optionally be assigned on a role-basis, wherein if a user's role changes the users access and permissions may likewise change.

By way of illustration and with reference to FIG. 1D, Ryan, Claire and Ryan, Claire, Katy, Alex, Brittany, and Luke are granted access to communication/transaction threads 5 and 11.

With reference to the table illustrated in FIG. 1E:

Ryan is granted access to node 1,

Ryan and Claire are granted access to node 2,

Ryan, Claire and Jenny are granted access to node 3,

Ryan, Claire and Katy are granted access to node 4, and so on.

Figure 1F:
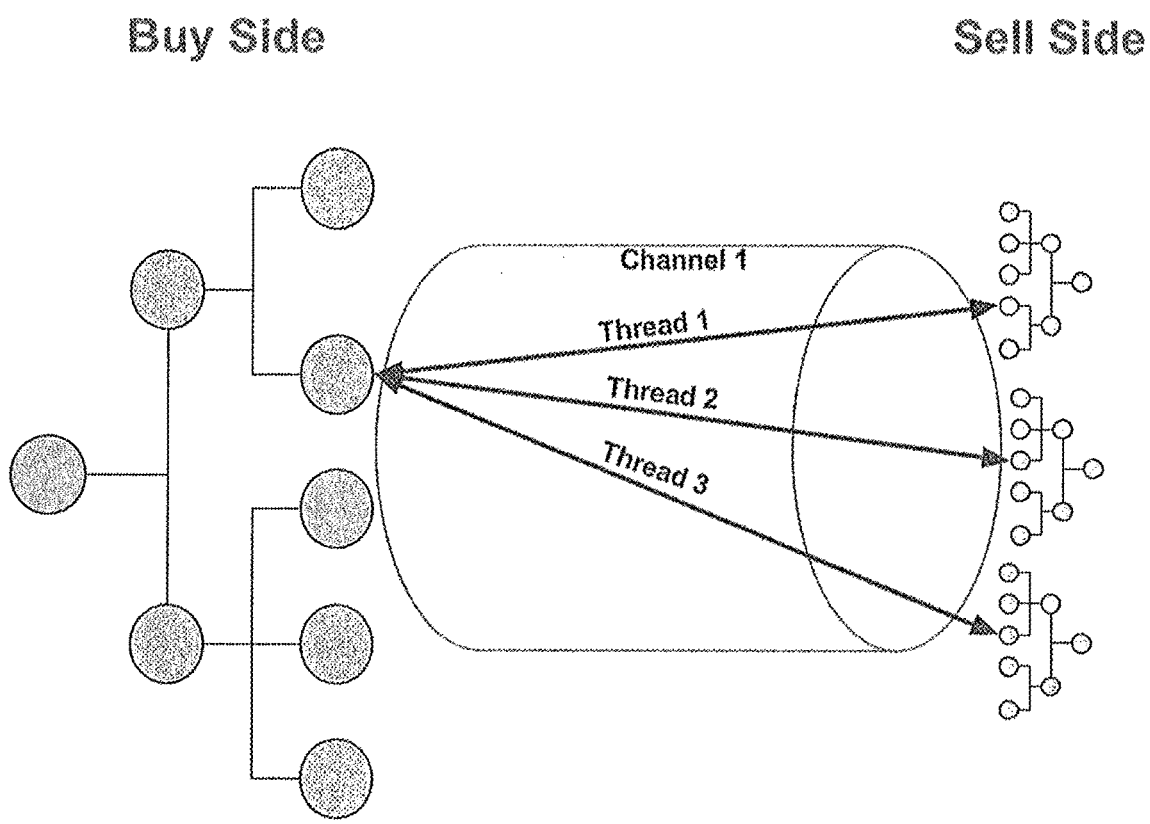
FIG. 1F illustrates an example one-to-many communication scenario.

With reference to FIG. 1F, links are illustrated in the context of an organization acting in a buy function and an organization acting in a sell function. The communication/collaboration system may optionally be configured so that the one-to-many/many-to-one type relationship in the connection of multiple sell side companies to a node of a given buy side company enables users of the buy side company to access information, artifacts, and/or communications generated by many sell side companies that are connected to the given node (sometimes referred to herein as a "Channel"), while sell side company users are only provided access to information, artifacts, and communications generated by their own users or buy side users (sometimes referred to herein as a "Threads") and not those of other sell side companies.

Figure 1G:
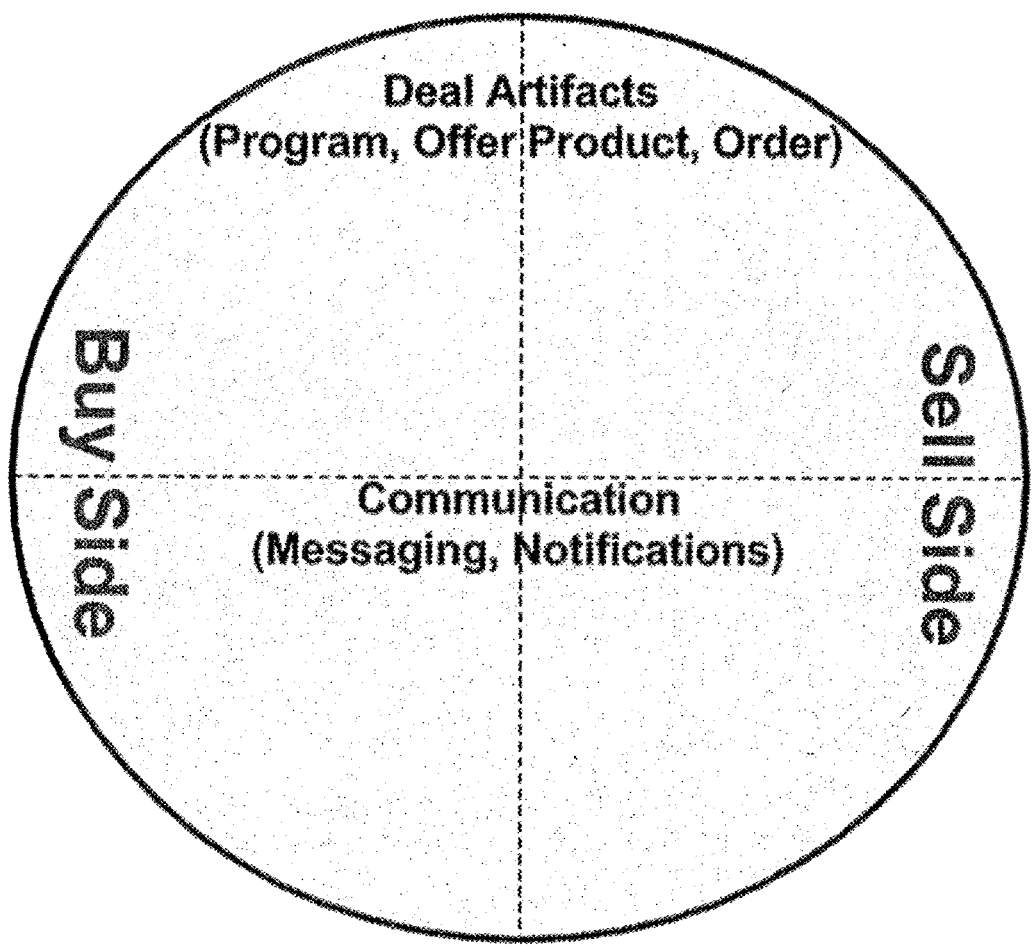
FIG. 1G illustrates an example thread cross section.

With reference to FIG. 1G, an example thread cross section is illustrated. In this example, the information contained within a given thread is comprised of object(s) and communication(s), generated by buy side company users and sell side company users. The communication in a thread is organized by object (e.g., program, product(s), purchase order(s), and/or the like) to provide useful context for the communication.

Figure 1H:
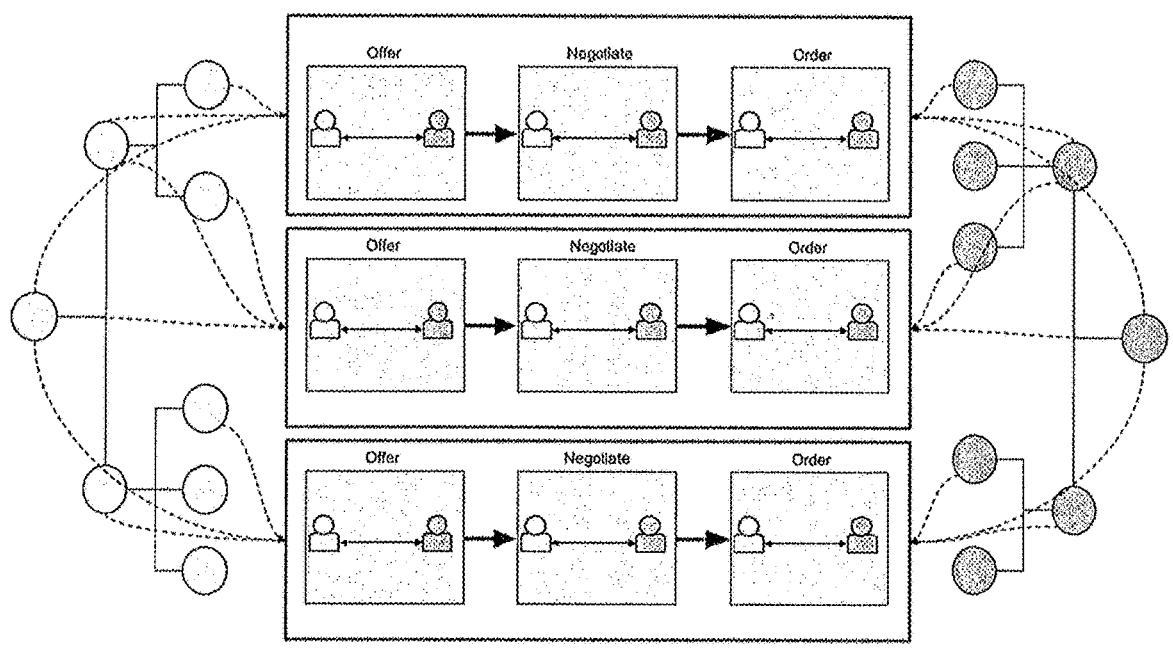
FIG. 1H illustrates multiple communication threads and multiple channels.

With reference to FIG. 1H, within a given Channel and Thread are functions to support or enable a buy/sell process (e.g., a buy/sell process for retail purchasing and wholesale selling). These functions may include some or all of the following: programmatic buying planning, request for proposal like specification sharing, offering of goods, negotiation and customization of goods for the buyers, ordering, and/or the like. Access to such functions for a specific channel or thread may be governed by the hierarchical permissions of the organizations as discussed elsewhere herein.

Figure 1I:
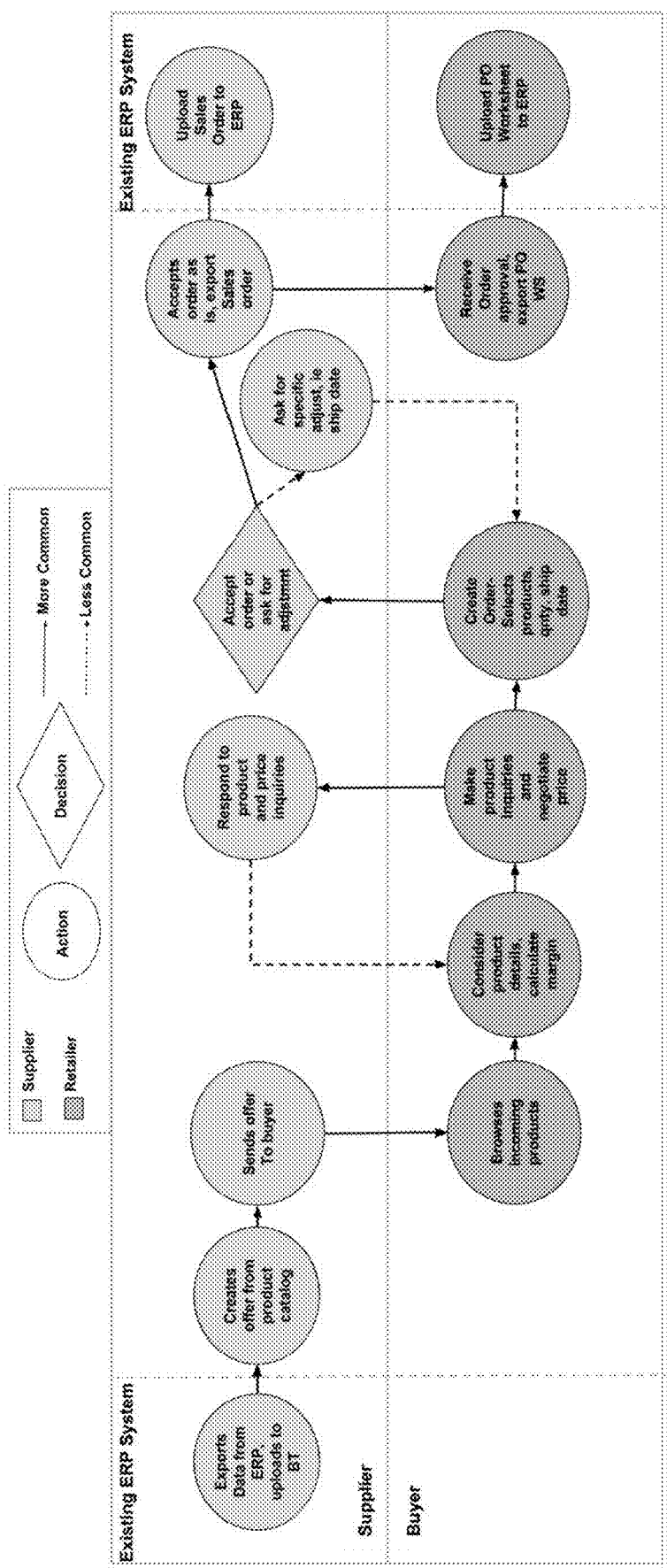
FIG. 1I illustrates an example transaction collaboration process.

With reference to FIG. 1I, the communication/collaboration system optionally integrates functions and features that enable a retail buying/wholesale selling process and that enables access to tools and related information, artifacts, and communications to be governed by hierarchical structures of multiple organizations so as to accommodate the needs and sensitivity of each organization.

With further reference to FIG. 1I, in this example, the supplier may export data (e.g., product data, catalog data, etc.) from its ERP system and upload the data to the communication/collaboration system. the communication/collaboration system may store the uploaded data in the communication/collaboration system data store. Using interfaces provided by the communication/collaboration system and the uploaded catalog data, a supplier user with the appropriate permissions and access rights may generate an offer and transmit the offer to a buyer (e.g., a retailer) via the communication/collaboration system. The offer may include an offer identifier, a product identifier, a product description, product attributes, product pricing, product delivery times, and/or other information, as discussed elsewhere herein.

Many suppliers may be similarly generating offers and transmitting the offers to the buyer via the communication/collaboration system. A buyer user (with the appropriate permissions and access rights), may browse through the offers and view the offer details via an interface provided by the communication/collaboration system (discussed in greater detail elsewhere herein). The interface may also be configured with formulas enabling the buyer user to calculate such data as estimated landed cost, margin, estimated retail price, and/or other data. The buyer user may then communicate (e.g., via text message, photograph, video, form field changes, or otherwise) questions or desired changes (e.g., change in color, configuration, price, etc.) via the communication/collaboration system as part of a negotiation process with respect to the offer. The supplier receives the buyer communication and may accept the changes, refuse the changes, or propose different changes (e.g., compromise changes). The negotiation process may be repeated one or more times. The buyer may then generate an order via a corresponding user interface provided via the communication/collaboration system which may specify products, quantity, ship date, case pack/cube dimensions, unit price, total price, etc. The order may be transmitted via the communication/collaboration system to the supplier who may accept the order or request changes to one or items in the order (e.g., change in ship date, quantity, etc.). If the supplier accepts the order, the sales order is exported and transmitted to the buyer and uploaded to the suppliers ERP system. The buyer receives the order, approves the order, and exports a corresponding purchase order to the buyer ERP system.

Figure 1J:
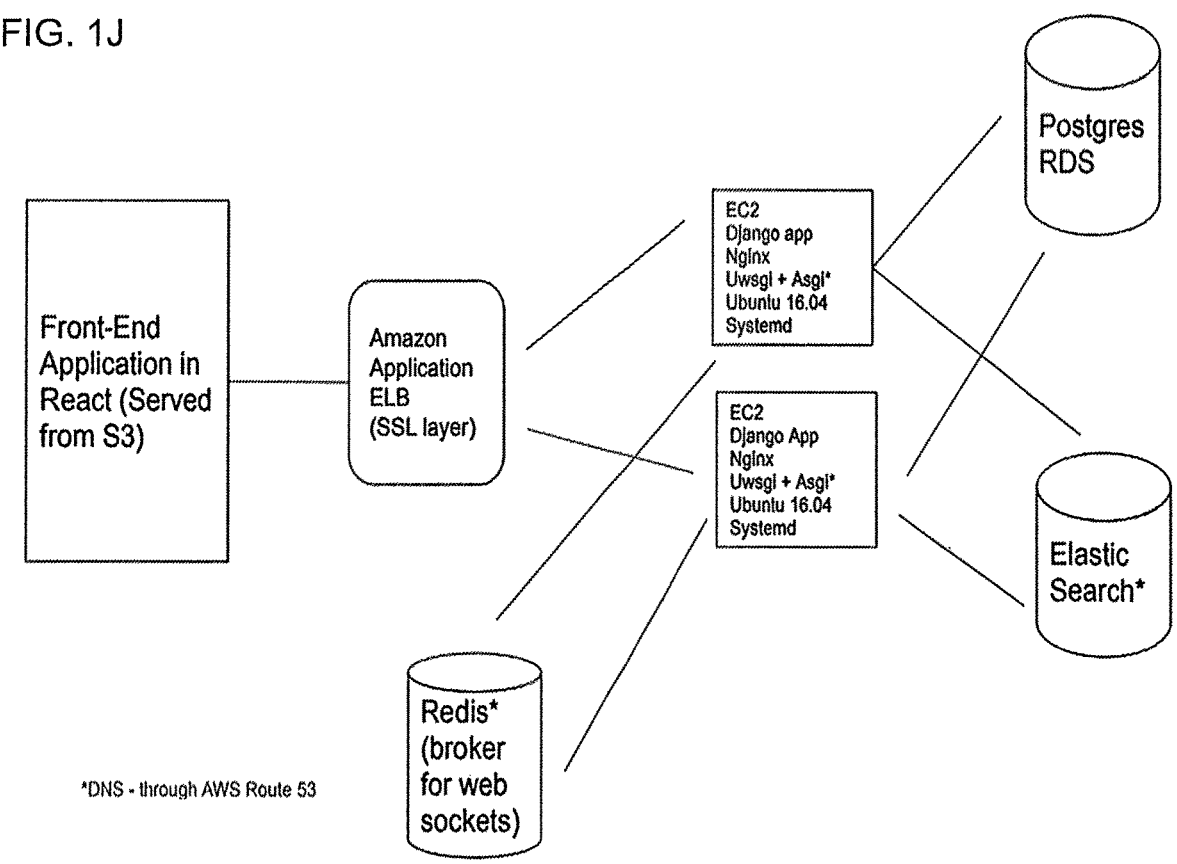
FIG. 1J illustrates aspects of an example communication/collaboration system.

With reference to FIG. 1J, an example communication/collaboration system architecture is illustrated with example components. As similarly discussed with reference to FIG. 1B, the example communication/collaboration system architecture may include a front-end application (optionally implemented using a user interface library for building web applications out of components, such as REACT, and served from a cloud system). An SSL layer may be provided to enable secure communications between the front end and a cloud-based web computing service (e.g., EC2) which may be used to provide the backend processing (see, e.g., FIG. 1B). Optionally, the cloud computing service may provide resizable computing capacity. A database, cache and/or message broker/web sockets broker (e.g., REDIS) may also interface with the cloud-based web computing service. A search engine (e.g., ELASTICSEARCH) may be provided that is deployed via the cloud-based web computing service. For example, the search engine may be a distributed, multitenant, full-text search engine with an HTTP web interface and schema-free JSON documents. The search engine may be configured to process query and return search results, such as those discussed elsewhere herein. A relational database (e.g., POSTGRES RDS) may also be provided that is deployed via the cloud-based web computing service. As discussed above, optionally in addition or instead, a non-relational database (e.g., NoSQL) may be used.

As discussed above, different users at different hierarchies of a given organization may be assigned different permissions and access rights. Further, when users at different organizations are collaborating on an object (e.g., a transaction process involving the supply and acquisition of a product), a first user at a first organization may be permitted to view a first set of data related to the object that a second user at a second organization is not permitted to view, the second user at the second organization may be permitted to view a second set of data related to the object that the first user at the first organization is not permitted to view, and both the first user and the second user may be permitted to view a third set of data related to the object. However, not all of the first set or the third set of data may be of interest to the first user throughout the entire transaction process. Similarly, not all of the second set of data and third set of data may be of interest to the second user throughout the entire transaction process. Further, still different sets of object-related data may need to be presented to other users at the first organization and the second organization based on their respective hierarchy levels and associated permissions and access rights. Thus, using conventional techniques, the process of determining what data to present to who during a transaction, and then rendering user interfaces with such data, is burdensome with respect to processor and memory utilization.

Figure 1K:
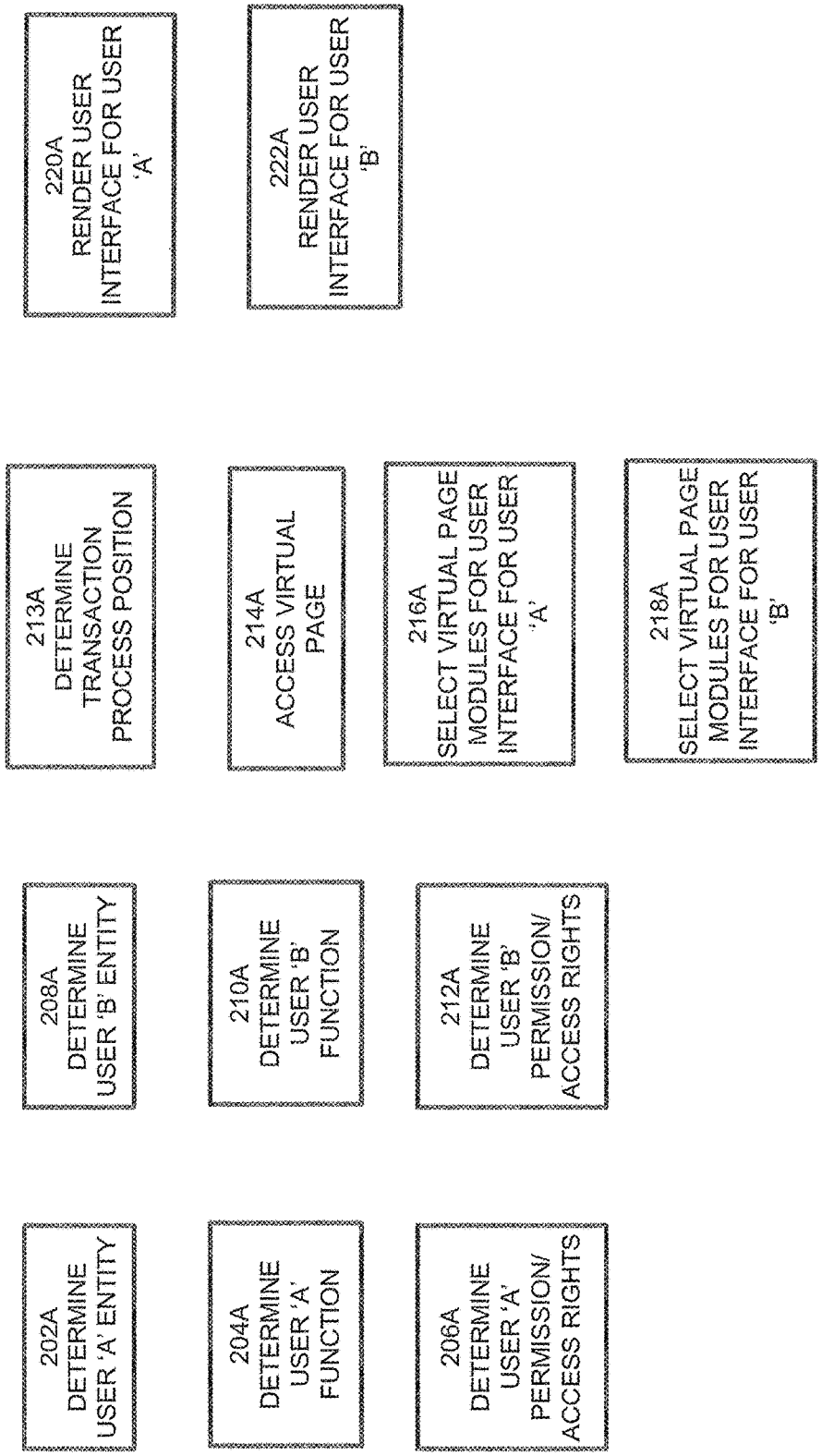
FIG. 1K illustrates an example rendering process using a virtual page.
Figure 1L:
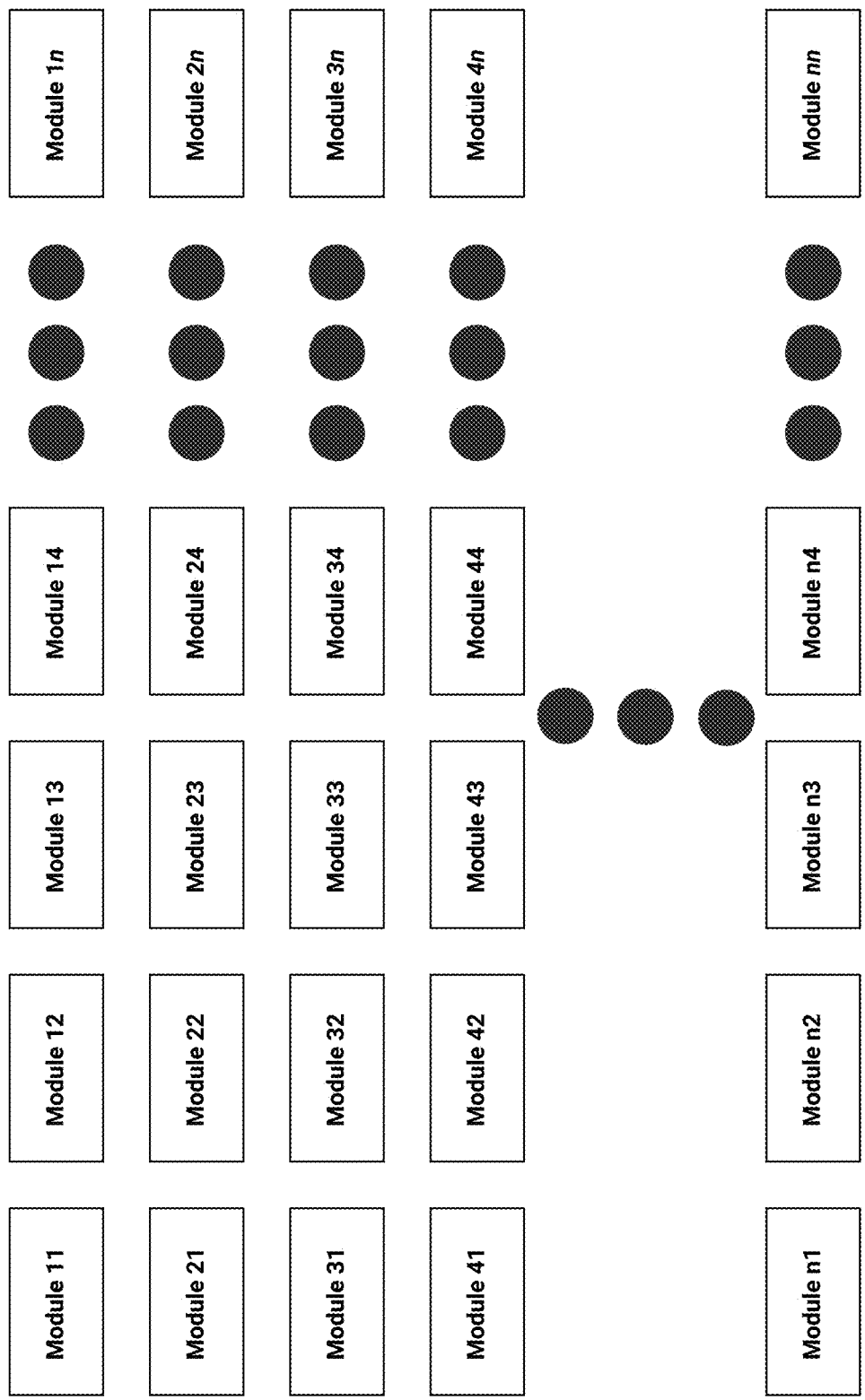
FIG. 1L illustrates an example virtual page.

Thus, as noted above, in order to address the foregoing challenges, a given virtual page may be generated (and maintained in memory) that is associated with a given object (e.g., a project or transaction). With reference to FIG. 1L, the virtual page may include different modules (Module 11 . . . Module nn) used to present different types of data. For example, a first module may be used to present the seller margin on a product that is the subject of a transaction process, a second module may be used to present the buyer margin on the product, and a third module may present a freight on board (FOB) location. By way of further example, a given module may be used to present inter-entity communications between a first entity and a second entity related to a collaboration, another module may be used to present intra-entity communications between users at the first entity, and another module may be used to present intra-entity communications between users at the second entity. The data presented by one module (e.g., intra-entity communications between users at the first entity) may be confidential and not intended to be viewed by a user of the second entity, while other data (e.g., inter-entity communications between the first entity and the second entity related to the collaboration) may be shown to both the first and second entities. Similarly, intra-entity communications between users at the second entity may be confidential and not intended to be viewed by a user of the first entity. Still further, the data presented by a given module may not be of particular interest during certain steps of the transaction process.

When multiple users are collaborating on the same object, each time new data and/or data types are to be displayed to users, the communication/collaboration system may optionally determine which entity a given user is associated with, which user(s) at a given collaborating entity the given user is collaborating with, the permissions associated with a given user, the job function of a given user, and/or the current position of the transaction process (e.g., offer generation, negotiation, purchase order generation, etc.). The communication/collaboration system may use some or all the foregoing information to determine what data is to be shown to a given collaborating user. The communication/collaboration system may then determine which modules of the virtual page are to be displayed to a given user. The modules may then be rendered with the corresponding modules and module data (which may already have been present in the virtual page) via a terminal display of a given user.

An example rendering process will now be described with reference to FIG. 1K. At block 202A a user 'A' accesses the communication/collaboration system (e.g., by logging in). The process determines which entity (e.g., organization 'A') user 'A' is a member of. At block 204A, user 'A's' function is determined. For example, the function (e.g., sales agent, purchasing agent, sales supervisor, purchasing supervisor, etc.) may be determined by the position of user 'A' in the organization hierarchy. The function may be determined from a user function database stored in the data store of the communication/collaboration system. Using the identified function of user 'A', at block 206A a determination is made as to the permissions and access rights granted to user 'A'. For example, the permissions and access rights granted to user 'A' may be retrieved from the data store of the communication/collaboration system. Similarly, at block 208A, a user 'B' accesses the communication/collaboration system (e.g., by logging in). The process determines which entity (e.g., organization 'B') user 'B' is a member of. At block 210A, user 'B's' function is determined. For example, the function (e.g., sales agent, purchasing agent, sales supervisor, purchasing supervisor, etc.) may be determined by the position of user 'B' in the hierarchy of organization 'B'. Using the identified function of user 'B' at block 212A, a determination is made as to the permissions and access rights granted to user 'B'.

At block 213A, the process determines the current position/state of the transaction process (e.g., offer generation, negotiation, purchase order generation, etc.). At block 214A a generated virtual page is accessed from memory. As discussed above, the accessed virtual page may include a plurality of modules displaying different sets or types of data. At block 216A, using the determined permissions and access rights of user 'A' and the determined transaction process position, one or more modules are selected from the virtual page for user 'A' (e.g., those modules that present data that user 'A' is authorized to view and that are relevant to the current transaction process position). Similarly, at block 218A, using the determined permissions and access rights of user 'B' and the determined transaction process position, one or more modules are selected from the virtual page for user 'B'. At block 220A the user interface is rendered for user 'A' using the modules selected for user 'A'. Similarly, at block 222A, the user interface is rendered for user 'B' using the modules selected for user 'B'.

Referring to FIG. 1M, four different user interfaces are rendered using modules selected from the virtual page illustrated in FIG. 1L. User interface 1M(a) with modules 11, 22, 31, and 32 may be rendered via the terminal display of user 'A'. User interface 1M(b) with modules 11, 22, 41, and 44 may be rendered via the terminal display of user 'B'. User interface 1M(c) with modules 11, 12, 22, 23, 31, and 32 may be rendered via the terminal display of a supervisor of user 'A'. User interface 1M(d) with modules 11, 22, 41, 42, 43 and 44 may be rendered via the terminal display of a supervisor of user 'B'. Thus, while there is a certain number of module overlaps for each user in this example, the users of one organization are present with modules not visible to users of another organization, and the supervisors are presented with all of the modules displayed to their subordinates and are also presented with additional modules.

Thus, different users within the same entity may see different subsets of the virtual page, with different data. Further, users at different entities may see different subsets of the virtual page, with different data. Thus, the foregoing process may advantageously use the same virtual page in rendering the different pages for the different users.

As similarly discussed elsewhere herein, optionally, the communication/collaboration system is oriented to providing solutions on an organizational level (e.g., retailer-type entities and supplier-type entities). The platform is configured to address the differences in how these different types of organizations structure themselves and enables explicit definitions of their relationships to each other. Once these relationships are defined within the platform, users from different companies (or other organization-types) may be granted access interact with one another through these defined relationships (e.g., using Channels and Threads).

As discussed elsewhere herein, there may be multiple types of users within organization, where different types of users may be assigned different responsibilities, levels of authority, and/or permissions. By way of illustrative example, a retailer may have users with the following titles/roles: retailer administrators, department managers, and category buyers, supplier companies have supplier administrators, sales managers, sales representatives, and/or the like. Examples of differences in their permissions and workflows are discussed herein. Example workflows correlating with different user roles are discussed herein.

Figure 2A:
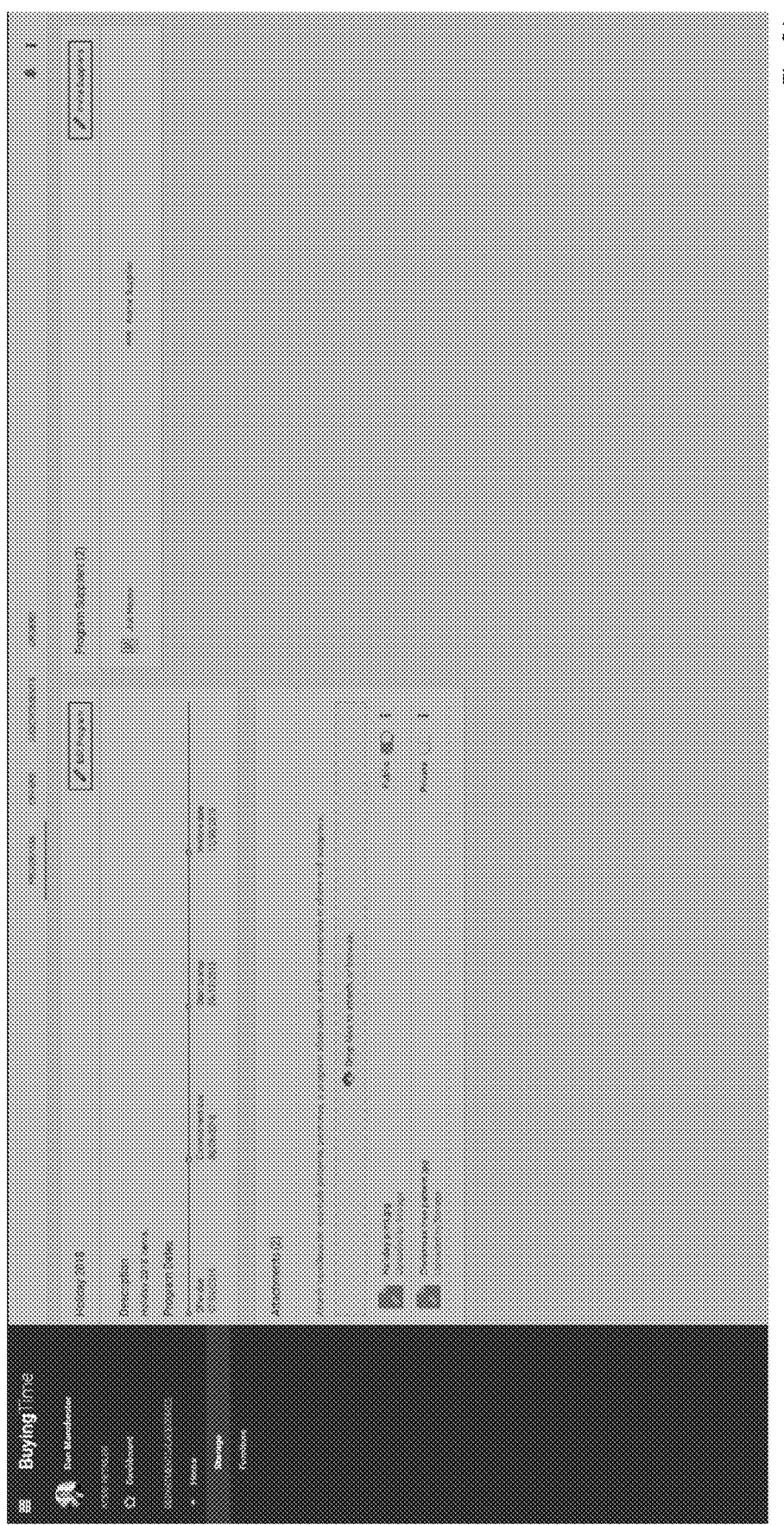

In general and with reference to example user interfaces, the user interface navigation pattern provided by the platform may comprise a user choosing a specific workflow to which the user has been granted access (e.g., via a collapsible left navigation bar illustrated in relevant user interface), the states of the workflow may then optionally be distinguished (e.g., as tabs across the header of the user interfaces within the workflow), and the remaining screen area may be comprised of objects, information, functions, and/or communication that are utilized in the selected workflow as selected from a virtual page as described above (see example navigation user interface illustrated in FIG. 2A).

Figure 1N:
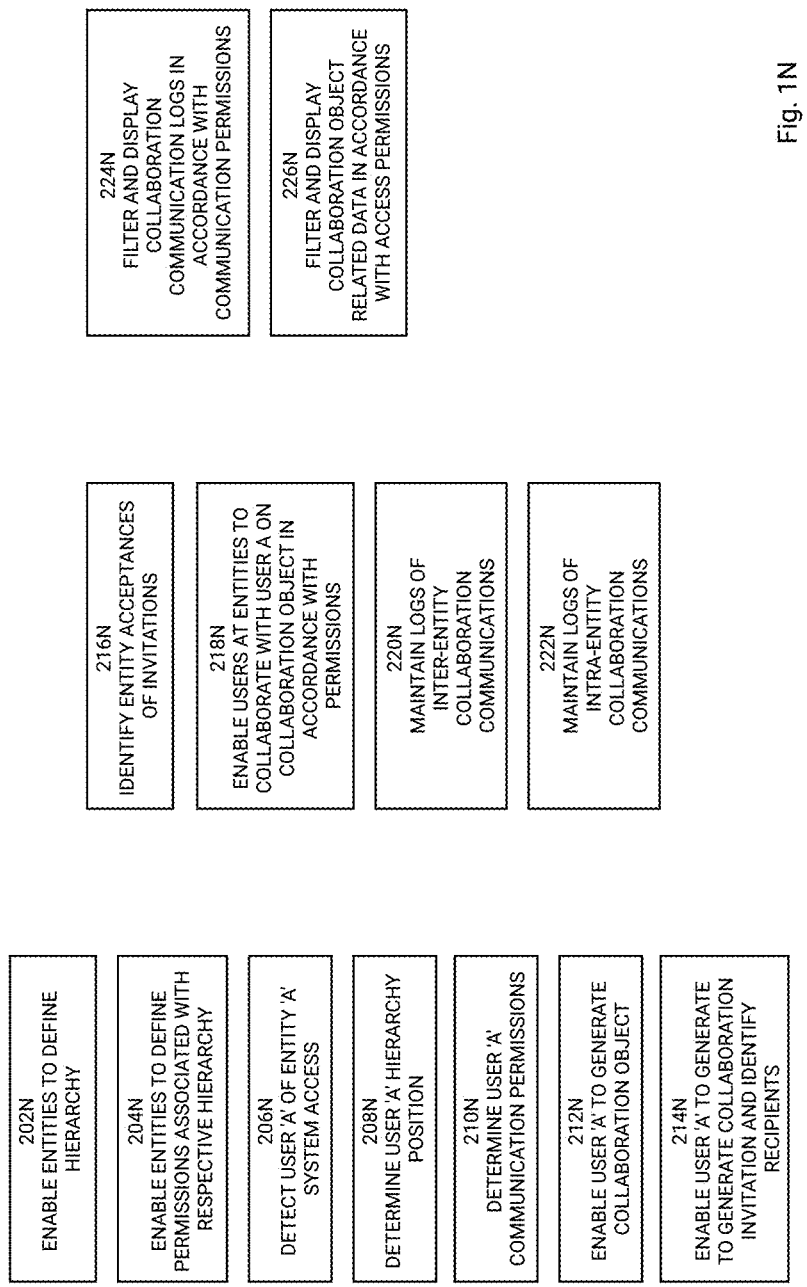
FIG. 1N illustrates an example communication process.

Referring to FIG. 1N, and example communication collaboration process is described that may be executed using the communication/collaboration system. At block 202N, entities (e.g., retailer, suppliers, etc.) are enabled, via respective user interfaces, to define internal hierarchies of personnel and/or functions (e.g., company president, group vice president, manager of product acquisition and program definition, purchasing agent, etc.). A given user at the entity may be assigned to a given hierarchy position, where optionally multiple users may be assigned to the same hierarchy position (e.g., purchasing agents for home furnishings). The hierarchies may be saved in the communication/collaboration system data store and/or in respective entity enterprise data stores.

At block 204N, the entities are enabled to define certain permissions for a given hierarchy position and/or a user at a given position. The permissions may include communication permissions. For example, the permissions may indicate what other entities a given user/functional position is permitted to communicate with, regarding what types of objects (e.g., product type purchases/sales) a given user/functional position is permitted to communicate about, what types of communications a user is permitted to communicate (e.g., makes sales offers, making purchase order, etc.), and/or the like. In addition or instead, the permissions may indicate what data or data-types a given user is permitted to access. For example, a manager may be granted access to communications and/or purchase data for all of the manager's subordinates, while a subordinate may only be able to views the communications she is engaged with. By way of further example, certain types of data (e.g., profitability data for a department) may only be provided to those above a specified hierarchy level.

At block 206N, a user of a given entity (user 'A' of entity 'A' in this example) accesses the system (e.g., logs in to the system using appropriate credentials, such as UserID, password, biometrics, and/or the like). At block 208N, using an identification of the user obtained from the user's credentials, the user's position in her entity's organization is optionally determined from the defined hierarchy assignments. At block 210N, the user's communication permissions are determined (e.g., based on the user's hierarchy position or via communication permissions stored in association with a user record). At block 212N, the user is enabled to generate a collaboration object (e.g., using the user interfaces described herein). As discussed elsewhere herein, a collaboration object may be a project, a product offer, a purchase program, a document, a transaction, and/or the like.

At block 214N, the user is enabled to generate a collaboration invitation with respect to the collaboration object. The user may be limited to issuing the invitation to those entities that the user's communication permissions permit. Optionally, a listing of potential invitees is presented from which the user may select, where the listing is filtered to those entities the user is permitted to communicate with regarding the collaboration object.

At block 216N, acceptances to the invitation are received from one or more of the invited entities. Optionally, an invitation is associated with an expiration date specified by the inviting entity, wherein if the entity has not accepted the invitation prior to the expiration date, the invitation is disabled so that the invitee is inhibited from collaborating on the collaboration object.

At block 218N, the user and one or more other users at the entities that accepted the invitation are enabled to collaborate on the collaboration object (e.g., using the interfaces described herein). For example, users may exchange data, images, propose delivery times, collaboratively agree on product characteristics, packaging, shipping, and/or the like. Optionally, the collaboration is performed on a one-to-many basis, where the user that issued the invitation is separately collaborating with each entity, but the invited entities are not collaborating with each other. For example, if the collaboration object is a transaction for the acquisition of a product, the user that issued the invitation may receive separate proposals/offers from respective invitees, may evaluate such proposals/offers, and may negotiate separately with the entities that submitted the proposals/offers. By way of example, the offers may be presented via an offer inbox that may be organized by data or grouped based on whether the offers have been reviewed, not reviewed, responded to, and/or using other grouping categorizations.

At block 220N, logs of communications between the user and the invited entities regarding the collaboration object may be generated and maintained (an inter-entity communication log). The communications may include text communications (e.g., via an instant message communication, email, or otherwise), images, videos, audio, documents, and/or the like. The communications may include questions, instructions, comments, offers, and/or counteroffers related to the collaboration object as discussed elsewhere herein.

At block 222N, logs of communications between the user and other users within the user's entity regarding the collaboration object may be generated and maintained (an intra-entity communication log). The communications may include text communications (e.g., via an instant message communication, email, or otherwise), images, videos, audio, documents, and/or the like. The communications may include questions, instructions, comments, and/or the like.

At block 224N, communication logs may be presented via respective systems to users at the various entities participating in the collaboration. The displayed logs may be filtered so that that a given viewing user accessing the communication/collaboration system is only presented with collaboration communications the user is entitled or has permissions to view. For example, a given user at an invited entity may be presented with the communications between the given user and the entity that issued the invitation regarding the collaboration object, as well as communications between the given user and other users at the given user's entity. However, the displayed communications may exclude communications between users at the entity that issued the invitation and may further exclude communications between the entity that issued the invitation and other invited entities.

At block 226N, data associated with the collaboration object may be filtered and displayed to a given user in accordance with associated access permissions. For example, as similarly discussed above, a user at a given entity may be permitted to view certain data (e.g., the margin for a given product) and not other data (e.g., the total profitability of sales for the company as a whole). By way of further example, a user at one entity may be prevented from accessing and viewing data from an enterprise database of another entity.

Certain example user interfaces, including graphical user interfaces, will now be described. The user interfaces may be provided by the communication/collaboration system as web pages from a cloud system (e.g., for display via a user web browser) and/or the user interfaces may be provided via a dedicated application hosted on a user or other device. The data displayed via the user interface may have been entered by a user and/or may have been accessed from or using the communication/collaboration system or other system. For example, the user interfaces may be populated from data accessed from the communication/collaboration system data store or administrator or other authorized user, a supplier system data store or supplier authorized user, or an acquirer system data store or acquirer user, as appropriate.

With reference to FIG. 2A, the left side of the example user interface includes a name and image of the current retailer user, the name of the retailer, a control that enables navigation to a dashboard, and a hierarchy tree of departments/categories, including departments/categories (e.g., products for the "Home"), and sub-departments/sub-categories (e.g., storage, furniture, etc.). The illustrated user interface further includes information on one or more buying programs, including the name/description of the program (e.g., "Holiday 2018"), the milestone dates associated with the program (e.g., offer due date, commitment due date, start to ship date, in-store date, and/or the like). The milestones and milestone date are optionally graphically depicted (e.g., using a line with milestones and milestone dates proportionally indicated). Optionally, the user interface includes one or more media file attachments (e.g., image files of patterns, trend boards, pantones, program slide deck, etc.) to share with suppliers. Optionally, a control may be provided for each attachment indicating whether the attachment is public or private. Such public/private designation may be utilized in determining who may access the attachment. For example, a private document may only be shared by buyer personnel, and a public document may be shared with suppliers. One or more program suppliers may be listed, including a supplier name. A control may be provided that enables the user to invite additional suppliers to bid on the program. In response to activation of such invite control, the invitation may be transmitted to the corresponding supplier.

Figure 2B:
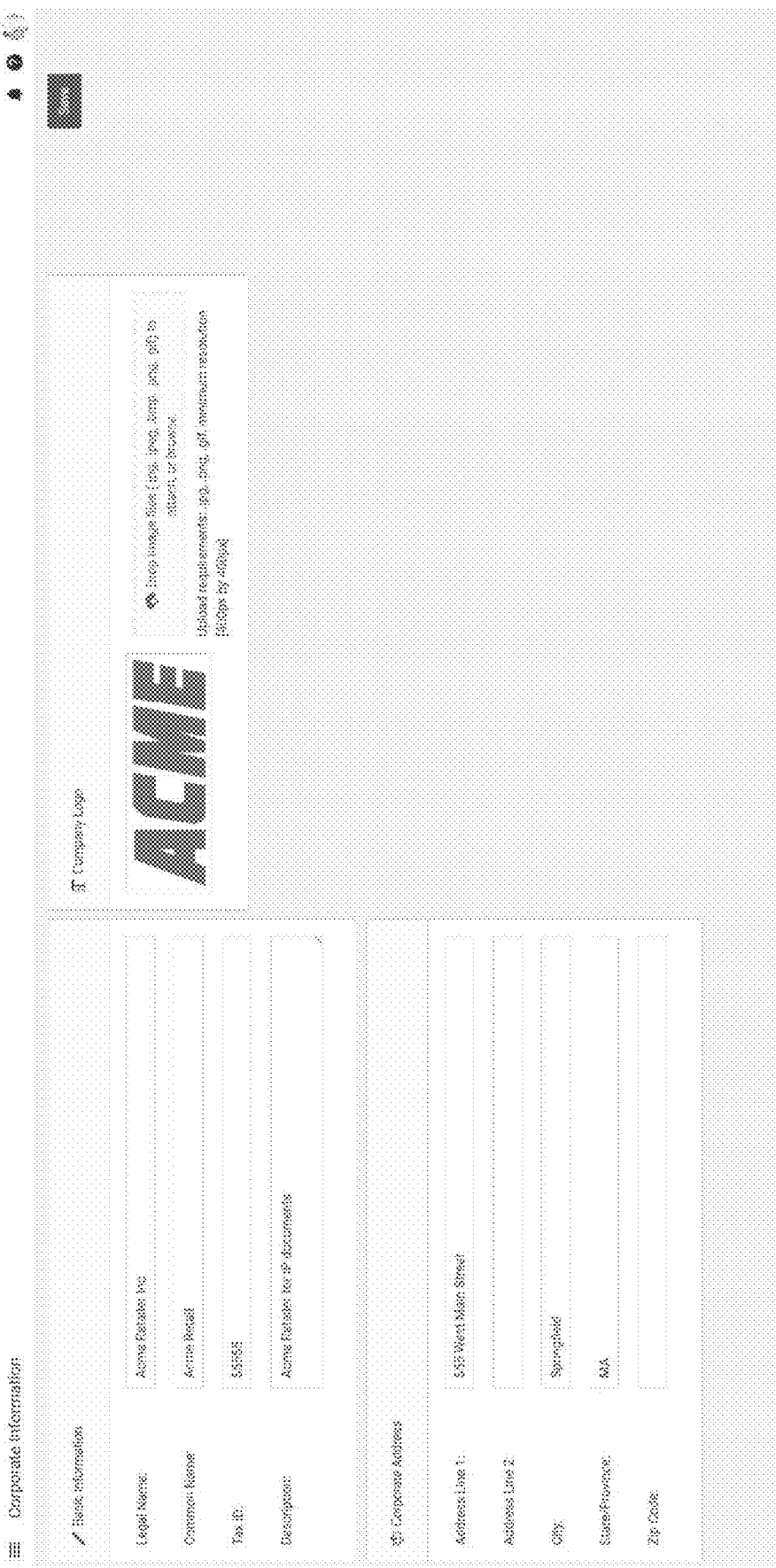

With reference to FIG. 2B, an example retailer administrator user interface is illustrated. The illustrated user interface may be utilized by a user (e.g., an administrator) to input/edit information about the retail company (e.g., identifying information such as legal name, trade name (DBA), federal tax identification number, address, logo, textual description, and/or other information) via corresponding fields. The logo (or other graphic/image file) may be dragged and dropped onto the user interface to upload the logo to the communications system. Activation of a save control enables the entered data to be saved on the communications system. The user interface and/or communication/collaboration system may incorporate error checking for expected data types and compliance with rules (e.g., checks for empty field, check that the correct file type is being uploaded for logo, checks that the logo image meets minimum and/or maximum resolution requirements, etc.).

Figure 2C:
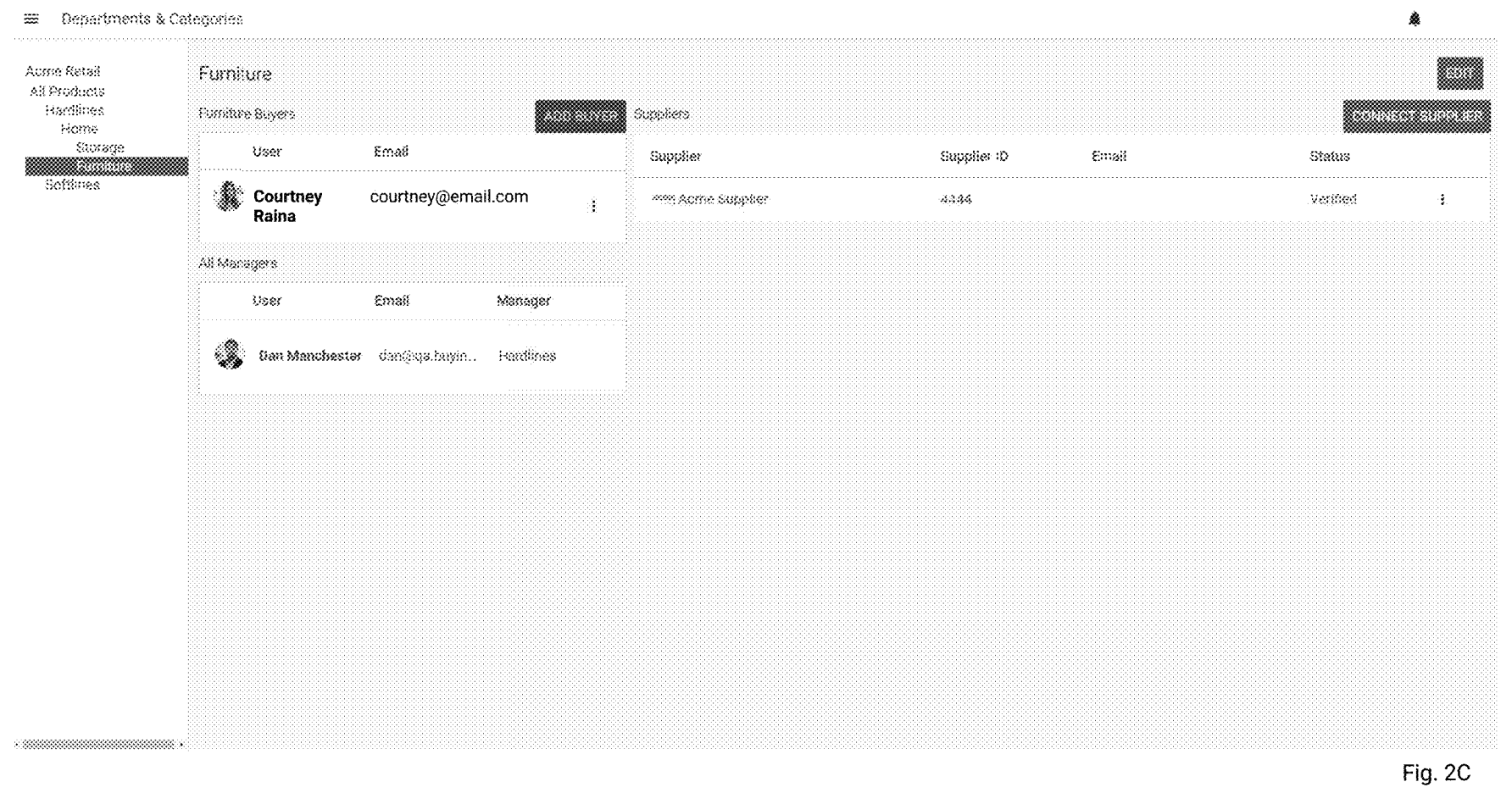
Figure 2D:
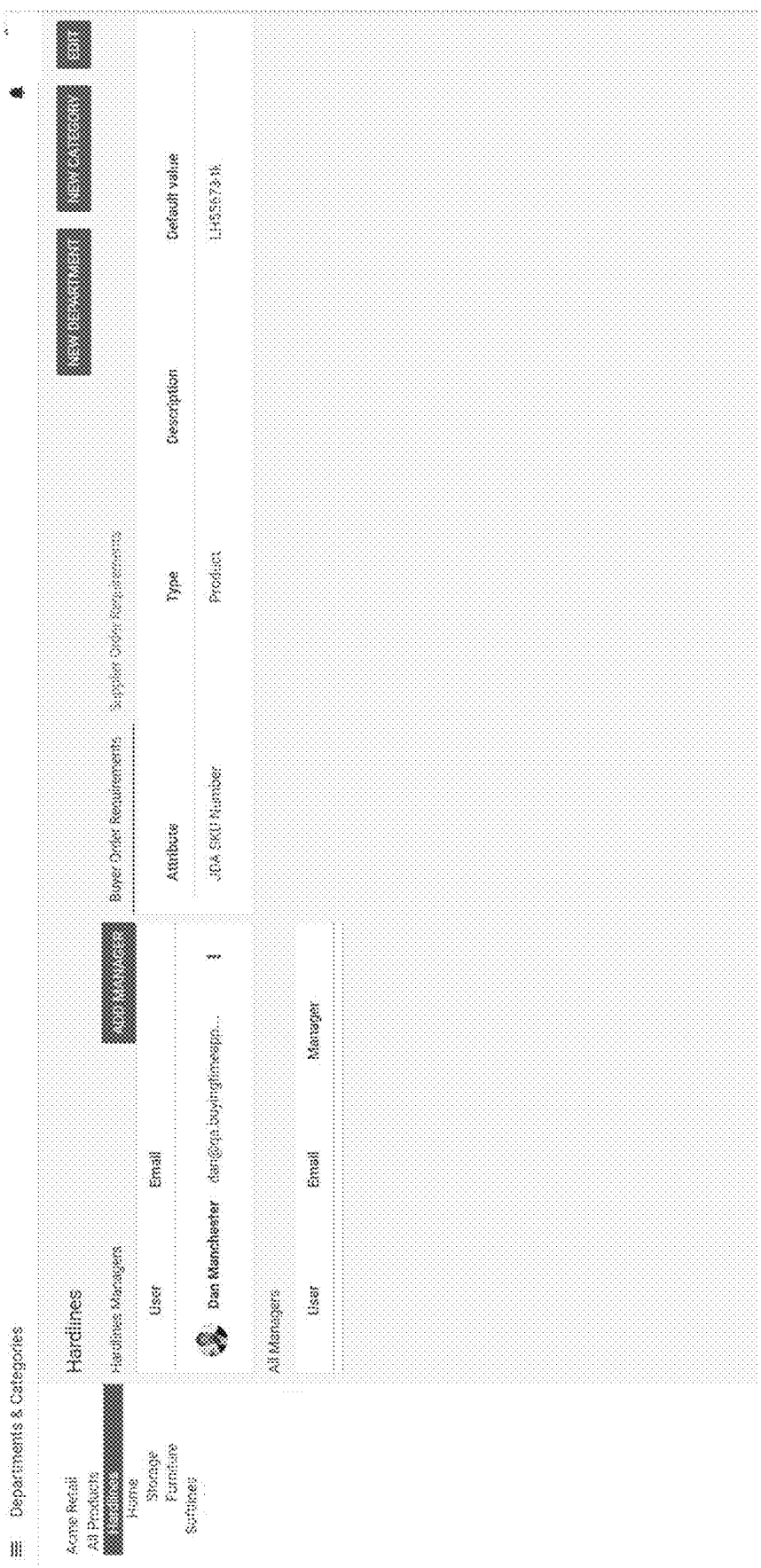

FIGS. 2C and 2D illustrate example "Department and Categories" user interfaces. Optionally, only users with administration/management authority are granted editing permissions with respect to these user interface. The illustrated user interfaces may be utilized by a user (e.g., an administrator) to define the organizational structure/hierarchy of the company (e.g., composed of parts such as "Departments" and "Categories"), assign users within the company to a department or category, provide access to one or more parts of the organization, and to grant supplier companies access to interact with the retail company and its users (e.g., specified users) via one or more parts of the company.

With reference to FIGS. 2C and 2D, the user interfaces may include an expandable/collapsible tree representation of the organizational structure (see the example left panel). Users may utilize the tree to select, view and edit different parts of the organization and to alter the structure of organization.

A user interface may access and display, in a user access area, a list of users who have access to the part of the organization selected in the previously described organizational structure user interface. Optionally, the user interface textually and/or graphically draws distinction between users who are assigned directly to that part of the organization versus users who have inherited access to that part of the organization because of assigned permissions to a parent branch of the organizational hierarchy (e.g., furniture buyers vs. all managers). The user access area interface may also be optionally utilized by users to add additional users to the selected part of the organization.

Another section of the user interface may be configured based on whether the user selected a Department or Category via the organizational structure user interface. If a Department is selected then this section of the user interface may display a table element containing information on order requirements, order product requirements, and/or order product component requirements, including both those that are assigned to and those inherited by that department. In addition, a user interface may be provided that enables the user to add or edit requirements assigned to the selected department. Optionally, the user interface accesses and provides for display (e.g., via respective tabs) both buyer order requirements and supplier order requirements. If a Category was selected via the organizational structure user interface, then this section of the user interface displays (optionally all) supplier companies that have access to interact with this part of the organization via sending and receiving workflow related objects and communications. This section also provides the function and controls that enable the user to add, edit, or restrict suppliers that can interact with the selected Category (e.g., using edit controls). Thus, the system enables integration with multiple entities and corresponding systems. Requested and accessed data may be specific to the requesting entity (rather than standardized across entities). Thus, a given entity can specify what information may be pulled from or pushed to specified systems.

Example controls that may be provided may include edit controls, connect supplier controls, add manager controls, add new department controls, add new category controls, and/or the like.

Figure 2E:
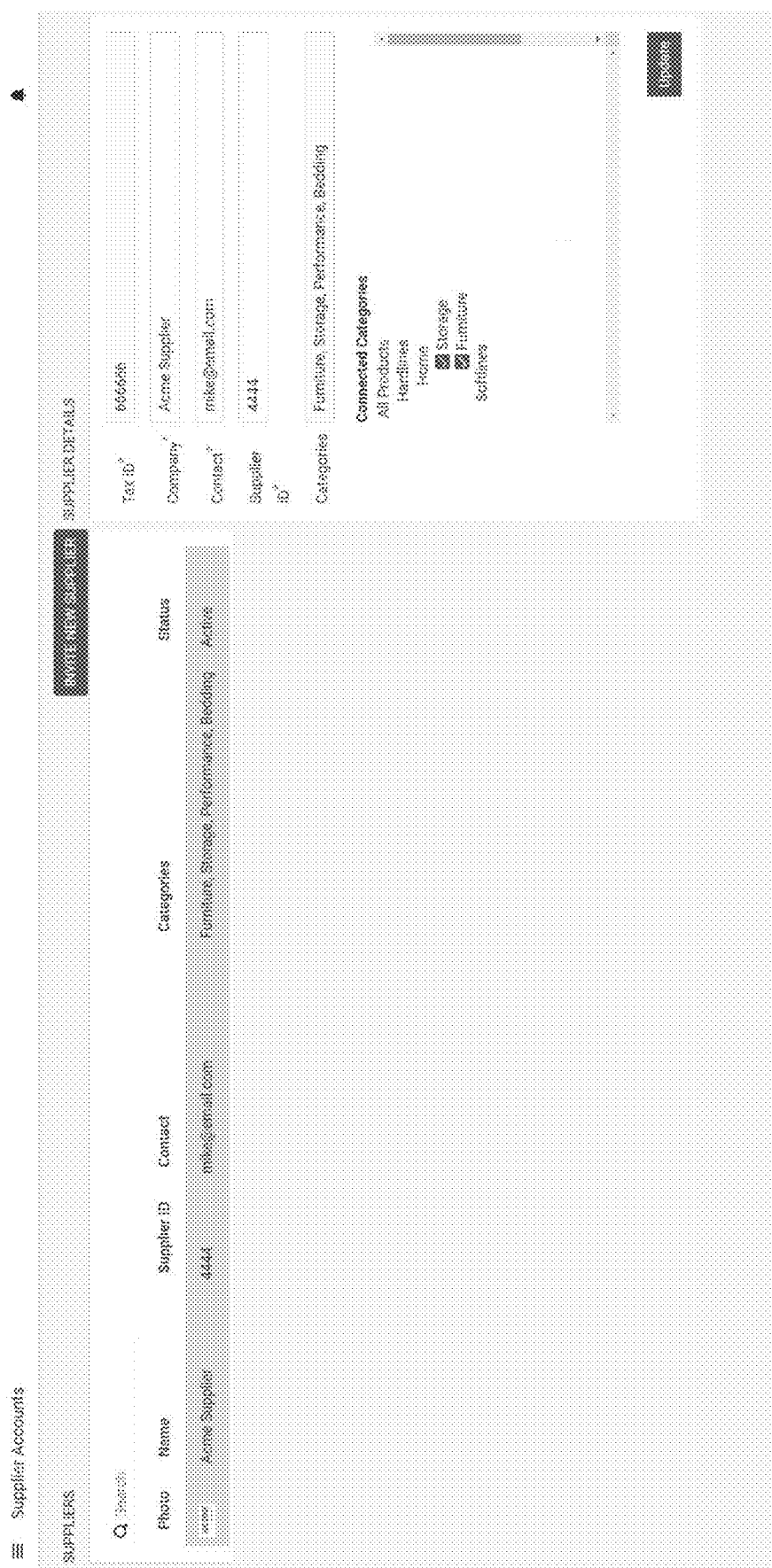
Figure 2F:
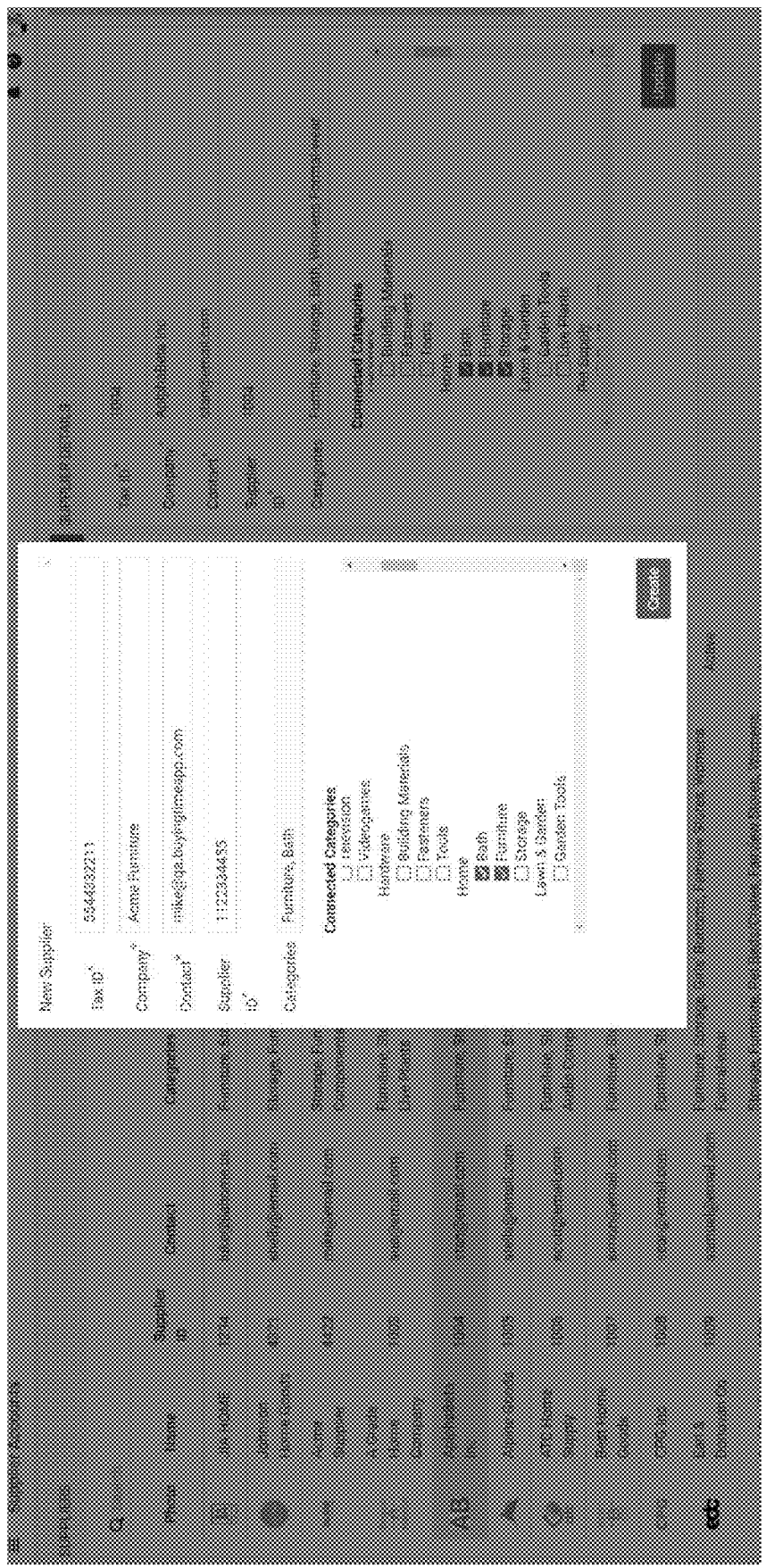

FIGS. 2E and 2F illustrate a supplier accounts user interface. For example, the "Supplier Accounts" user interface may be accessed by a retailer administrator to view, add, and edit supplier company permissions to access and interact with parts of the retailer company organization. The "Supplier Accounts" user interface may enable Channels and Threads relationships to be defined and displayed.

In the example user interface illustrated in FIG. 2E, distinct sections with distinct functionality are graphically defined. In this example, the section on the left/middle portion of the user interface displays a table comprised of suppliers that have a defined relationship (Connection) with the retailer company on the communication/collaboration systems, optionally including the supplier name, logo, retailer unique supplier identification strings, contact information (e.g., email address, sms address, phone number, etc.), categories the supplier has been granted access to interact with (e.g., to submit offers on), and status information (e.g., active, inactive, etc.). The user may select individual suppliers in this table.

The right portion of the example user interface illustrated in FIG. 2E illustrates supplier details and is comprised of a form that both displays the information about the supplier selected via the table (e.g., Supplier Tax ID, company name, supplier contact, supplier ID, connected categories) and enables the user to alter the selected supplier's access to parts of the retailer organization ("Categories"). For example, a checkbox may be provided in association with a given category or sub-category, and the user may check the box to provide access to the respective category or sub-category, or uncheck the box to deny access to the respective category or sub-category. Optionally, the categories and sub-categories are displayed using a hierarchical tree. This section thus may display "Threads" that have been created between the retailer company and the selected supplier company.

A search user interface may be provided configured to receive a search query to find a supplier record. In response to receive a textual search query, the system may query a database of supplier records, identify matching supplier records, and provide those records for display, optionally in ranked order according to relevance or closeness of match.

FIG. 2F illustrates an example modal window user interface that is accessed via the supplier accounts user interface illustrated in FIG. 2E that is utilized to establish initial connection/relationship/"Threads" between the retailer and a given supplier company. A user may enter a supplier tax ID and supplier ID, and supplier companies are matched for this initial connection using federal tax id as a primary key and retailer ID as a single use "password" to verify authenticity. Email for one or more primary contacts of the supplier company is also collected so that suppliers that have not already created a supplier company on the platform have people in their organization contacted and notified via email. The modal user interface may display supplier tax ID, company name, supplier contact, supplier ID, and connected categories.

Figure 2G:

FIG. 2G illustrates an example "User Accounts" user interface which may be utilized by a user (e.g., retailer administrators) to create new users and to edit existing user information and permissions within their retail company. When creating a new user information is collected such as name, email address, user type, employee ID, title, assignment (e.g., to products, categories, or other portions of the retail company), access to parts of the retailer organization, and/or status.

In the illustrated example user interface, graphically distinct sections are provided. The left/middle section is comprised of a table of users and related information such as name, photo/image, email address, assignment, title, status, and/or additional information. The users listed in this table are selected by the retailer administrator user. This section of the screen also has a function to collect information on retailer employees that are being newly created in the platform. The right section of the user interface is comprised of a user details form that enables a user to view and edit information and permissions about the user selected via the user table. This section includes information such as name, email address, user type, employee ID, employee permissions to parts of the retailer organization (assigned departments and categories, optionally displayed as a hierarchical tree), and managing department. For example, with respect to assignments of departments and categories, check boxes may be provided enabling a user to select or unselect departments and categories for which the user is a manager. Optionally, selection of a department or category, will also assign the user as manager to any sub-departments or sub-categories.

Certain example supplier-side user interfaces will now be described.

Figure 2H:
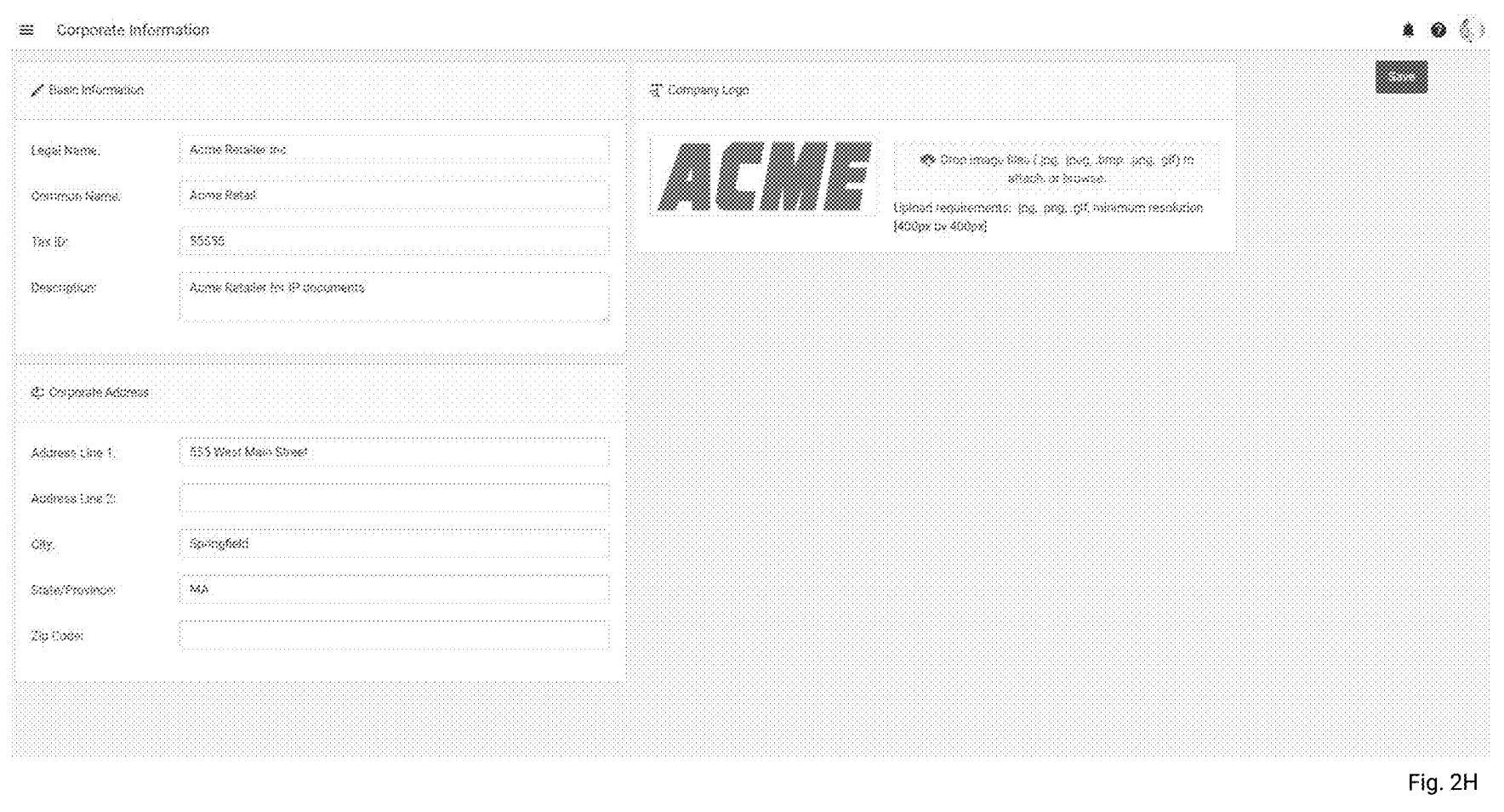

With reference to FIG. 2H, an example supplier administrator user interface is illustrated that enables a user (e.g., a supplier administrator) to input/edit information about the user's supplier company (e.g., identifying information such as legal name, trade name (DBA), federal tax identification number, address, logo, textual description, and/or other information). The supplier logo may be dragged and dropped onto the user interface to upload the logo to the communications system. Activation of a save control enables the entered data to be saved on the communications system. The user interface and/or communication/collaboration system may incorporate error checking for expected data types and compliance with rules (e.g., checks for empty field, check that the correct file type is being uploaded for logo, checks that the logo image meets minimum and/or maximum resolution requirements, etc.).

Figure 2I:
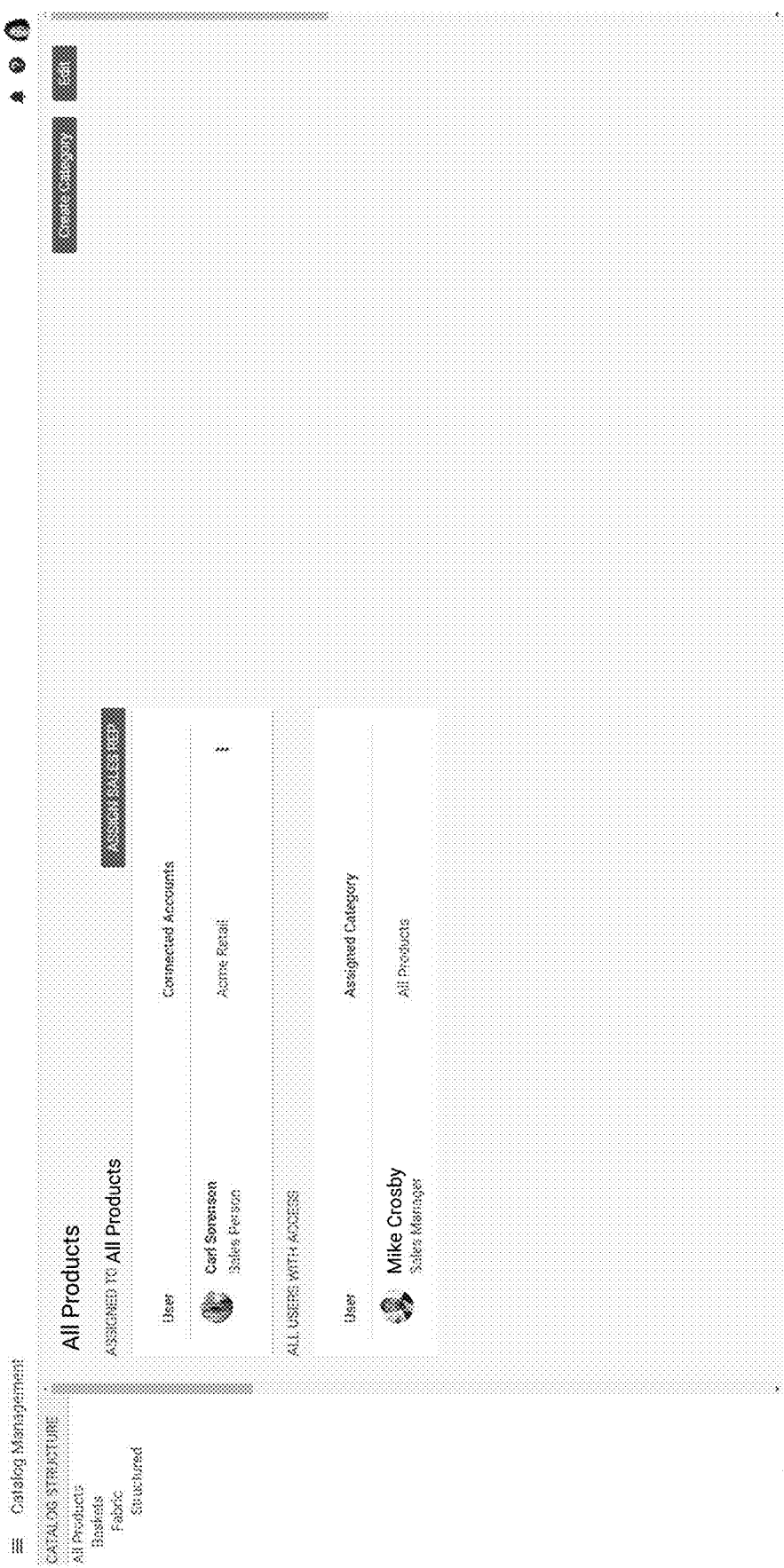

With reference to FIG. 2I, an example catalog management user interface is illustrated that enables a user (e.g., a supplier administrator) to organize the supplier's electronic product catalog and assign supplier users permissions to part or all of the catalog. The product catalog functions as file path folder system where the equivalents of folders are called "Product Categories" and the analog to files are "Products." A given product is assigned by a user (individually or in batch mode) to a product category.

In the illustrated example catalog management user interface, distinct sections are graphically defined. In this example, the leftmost section ("Catalog Structure") is a container comprised of a selectable, expandable and collapsible tree element that represents the structure of product categories within the product catalog. The Catalog Structure user interface enables a user to select a product category, and once selected, an edit user interface enables the user to edit product categories and to create new "nested" children product categories. A product catalog section of the user interface lists users (e.g., including a user photograph, name, title, connected accounts) that have access to the selected product category. The illustrated tables optionally visually and/or textually distinguish users who are assigned to the selected product category from users who have inherited permissions to the selected product category from an assignment to a parent of the selected product category. User access can be granted or altered in this section as well.

Figure 2J:
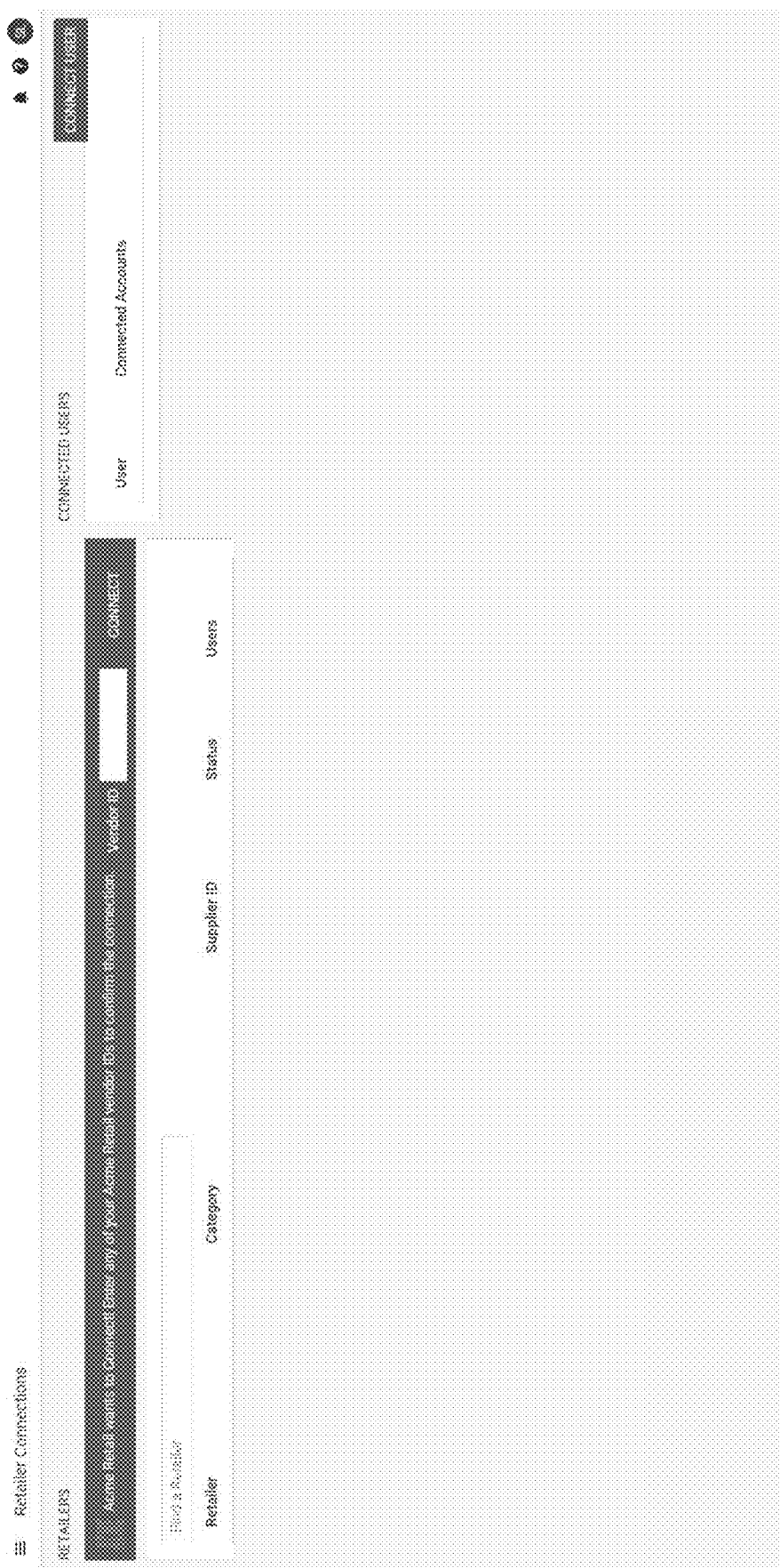

FIG. 2J illustrates an example retailer connections user interface. In this example, the user interface indicates that a retailer sent an invitation to the supplier indicating that the retailer wants to connect to the supplier. The displayed invitation includes a prompt to enter an identifier (a vender ID provided by the retailer) to confirm the connection, and a field is provided to receive the connection. A connect control is provided, which when activated causes acceptance of the invitation to be transmitted to the communication/collaboration system, and from the communication/collaboration system to the retailer. A search user interface may be provided configured to receive a search query to find a retailer record. In response to receive a textual search query, the system may query a database of retailer records, identify matching retailer records, and provide those records for display, optionally in ranked order according to relevance or closeness of match.

A user (e.g., a supplier administrator) may utilize the "Retailer Connections" user interface to verify connections with retail companies who have granted that supplier company access to one or more of their Categories (Threads), and to manage user permissions on which users from the supplier company have access to the Categories (Threads) from the connected retailers.

Figure 2K:
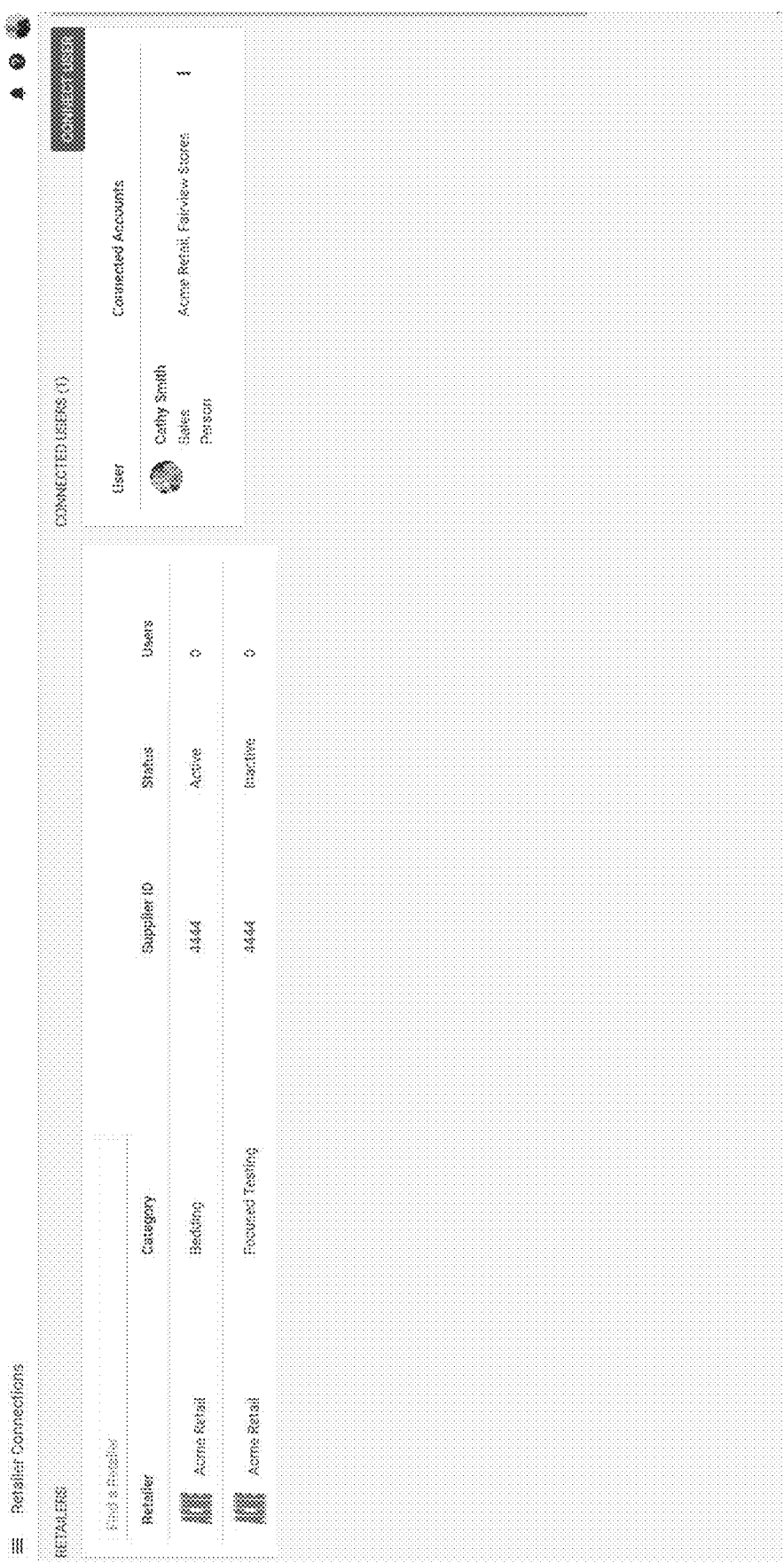

FIG. 2K illustrates an example retailer connections user interface, optionally with graphically/textually distinct sections. In this example, a retailers section provides a table of retailer companies with associated information (e.g., logo, company name, category, supplier ID, status, and/or other information). The user interface enables a user to select a table entry. In response, in a connected users section, the user interface accesses and displays a table of users within the supplier company who have permission to access the selected category. The example table contains information about a given user (e.g., name, title, picture, list on connected accounts, and/or other information). Edit controls may be provided that enables a user to be added or deleted.

Figure 2L:
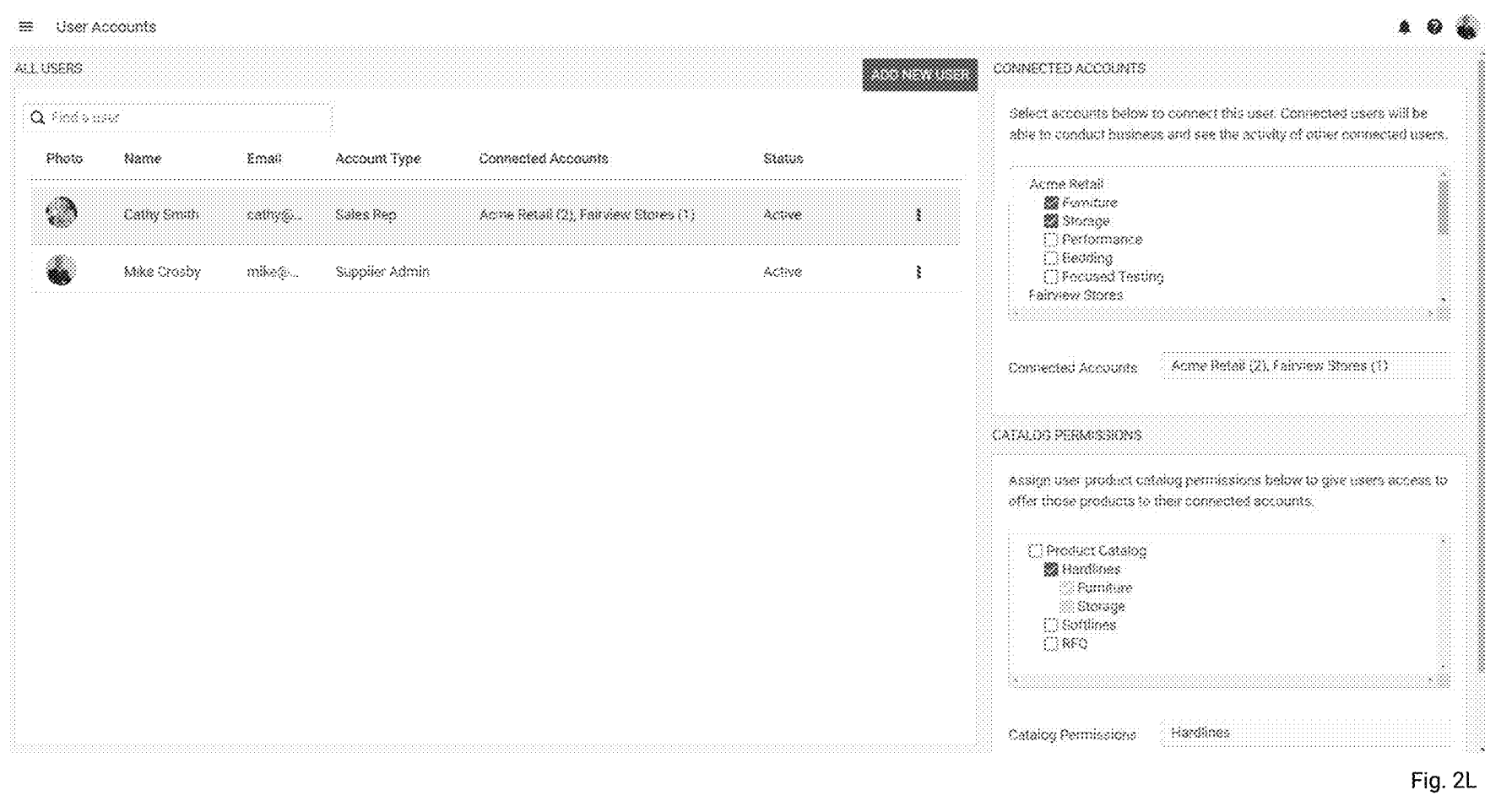

FIG. 2L illustrates an example "User Accounts" user interface which may be utilized by a user (e.g., a supplier administrator) to add new users and edit existing user information and permissions within the supplier company. The user interface may also enable the supplier administrator to interact with connected retail company categories via threads. In response to activating an add new user control, an interface may be provided via which new user data may be received and stored (e.g., name, email address, user type, employee ID, title, access to parts of the supplier's catalog (Product Categories), and access granted to interact with retailer categories the supplier is connected with via threads.

In the example illustrated in FIG. 2L, graphically/textually distinct sections are provided. The left/middle section ("All users") is comprised of a table of users and their related information such as name, photo/image, email address, status, title, connected accounts and/or other information. A user (e.g., a supplier administrator) may select users listed in this table. The right section of the user interface is comprised of a connected accounts interface and a catalog permissions user interface which respectively display for the selected user the access permissions to access the retailer categories (threads) and the product catalog (product categories). The check boxes are provided in association with respective hierarchical parent-child structures via which the supplier user may add or delete permissions for the selected user (e.g., add or delete retailer categories/sub-categories and/or catalog categories/sub-categories). A deactivated products tab is provided, which when activated, causes a list of no-longer available products, that had previously been available via the catalog, to be accessed and presented.

Example user interfaces related to the supper catalog workflow will now be described.

With reference to FIG. 3A1, and example supplier product catalog user interface is illustrated. In the illustrated user interface, images of products are provided in association with a product identifier and an product category. A product category filter user interface is provided via which the user can select one or more categories to view. A search field is provided via which a user may enter a search query (e.g., a product name, a product identifier, product characteristics, product category, values from the product fields such as description, price, material, color, size, quantity in a set, etc.), and in response a search engine will locate matching products which will be provided for display to the user. Optionally, the search results will be in rank order based on the relevance or closeness of a given match.

Some or all of the supplier users may be granted access to the illustrated user interface. Optionally, only a designated subset of supplier users (e.g., supplier administrators and/or sales managers) are provided the ability to edit the product organization (e.g., by changing, for a given product, the product category to which it is assigned).

Multiple views of the product catalog may be generated and displayed, such as the example views illustrated in FIGS. 3A1 and 3A2. FIG. 3A1 provides a representation of the product catalog with product images as the primary indicators of products, which is referred to herein as a "Product Card" representation of a product. This product card changes appearance in response to detecting that the user is focusing on the product card (e.g., hovering over the card with a mouse, trackpad, stylus; selecting/clicking on the card, staring at the card, etc.). Upon detecting the user focus on the product card, the user interface accesses and displays additional information on the product details are revealed.

In another view, illustrated in FIG. 3A2, a table representation of the product catalog may be provided, where images are relatively smaller than in the product cards and more information about the products (e.g., textual description, category, sales rank, dimensions, materials, colors, weight, and/or other information), is constantly visible in the table format. Checkboxes may be provided via which a user can select products by clicking the checkbox on the product card or product row. A toggle control may be provided that enables a user to toggle between the image view of FIG. 3A1 and the table view of FIG. 3A2 (e.g., via clicking the grid and table icons).

Figure 3B:
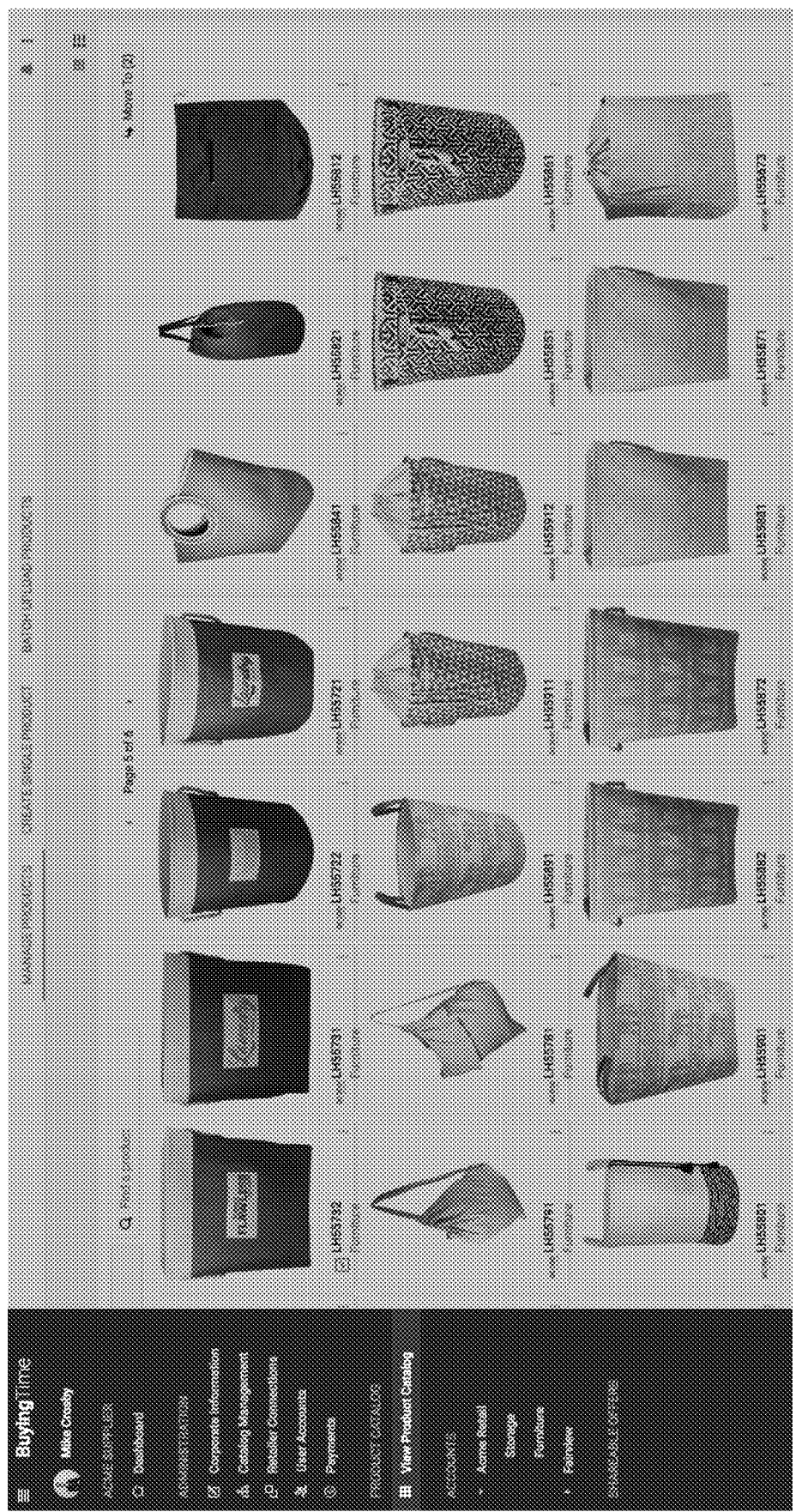

FIG. 3B illustrates the catalog user interface of FIG. 3A1, with a navigation toolbar exposed on the left side. The navigation pattern within the application may include a user selecting a part of the application corresponding to distinct workflow objects, and functions provided via the navigation toolbar. The workflow steps may then be displayed across the top center portion of the user interface and the corresponding objects and functions in the main area of the screen.

The "Product Details" catalog user interface may acts as a centralized source of information about a given product. For example, users may navigate to the "Product Details" user interface to view some or all of the product information. Certain users (e.g., supplier administrators and sales managers) may be provided with edit control so that they have the ability to edit the product's information.

Figure 3D:
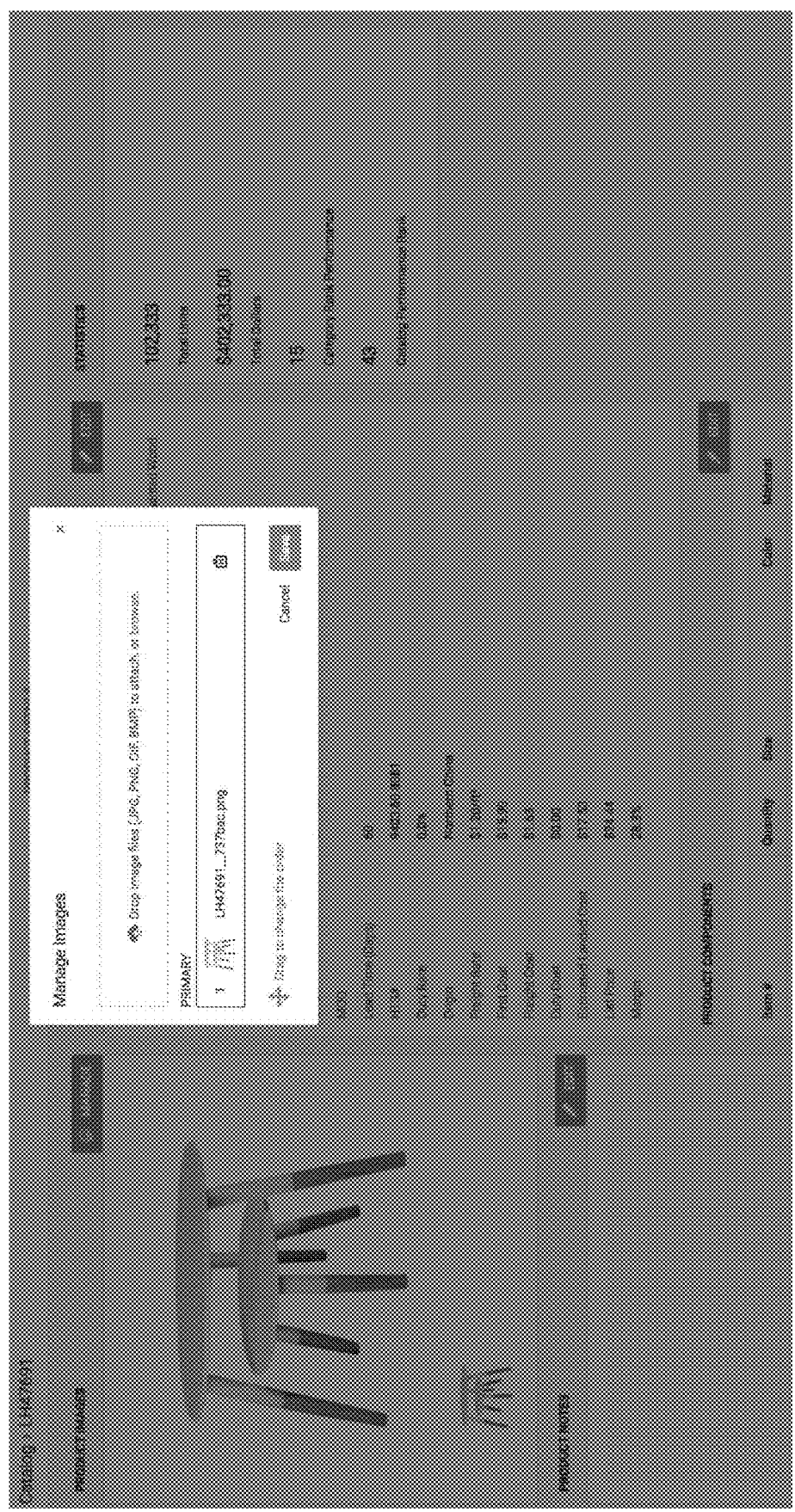
Figure 3E:
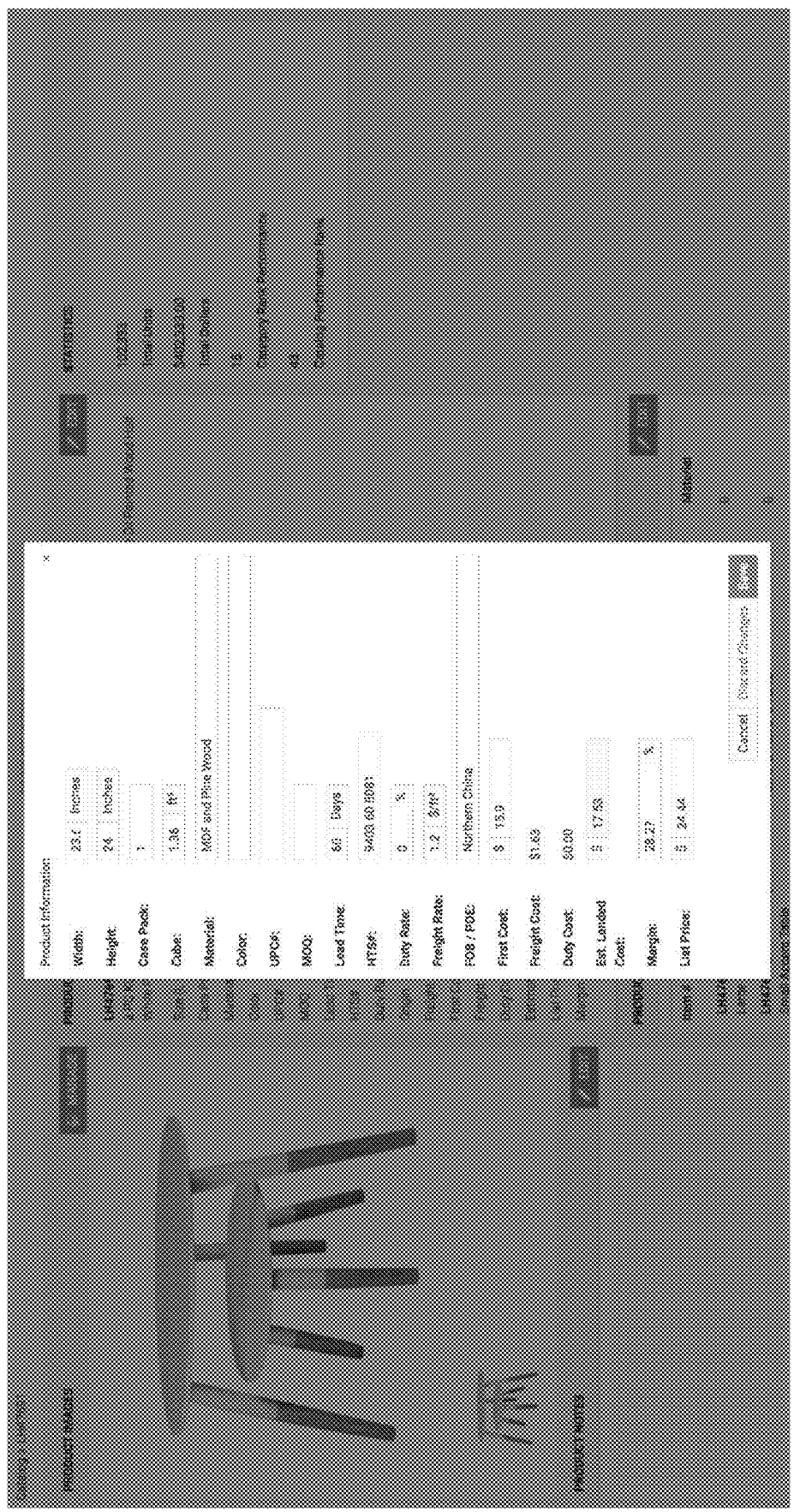

Details page with multiple distinct sections. A product image section (in this example, the left most third of the user interface) displays images and product notes, and contains controls enabling the upload of new product images (see, e.g., FIG. 3D), manage or delete existing images, and add notes about a product. A product information section (in this example, in the center of the user interface), are panels displaying core product information such as size, material, color, pricing, MOQ, lead time, product components, origin, freight rate, freight cost, duty, estimated landed cost, margin, and/or other information. A product components table may provide item numbers, quantity, size, color, material, and/or other information for each separate component that makes up the product. A designated subset of supplier users (e.g., supplier administrators and/or sales managers) are provided the ability to launch forms/modals enabling the users to edit the product details (e.g., dimensions, case pack, volume/cube size, material, color, UPC, MOQ, lead time, HTS, duty rate, freight rate, FOB/POE, first cost, freight cost, duty cost, list price) and calculate pricing, such as estimated landing cost (see, e.g., FIG. 3E) and edit product components (see, e.g., FIG. 3F1).

FIG. 3F2 illustrates an example user interface that accesses and displays the order and sales history of a selected product. The user interface may, for example, display the identifies of organizations purchasing the selected product, the corresponding price(s), the date/time of the purchases, and the quantities of product included in each purchase. A link may be provided, which when activated, navigates the user interface to the order document.

Figure 3G:
Figure 31:
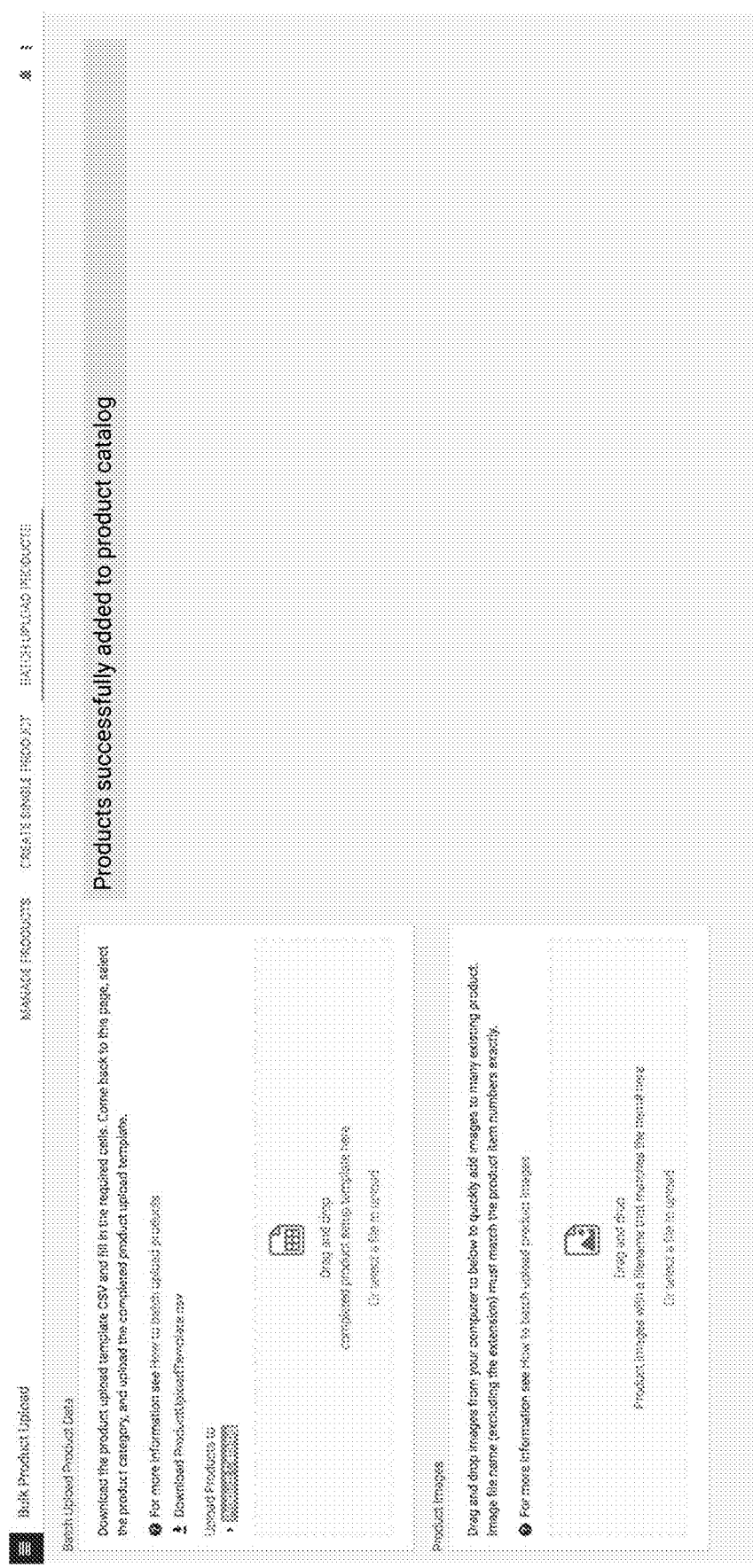

A designated subset of supplier users (e.g., supplier administrators and/or sales managers) are provided the ability to access a create single product form (see, e.g., FIG. 3G) from the catalog page to define individual products in the product catalog by entering in the corresponding detailed product information (e.g., item number, product category it will be assigned to, size, description, color, material, pricing, other detail information discussed herein, and/or other information). The platform checks new products to ensure item number uniqueness within supplier product catalogs and identifies an error if it is not unique. Optionally, the platform automatically generates the unique item identifier.

FIGS. 3C2 and 3C3 illustrate user interfaces that enable a user to tag products included in the catalog with relevant text. The tags will then be stored in association with a corresponding product record. When a user wants to find certain products, the user can enter a text query into a search field or select a search term from a menu of search terms.

The system may then search product records to locate products whose associated tags match the search query. The system may then present the search results, optionally including the product names, product images, and/or other product related data. In particular, the user interface illustrated in FIG. 3C2 enables a user to create new tag values, search for matching tags, assign tags, or remove existing tag values for a given product or set of products. Referring to the user interface illustrated in FIG. 3C3, a search field and sort control are provided. Example search results are illustrated. The search results may include the associated tags. A category menu is provided which enables the user to limit the search to a selected category. Each listed search result entry includes a selection field. A control is provided that enables the user to have the system filter the displayed search results to the selected products, thereby enabling more entries to be listed at the same time and enabling the exclusion of products that are not of interest.

Figure 3H:
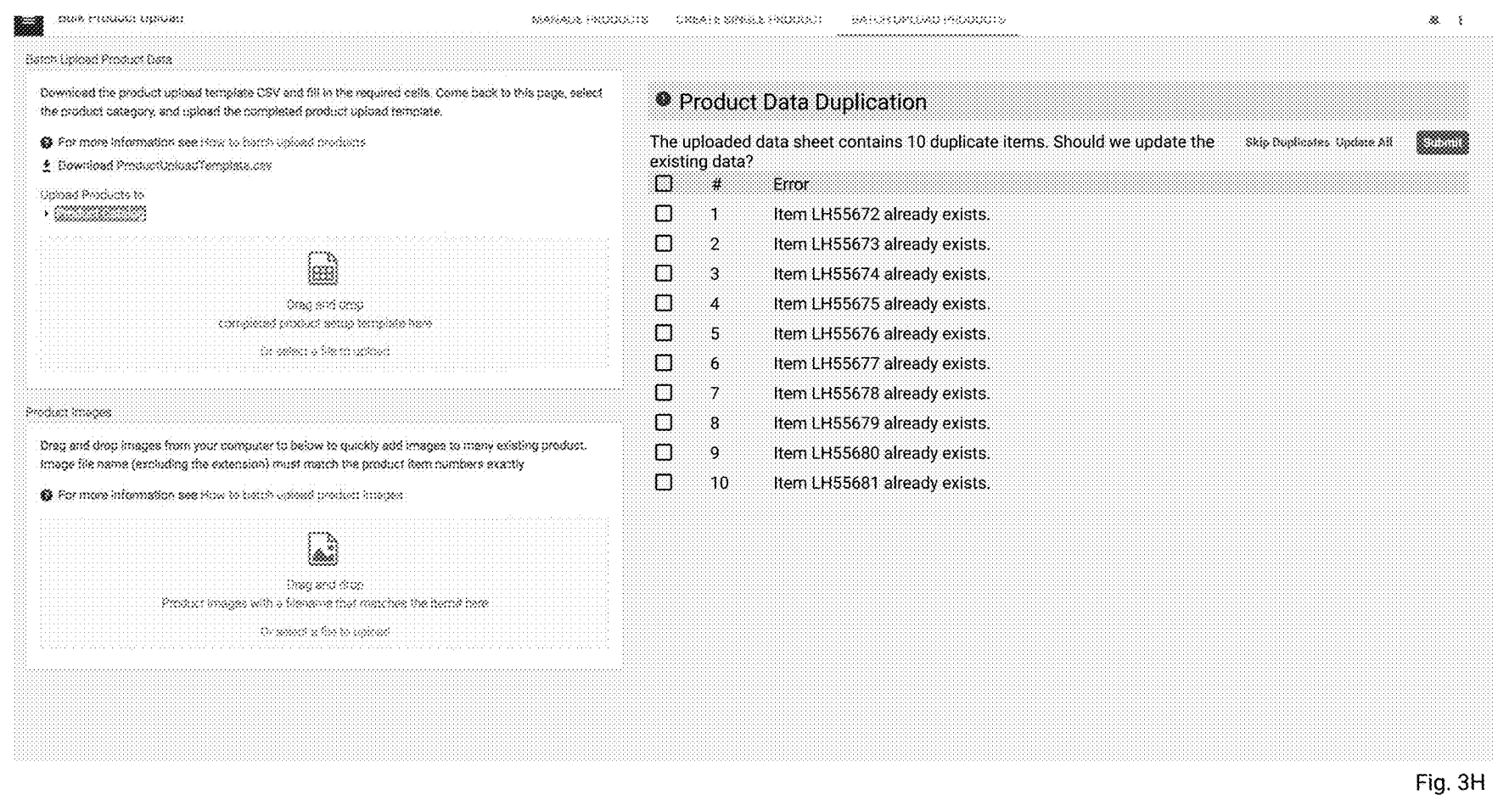

FIG. 3H illustrates a "Bulk Product Upload" user interface. Optionally, only a designated subset of supplier users (e.g., supplier administrators and/or sales managers) are provided the ability to access the "Bulk Product Upload" user interface. These users may utilize the "Bulk Product Upload" user interface to upload product data for several products at a time into the supplier company's product catalog by uploading data files (e.g., CSV formatted files) and image files (e.g., png, jpeg, and/or other image file formats). The system optionally error checks for file type and format and optionally checks for duplicate images and product data (as illustrated in FIG. 3H).

The example "Bulk Product Upload" user interface is comprised of distinct sections. The left section is comprised of instructions on how to upload product data and images, an interface to download a template of an acceptable data format, the user selection of which product category to upload the products to and drag and drop/launch system browser areas from which the system accepts files. The right section of the user interface provides system feedback, where users are given feedback on the outcome of their data/image uploads, including the ability to overwrite product information for products with duplicate item numbers to those existing in the catalog (see, e.g., FIG. 3H), information on errors on why data could not be accepted, and information on successful data upload (see, e.g., FIG. 3I).

Figure 3J:
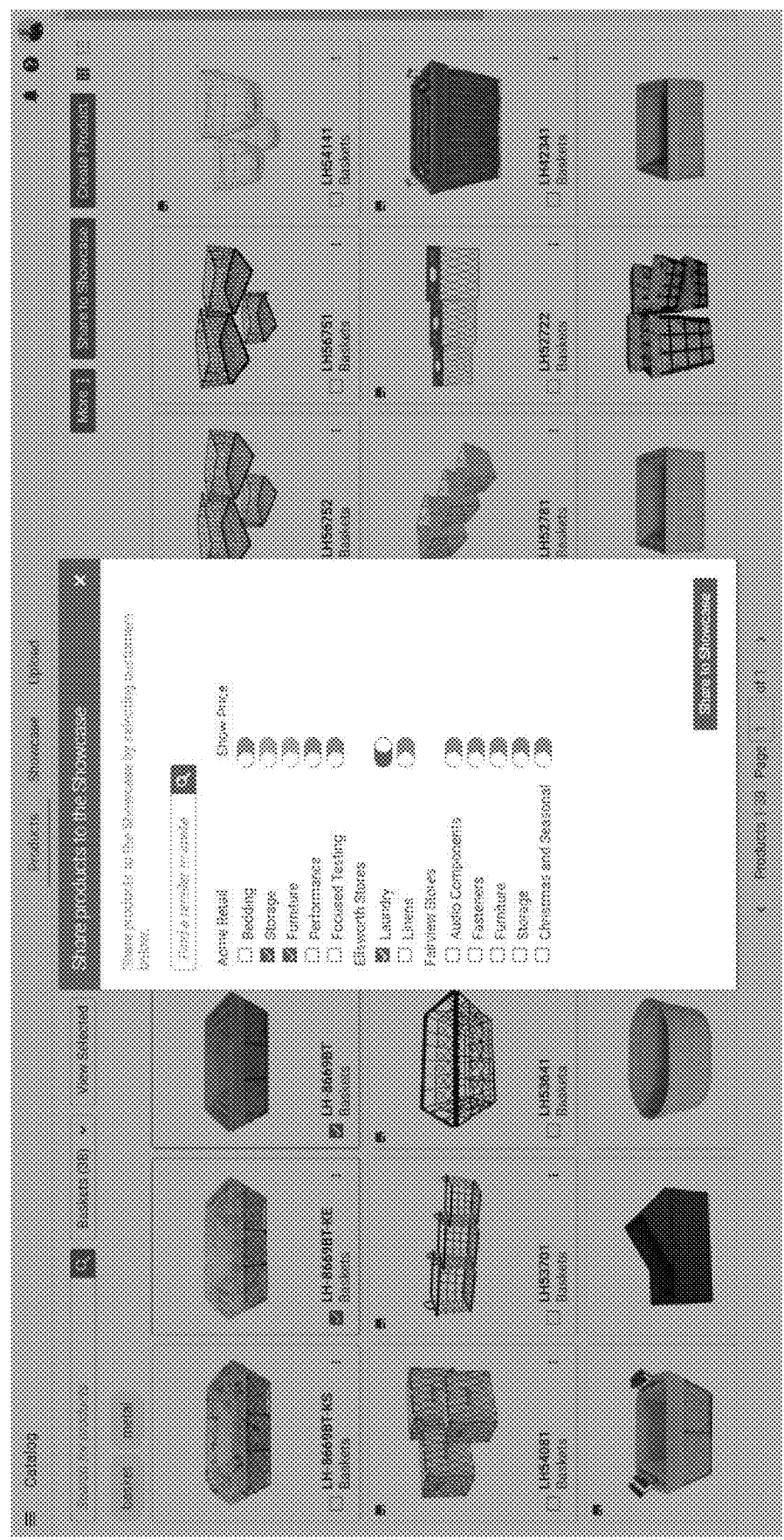
Figure 3K:
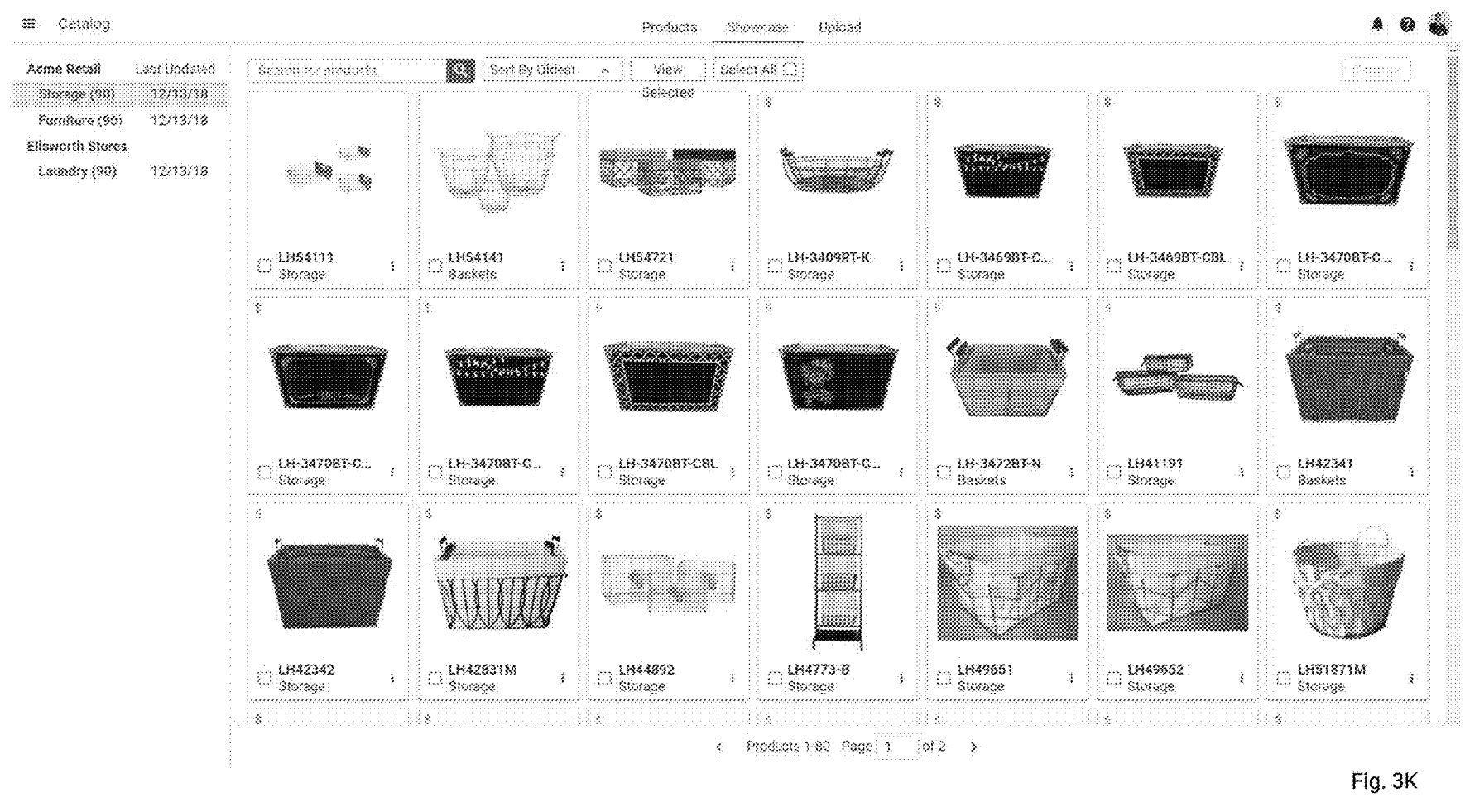
Figure 3L:
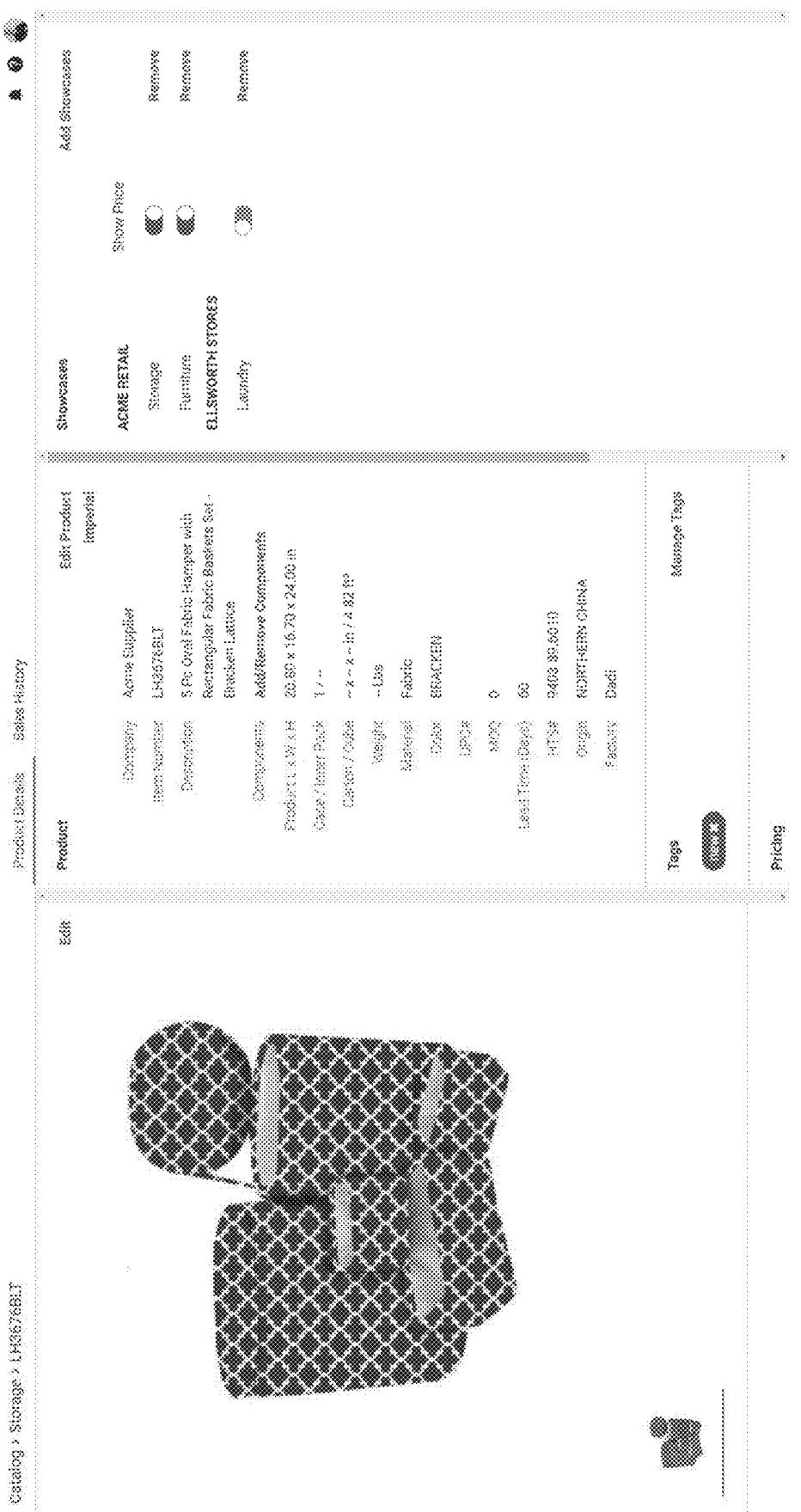

Referring to FIGS. 3J, 3K 3L example user interfaces are illustrated that enable a user (e.g., a supplier user) to broadcast product announcements or other data to multiple potential acquirers at the same time to thereby showcase and enhance the visibility of such products and stimulate the interest of potential acquirers. For example, the showcased product may be a new product, a product with a price reduction, a product undergoing a closeout, or the like.

With reference to FIG. 3J, a catalog page is illustrated with an overlying form enabling the user to select which products are to be added to the showcase. In addition, for each product/product-type a control may be provided which enables the user to specify with the associated price is to be included in the showcase presented to potential acquirers. A search field is provided that enables the user to enter a search term to search for potential acquirers to invite to view the showcase.

Referring to FIG. 3K, the user interface includes a left panel displaying different showcases of products segmented by listed potential acquirer. The user can select a listed potential acquirer and the right panel will display all the showcased products shared to the selected potential acquirer.

Referring to FIG. 3L, the user interface includes a left panel displaying one or more images of a showcased product. A middle panel includes a table of product details, such as item number, description, case pack, cube, lead time, color, material, size, HTS (Harmonized Tariff Schedule), MOQ (Minimum Order Quantity), product components, lead time, pricing, tags, and/or the like. The right panel indicates which showcases for which potential acquirers the product has been included in. Controls are provided enabling the user to share or hide pricing, and enabling the user to remove the product from a selected potential acquirer's showcase.

Certain example user interfaces relevant to the buyer workflow will now be described. Optionally, only a designated subset of supplier users (e.g., buyers and/or department managers) is provided access to user interfaces for creating, editing, and/or inviting suppliers to "Programs." The term "Program" as used herein (unless the context indicates otherwise) refers to how certain buyer personnel (e.g., buyers and department managers) organize their budgets, set goals for what types of products and how many products to buy, keep track of supplier offers, and the orders they create. Programs can be assigned to any set of Departments and Categories, and can be queried from any set of the Departments and Categories to which they are assigned. This enables users to draw insight regarding the Programs.

Figure 4A1:
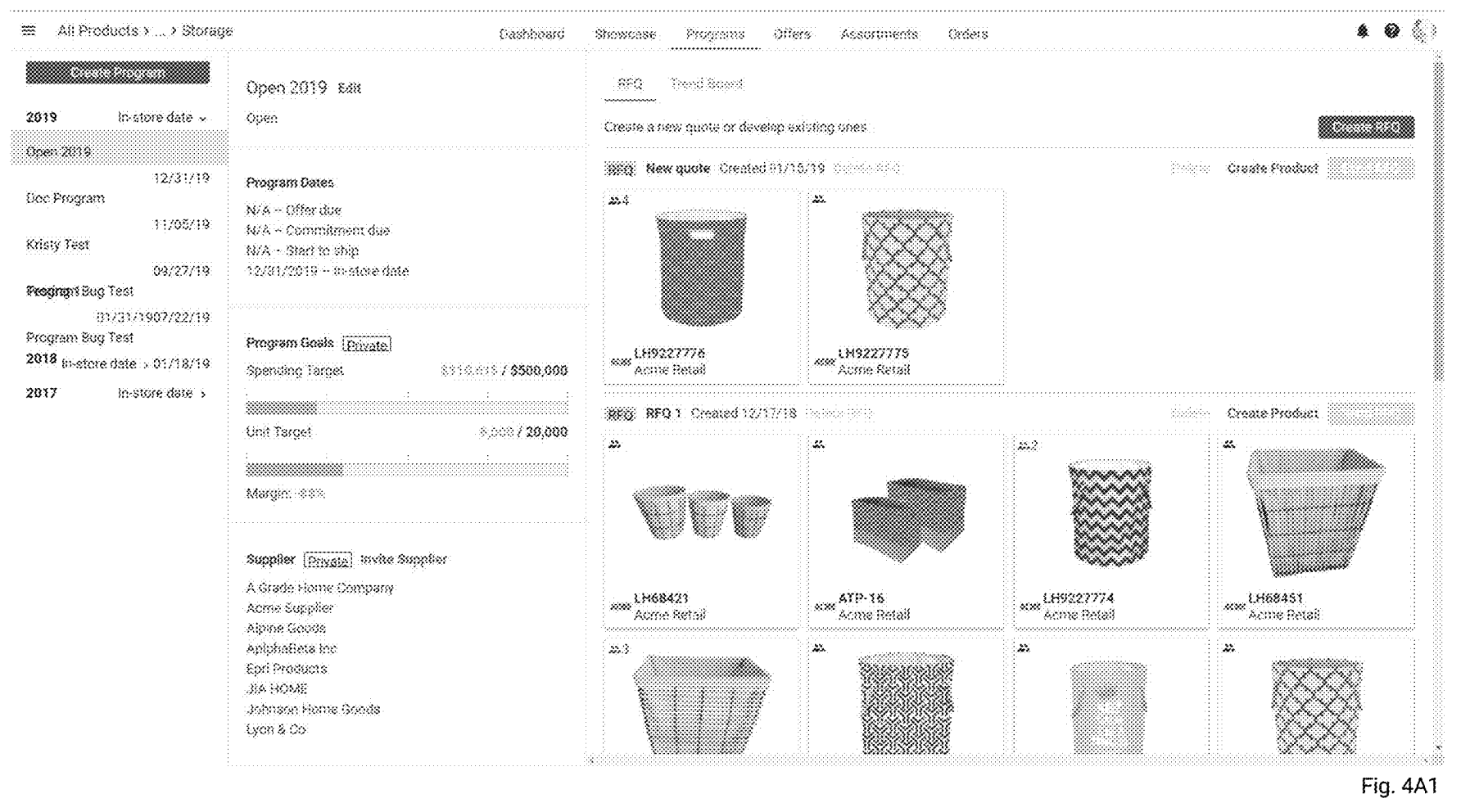
Figure 4A2:
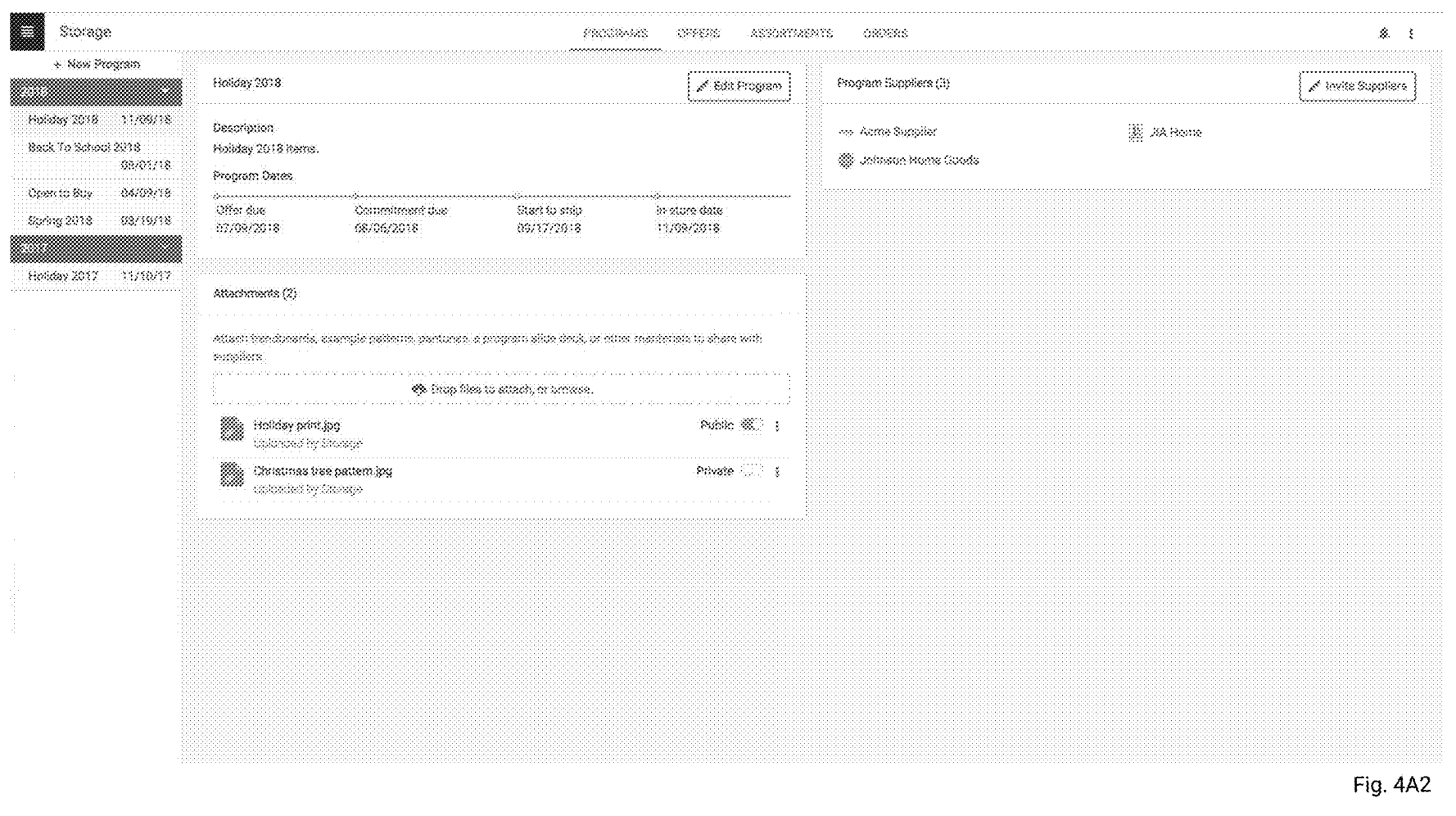
Figure 4B:
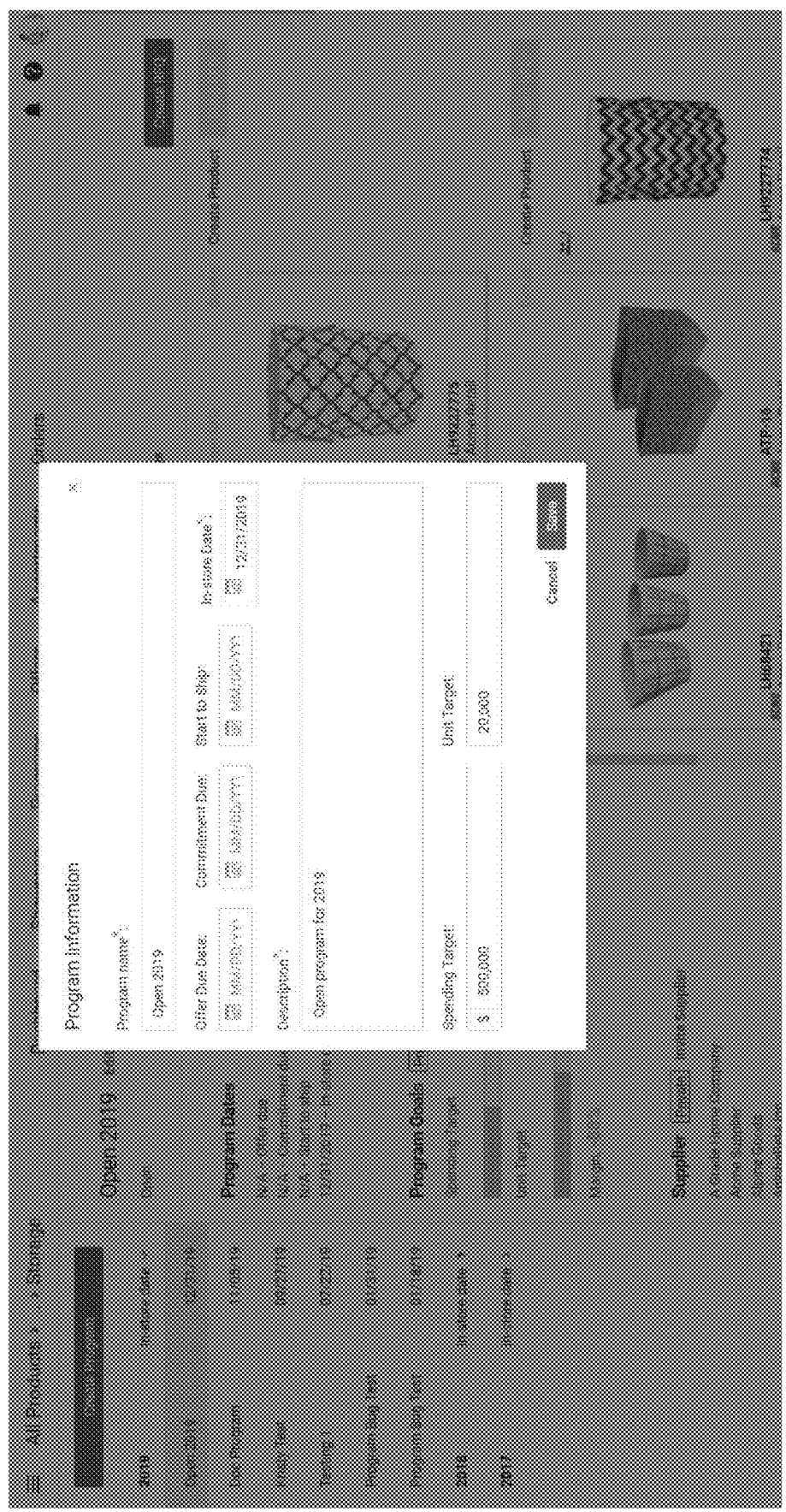
Figure 4C:
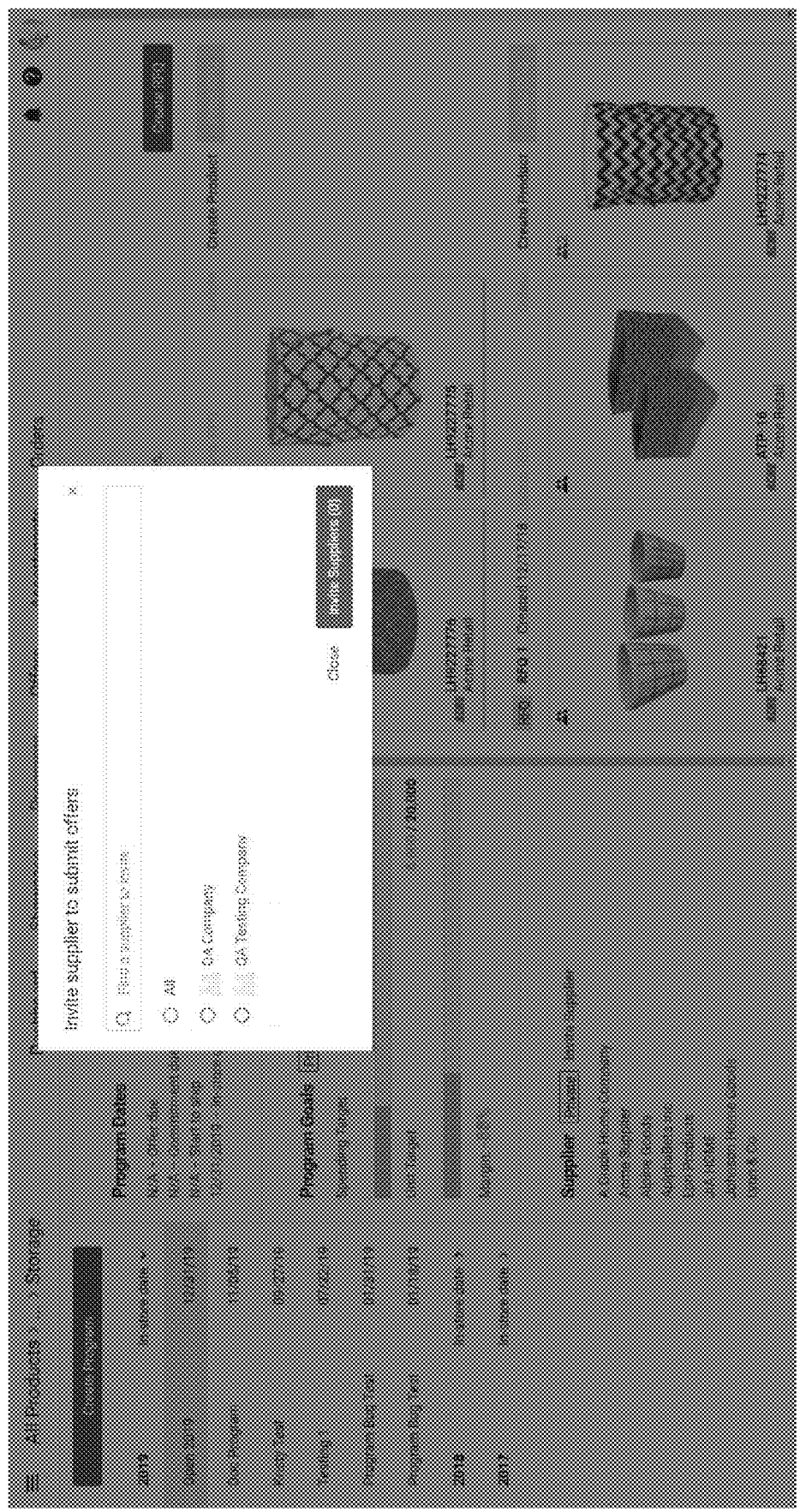

Examples retailer programs user interfaces are illustrated in FIGS. 4A1-A2. With reference to FIG. 4A1, the example user interface enables an acquirer (e.g., a retailer) to create, edit, and invite suppliers to one or more Programs. The example user interface includes a left panel that lists each program assigned to a given product category, optionally organized by date. The user may select one of the listed program in order to view and optionally edit the program details. The middle panel displays and enables the user to edit the program details (e.g., using the form illustrated in FIG. 4B). For example, the panel may include program description fields and program relevant dates (e.g., offer due date, commitment due date, start to ship date, in-store date, etc.). A user interface is provided (e.g., a Private control) via which the user can upload, alter, and delete files (e.g., image, video, pdf, word processing, and/or other files) to be shared with other authorized users at the acquirer who have been granted access to the category (but not with suppliers). Optionally a user interface is provided (e.g., a Public control) that enables such files to be shared with an entire channel of suppliers that have been granted access to the program. For example, a list of suppliers may be provided. The listed suppliers can be invited, via an invite control, to the program (e.g., using the example invitation to submit offers form illustrated in FIG. 4C). A program progress section may include text and/or graphed data indicating the progress made towards one or more goals (e.g., spending target goals, unit target goals, margin underruns or overruns, etc.). A right-hand panel provides a table of suppliers who have been granted access to the program. The set of suppliers with access to the program may be restricted to those suppliers (or a subset thereof) that have been granted access to the corresponding Category (via a Thread). The supplier information provided in the table may include the supplier's name and logo, and associated supplier products. As will be described the user can request a supplier included in the table to provide a quote (RFQ).

With reference to FIG. 4A2, another example user interface is illustrated that enables an acquirer (e.g., a retailer) to create, edit, and invite suppliers to one or more "Programs. The example retailer programs user interface is comprised of distinct sections. A left side container, organized by date, lists each program assigned to the corresponding category. In response to the user selecting a program from the list, program details may be displayed and the details may be edited. The middle section of the example user interface is where the program information is displayed, created, or altered (e.g., using the form illustrated in FIG. 4B). The displayed and editable fields may include, by way of example, a description of the program and dates relevant to the program (e.g., Offer due date, Commitment due date, Start to ship date, In-Store date, and/or other dates). The dates may be listed graphically using a timeline. Also provided in this middle section is an area via which a user can upload, alter, and delete files (e.g., image files, pdfs, and/or other files). The user can specify whether the files are to be shared only with other retail members who have access to this category and therefore this program (by keeping the file "Private" via a private/public control) or are to be shared with an entire "Channel" of suppliers who have been granted access to this program (by choosing to make the file "Public" via a private/public control). A third section of the example user interface is comprised of a table of supplier companies who have been granted access to this program. Included in this table is information about the supplier (e.g., name and logo of the company). The set of suppliers with access to this program may be restricted to those suppliers (or a subset thereof) that have been granted access to the corresponding Category (via a Thread). This section also provides an interface via which access may be granted to suppliers for this program from the set of suppliers with access to the Category (e.g., using the example invitation to submit offers form illustrated in FIG. 4C).

Figure 4D:
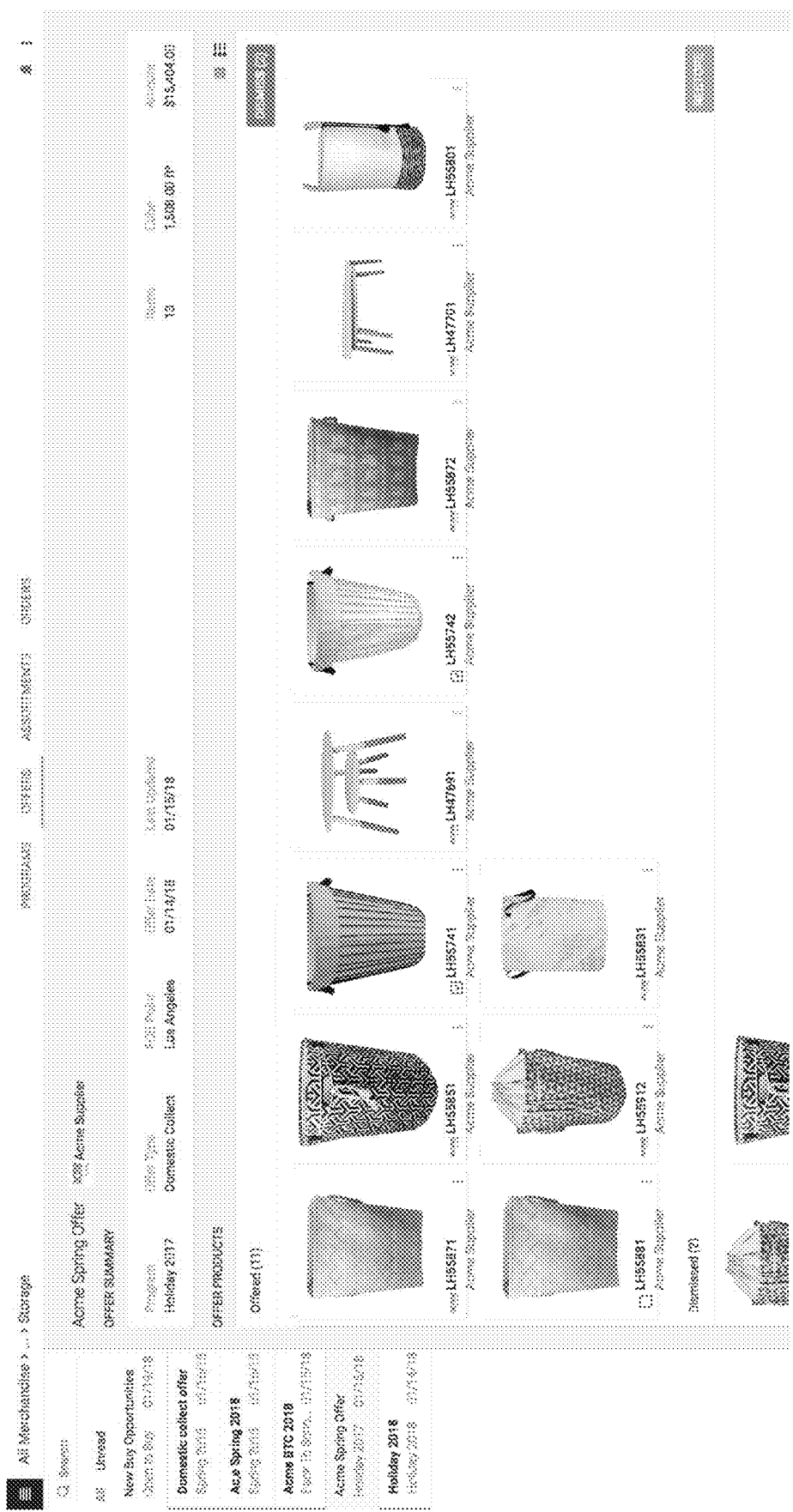

FIG. 4D illustrates an example "Offers" user interface. The "Offers" user interface may be utilized by retail users as an "inbox" of incoming "Offers" for "Offer Products" sent by supplier users. The offers (including updated offers) may be sorted according to date/time received, with the most recent offers (or most recent unread offers) displayed at the top of the inbox. This enables retail users to quickly access and review recently received and recently updated offers, and begin to triage which Offer Products they want to consider further and which offer products they no longer want to consider purchasing. In the illustrated example, the retail user can toggle between viewing an offer via a product card layout (FIG. 4D) or via a table layout (FIG. 4E) with smaller images but more details (e.g., description, origin, case pack, cube dimensions, unit price, total cube, total amount, etc.) about the Offer Products.

In the example user interfaces there are distinct sections. The left hand element is a container of received offers that functions as an inbox in that it indicates new and unseen/unread activity, in this example, via sorting and bolding of text (or other visual highlighting). The majority of the example user interface displays the offer information corresponding to the offer object selected via the left hand section. In both the product card and table example layouts, this section includes an offer summary with data fields such as Program, Offer type, FOB Point, Offer date, Updated Date, Items, Cube, and Amount. Underneath the offer summary section is a collection of Offer Products, laid out in product card layout or table layout (e.g., with information including the product image, the product item number, Notification Badge, Origin, Case Pack, Unit Price, Cube, Quantity, Total cube, and/or amount). In both example representations, Offer Products that have been "Dismissed" (where the user has indicated via the user interface that the user is not interested in purchasing the Offer Product) are visually and/or textually distinguished from the other Offer Products. In this example, buyers may dismiss or restore products by selecting them (e.g., via checkbox as illustrated in FIG. 4D or via vertical ellipses as illustrated in FIG. 4E), and selecting a dismiss control or restore control as desired.

Figure 4F:
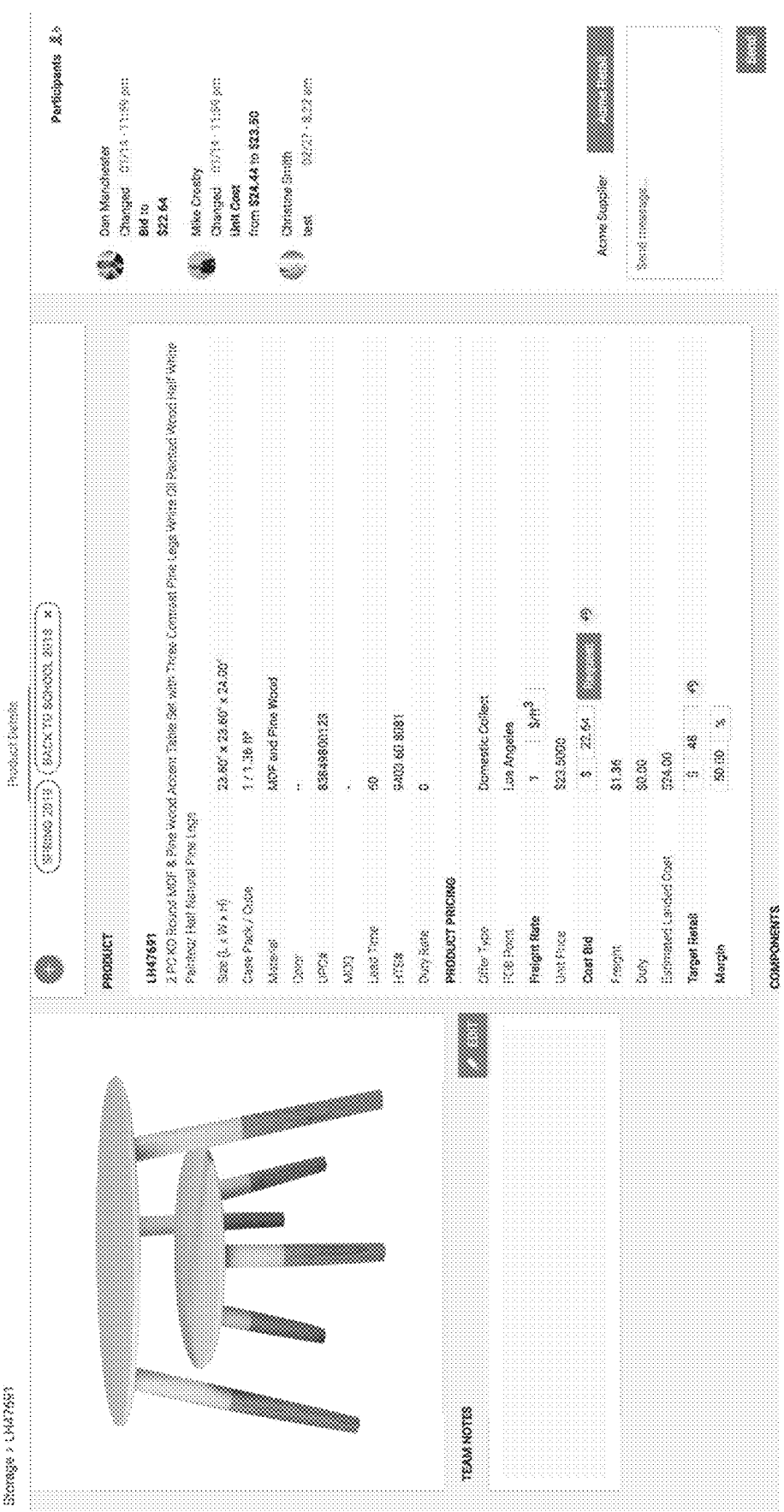

FIG. 4F illustrates an example "Offer Product Details" user interface that enables a retail user to review product information in depth, request any changes or customizations, and/or negotiate price/terms of an Offer Product. This user interface is configured to enable high-touch, fast paced, communication, collaboration, and negotiation. This user interface layout reflects an intentional design choice to organize communications around objects, "Object First Communication", in this instance communication specifically tied to an Offer Product object, to create a better sense of organization, auditability, and insight around the critical artifacts involved in the workflow.

In the illustrated example, the Offer Product Details user interface is comprised of distinct sections. The left section of the user interface includes an area to present one or more images of the Offer Product, while the lower panel in the left is utilized by retail users to enter private team notes on individual offer products. The middle section in this example is comprised of a table containing product details (e.g., Item number, description, case pack, cube, lead time, color, material, size, HTS, MOQ, Product components, other detail information discussed here, and/or other information). This example section includes pricing tools enabling the retail user to quickly calculate and determine such useful information as Estimated Landed Cost, Margin, Retail, and what maximum cost the buyer needs to purchase the product to achieve a target margin. At the top of this middle section of the user interface an interface is provide enabling a retail user to add this Offer Product to a Program (see, e.g., FIG. 4G), so that it may be considered and compared with other products from the same or different suppliers from which the retail user will make their final purchasing decision. For example, a drop-down menu of programs may be accessed, with checkboxes associated with respective listed programs. A user can select, via the checkbox, which programs the Offer Product is to be added to. This example section also includes elements in the table that show a change log/revision history for every field that has changed in value.

Figure 4G:
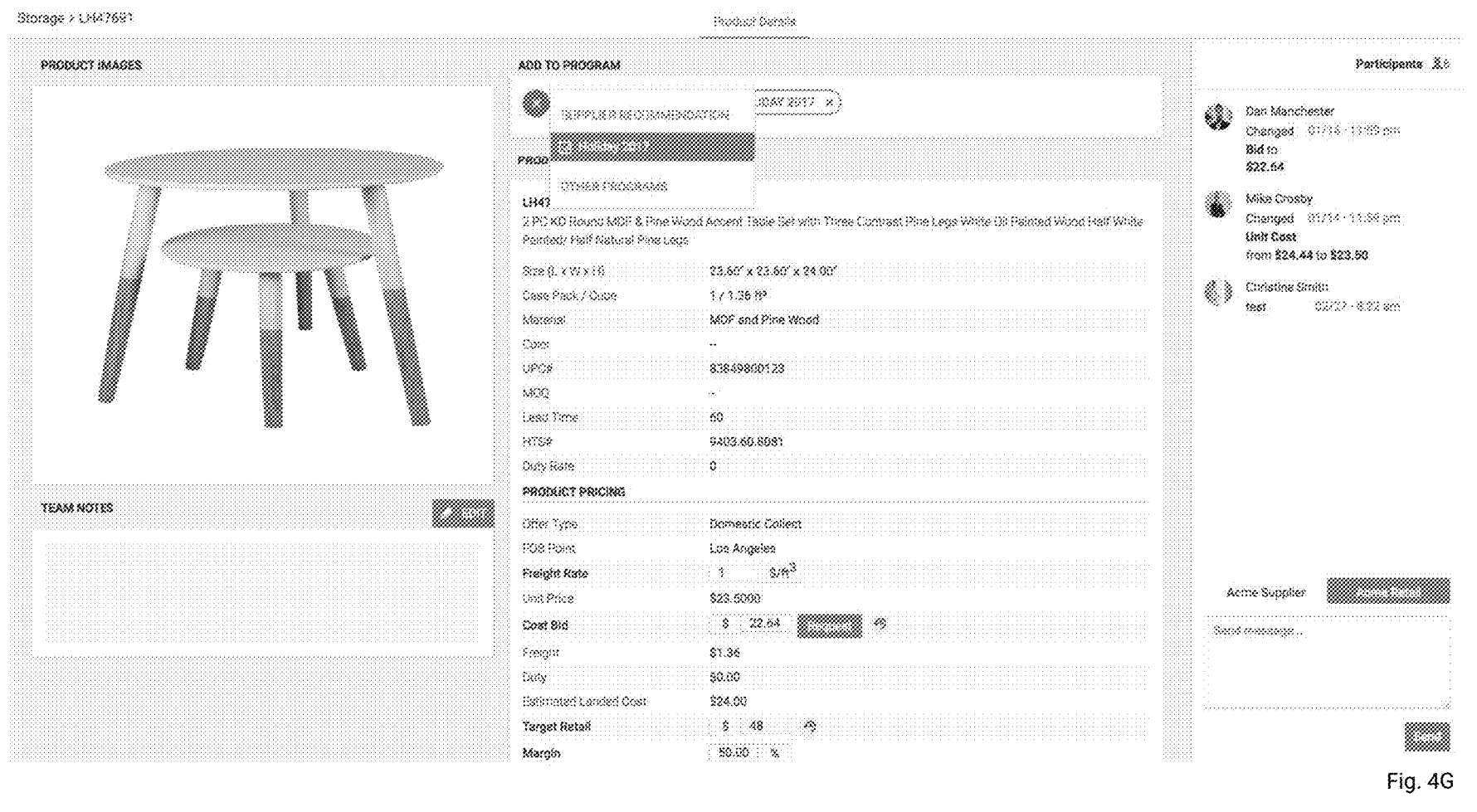

The right most section of the user interface illustrated in FIGS. 4F, 4G, is comprised of chat function and event log. In this section, users can message either all users (including those users of both the retailer/buyer and of the supplier) and that have access to this Offer Product, or limit the communication to all users within their own company that have access to this Offer Product. In this example, an interface is provided via which the user can specify which group she wants to message by toggling the company controls ("Acme Supplier" and "Acme Retailer" in the illustrated example) adjacent to the chat input box. In addition to messages, events detected by the system, such as a cost bid, a price change, field updates, and/or the like, are inserted into and displayed by the chat history creating a fluid timeline of communication about and updates to the Offer Product.

Figure 4H:
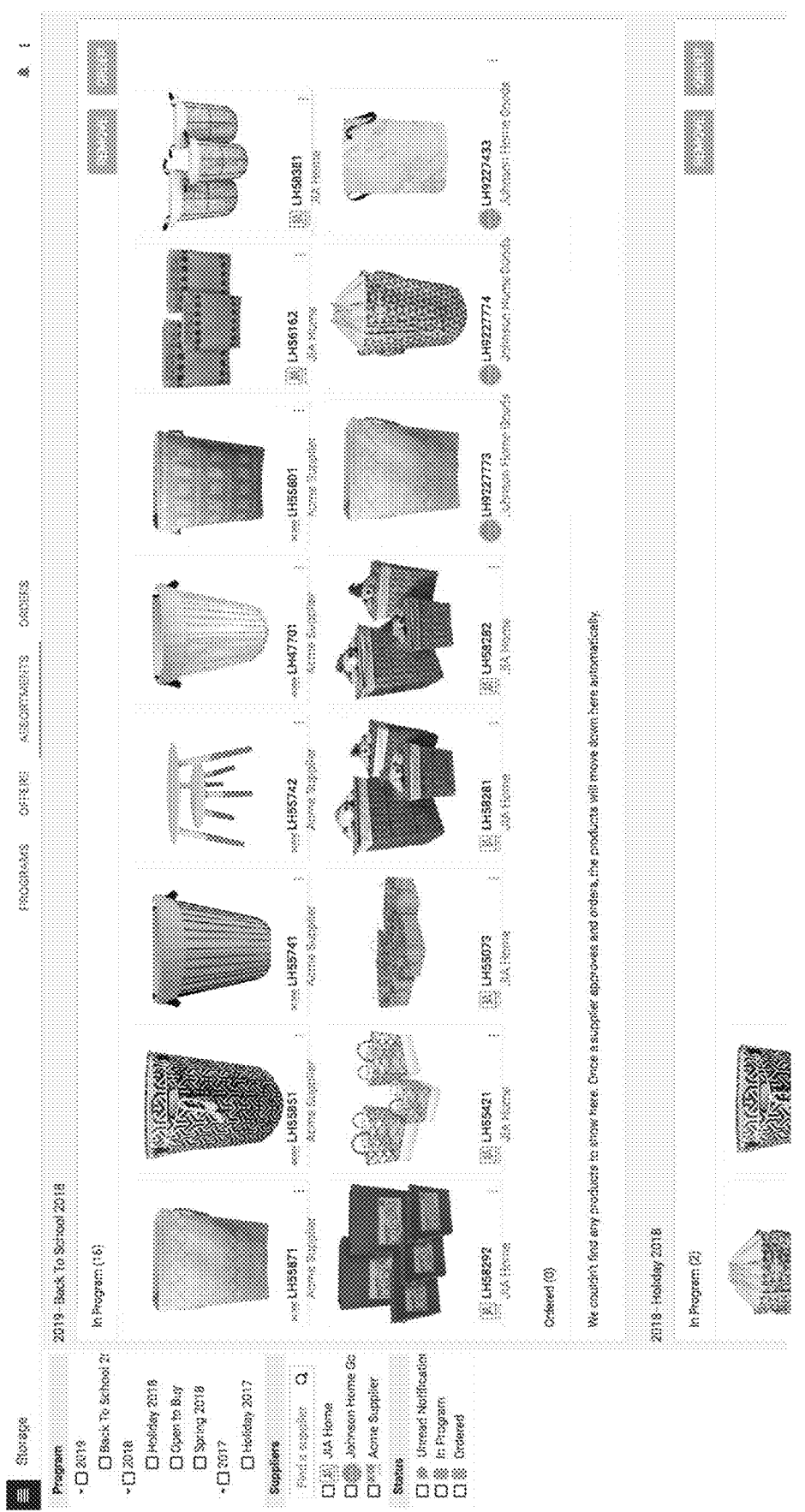

FIG. 4H illustrates an example Assortments user interface which displays to retail users the sets of products they have added to Programs from one or more offers from one or more suppliers. This interface enables retail users to make their final decisions on which products they want to purchase, from which suppliers, and in what quantities for their designated Programs.

In this example, the user interface is comprised of distinct sections. The leftmost section is a container of filters (e.g., program filters, supplier filters, status filters), that scope the objects on the right section of the user interface across one or more parameters such as Supplier, Program, Product Status, and/or the like. Thus, for example, the user can use the filters to specify which products are to be displayed in the right section by selecting desired programs, suppliers, and/or status. The filters may be organized as parent-child trees (e.g., programs for 2018 may be listed under a 2018 heading, and programs for 2019 may be listed under a 2019 heading). The right (and in this example) larger section of the user interface is comprised of one or more containers corresponding to one or more Programs, that contain offer products that retail users added to that program and or purchased for that program. Each program section may include respective remove product and order product controls. Offer product cards include information (e.g., supplier company name and/or logo) that distinguish products from different suppliers. The card layout serves as a visualization tool for the retail users to stage their assortment. Retail users can select one or more products via the checkboxes on the product cards and remove the products from the Program (by activating a remove control) or place the products on an order or on orders (by activating an order control).

Figure 4I:
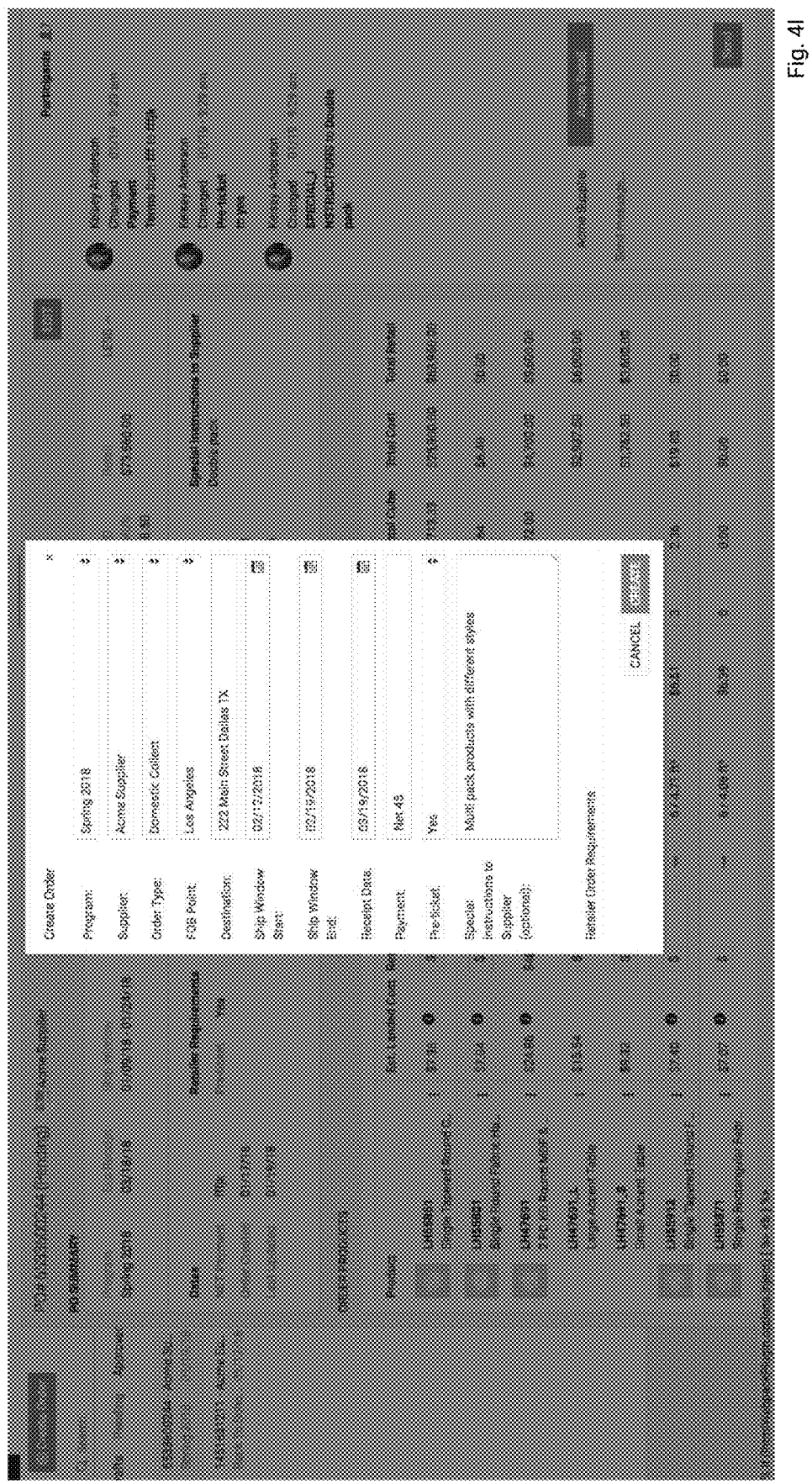
Figure 4J:
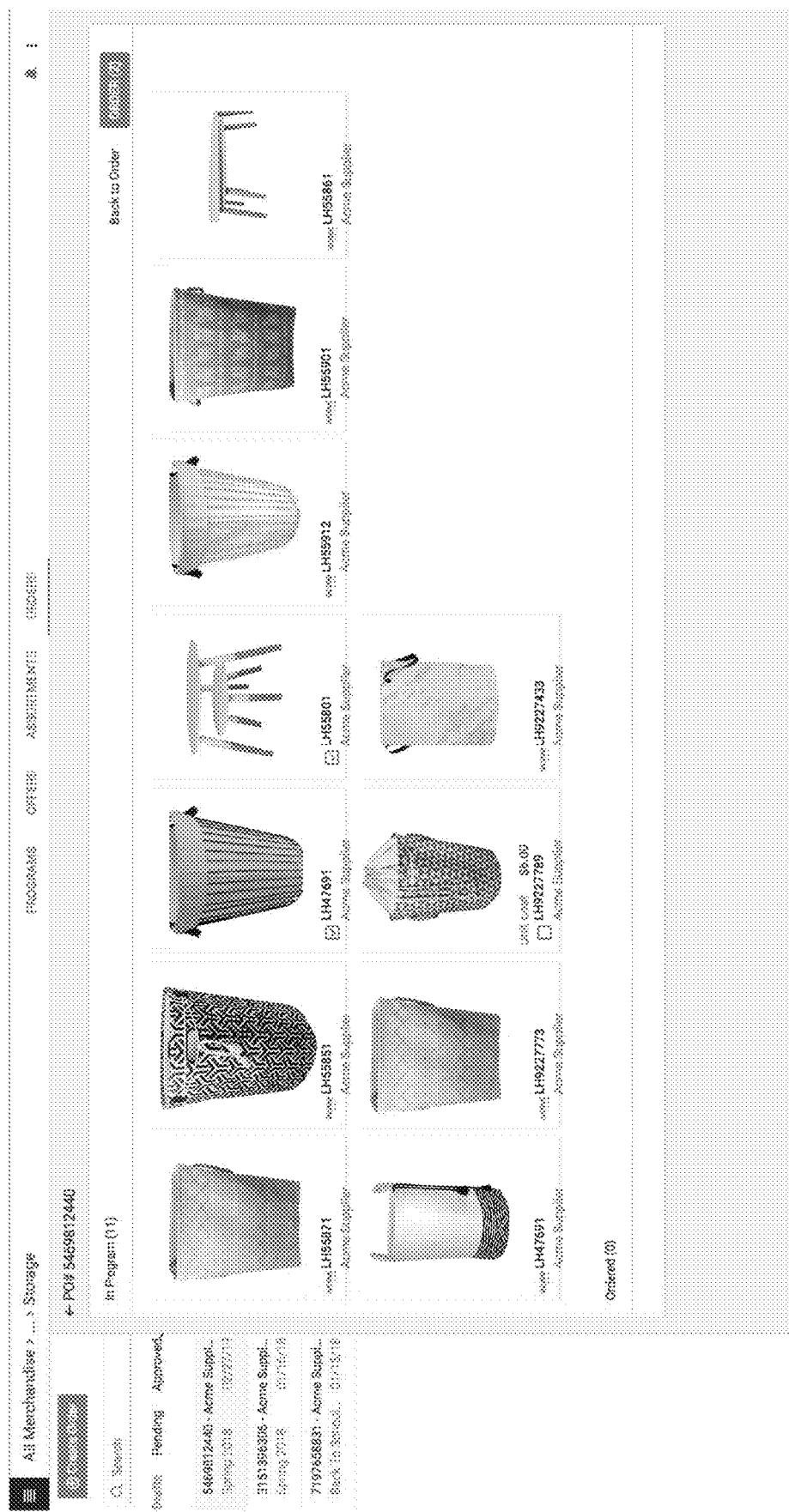

FIG. 4I illustrates an example order creation form, including program, supplier, order type, FOB (Freight on Board) point, destination, ship window start, ship window end, receipt date, payment terms, pre-ticket, and/or special instruction fields. To create an Order, retail users fill in the information in the form with available values which may be filtered based on the user's previous selections. Once the fields in the form have been completed the user is navigated to the "Add Products to Order" user interface, an example of which is illustrated in FIG. 4J.

The Add Products to Order user interface displays a set of products filtered to match the values that the retail user entered for certain fields (e.g., "Supplier") in the create order form illustrated in FIG. 4I. The Add Products to Order user interface enables the user to select which products the user wants to add to the order. In this example, the user interface includes distinct sections. A container of orders on the left side of the user interface (That functions similarly to the container of Offers illustrated in FIGS. 4D, 4E. The user can select to view draft orders, pending orders, or approved orders (e.g., via respective tabs). An order search field is provided via which a user can enter an order search query, and a search engine will return and display matching orders (e.g., in ranked order based at least in part on relevance or closeness of match). When an order is selected via the order container, the container the right side of the user interface accesses and displays objects, information, and functions related to that order. In this example those objects are a set of products filtered by the user's input when creating the order, that the user can select from (e.g., by click corresponding checkboxes) to add to the order. An order control may be enhanced to show the number of items added to the order.

Figure 4K:
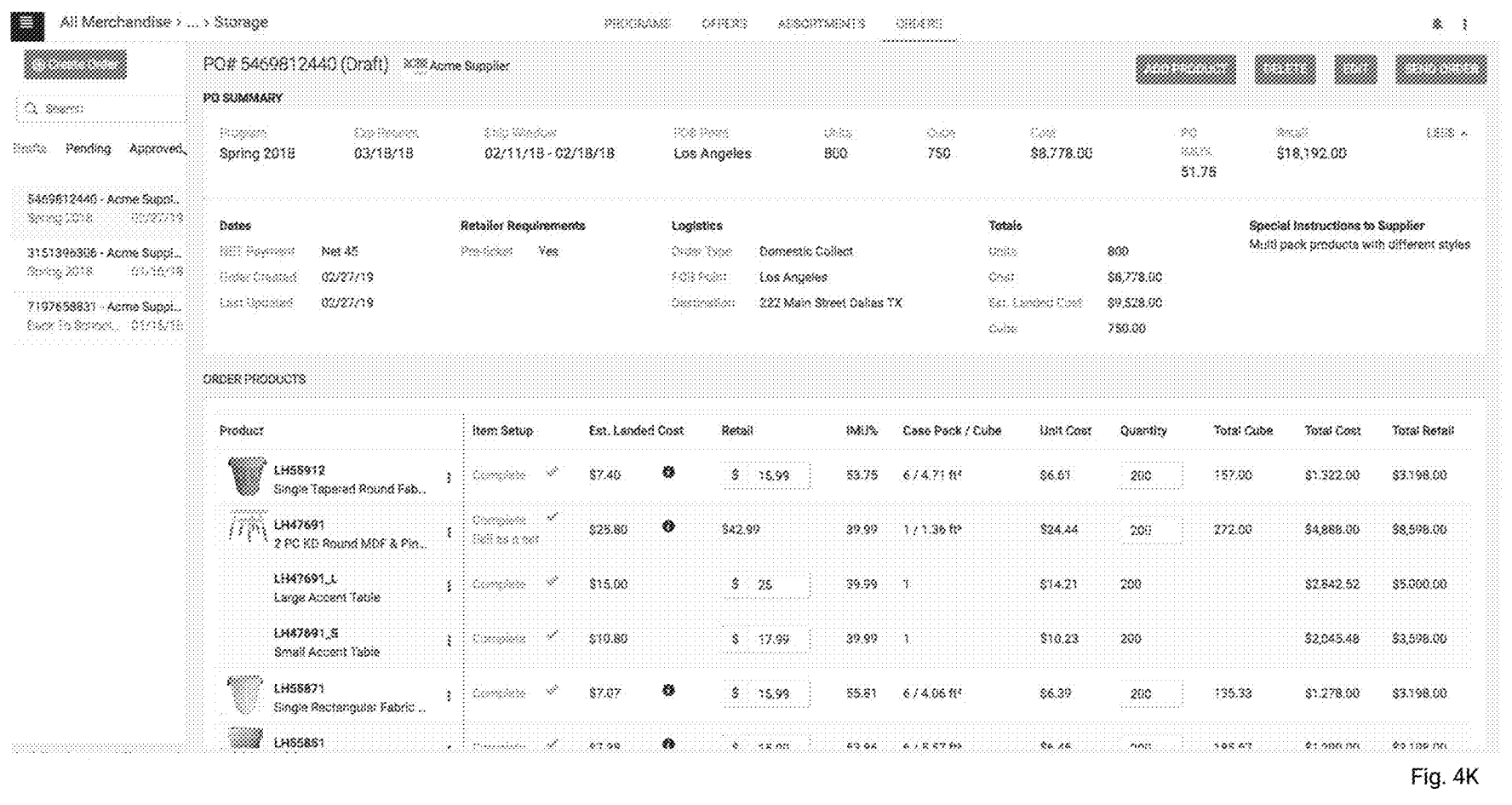

FIG. 4K illustrates an example draft order user interface. Once the retail user adds products to the order they become "cloned instances" of the Offer Products, called "Order Products." This allows for the same Offer Product to be ordered many times, potentially in different ways due a change in terms such as price or FOB Point. Retail users may utilize the "Draft Order" user interface to finalize information needed to transmit the order to the supplier. The Draft Order user interface may include fields such as Quantity, Unit Cost, Retail Cost, IMU, Case Pack/Cube, Margin, Total Cube, Total Cost, and/or Total Retail Cost fields. The retail user may review information presented via the various fields and finalize the order.

The retailer may also finalize any information needed to execute a purchase order that may not have been necessary to provide at an earlier stage in the process. For example, the retailer may add a retailer specific item number to each product and/or a short description to print on the tag/label of a product. Such types of information may not have been needed to make a decision as to which products to purchase from which suppliers, or to negotiate a product purchase, but may be required by the retailer to execute an order. Such information may be referred to as Order Requirements, Order Product Requirements, and Order Product Component Requirements. These requirements are available via the user interface illustrates in FIG. 4K to complete in the table of order products and via a form launched by the "Edit" order button.

The example draft order user interface includes distinct sections. A container of orders on the left side of the user interface (that functions similarly to the container of Offers in FIGS. 4D and 4E). The user can select to view draft orders, pending orders, or approved orders (e.g., via respective tabs). An order search field is provided via which a user can enter an order search query, and a search engine will return and display matching orders (e.g., in ranked order based at least in part on relevance or closeness of match). The right section of the example user interface which contains information, objects and functions related to the order selected via the order container section. For example, the right section may include objects such as a table of Order Products and Order Product Components, with details about each such as Quantity, Unit Cost, Retail Cost, IMU, Case Pack/Cube, Margin, Total Cube, Total Cost, and/or Total Retail Cost, and a summary of the order (e.g., including program name, expected receipt, ship window, FOB point, number of units, cube, cost PC MU, retail cist, relevant dates (e.g., net payment period, order created date, last updated date), retailer requirement, logistics (e.g., order type, FOB point, destination), and/or totals (e.g., units, cost, estimated landing cost, total cube)). Functions provided via the user interface may include: calculation tools to calculate Estimated Landed Cost, Margin, Total Cost, Total Retail, and/or Total Cube, user ability to add more products, edit the order details, delete the order, and send the order to the supplier.

Figure 4L:
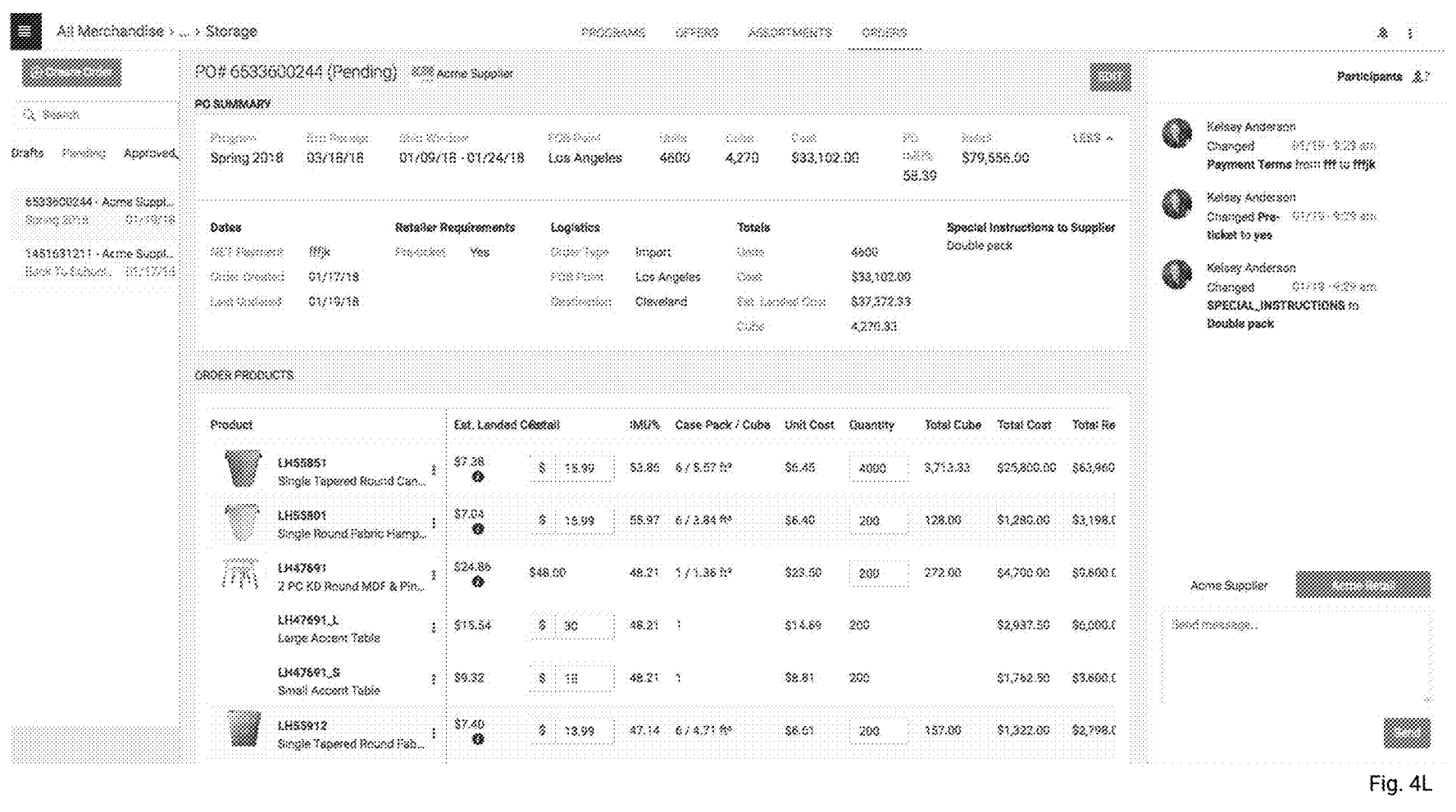

FIG. 4L illustrates an example pending order user interface. Once the retail user has transmitted the order to the supplier, the order becomes viewable by the supplier and the order changes status from being a "Draft" Order to a "Pending" Order. At this point much of the user interface is optionally the same as the Draft Order user interface (see, e.g., FIG. 4K), with many of the same fields displayed to the buyer and with the same or similar functionality available. Optionally, the Pending Order user interface omits a delete order control. The example Pending Order user interface includes a Chat/Messaging user interface and functionality. The Chat/Messaging user interface enables users to message all other users who have access to this order (e.g., including retailer users and supplier users) or only all other users from their company who have access to this order. As similarly discussed with respect to the chat panel on the offer product user interface, this chat panel accesses and display a revision log of changes to the order. Optionally, only retailer users are provided the sole ability and discretion to edit/alter information about the order.

Figure 4M:
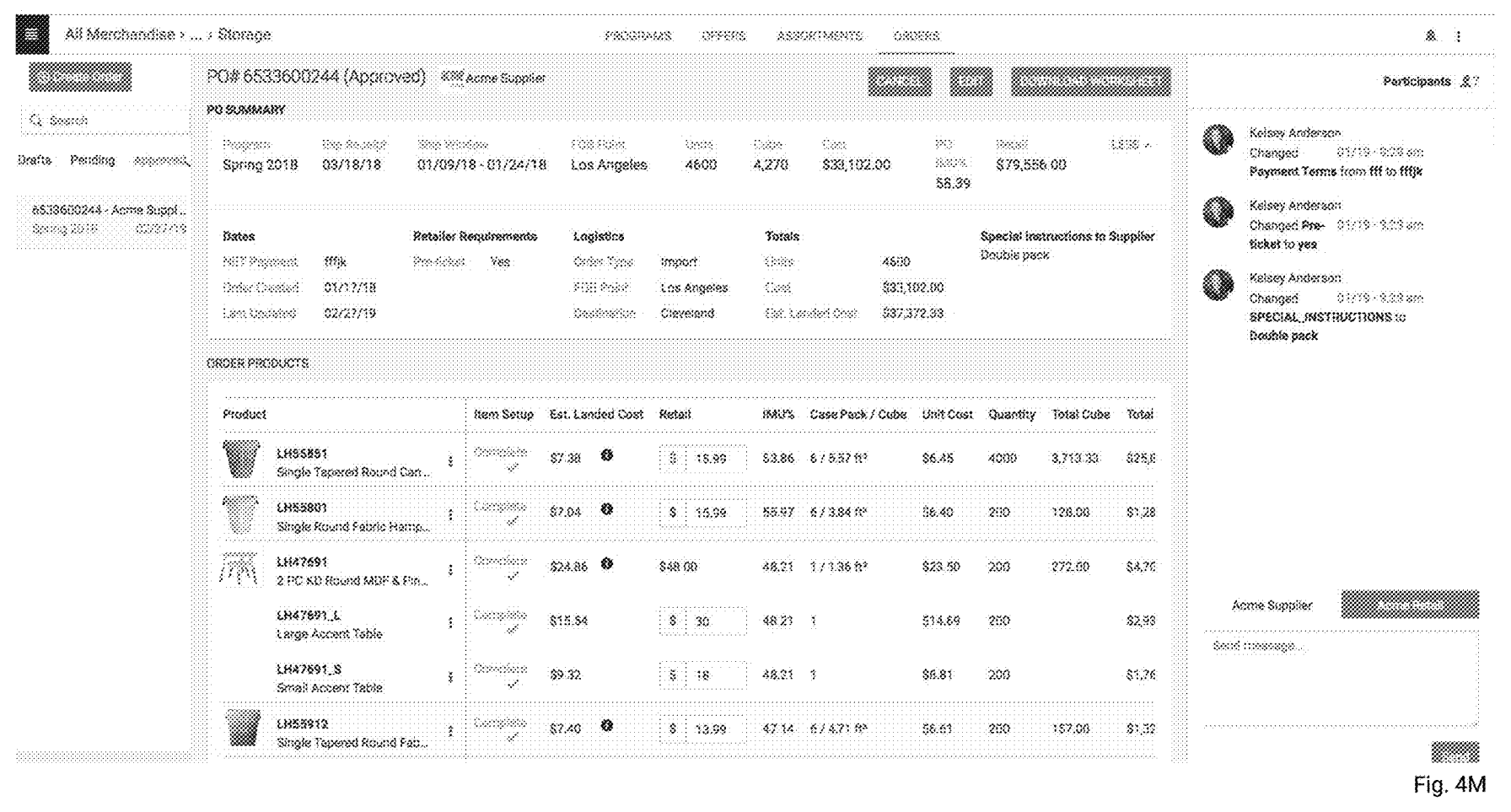

FIG. 4M illustrates an example approved order user interface-retailer view. After a retail user sends an order to a supplier, the supplier users receive the order and may review the order details and request any desired changes, such as changing the ship window. Once the supplier is in agreement with the terms of the order, the supplier approves the order, allowing the buyer to export the order via one or more formats such as to a CSV or Excel file in their preferred format, or as a JSON file to transmit to another system. In response to detecting any editing of the fields/terms of the order that would affect the supplier (e.g., changing the ship date or quantity of a product ordered), the system changes the order status back to "Pending". The system may then require the supplier to re-approve the order before the retail user is enabled to export the order from the platform.

Figure 4N:
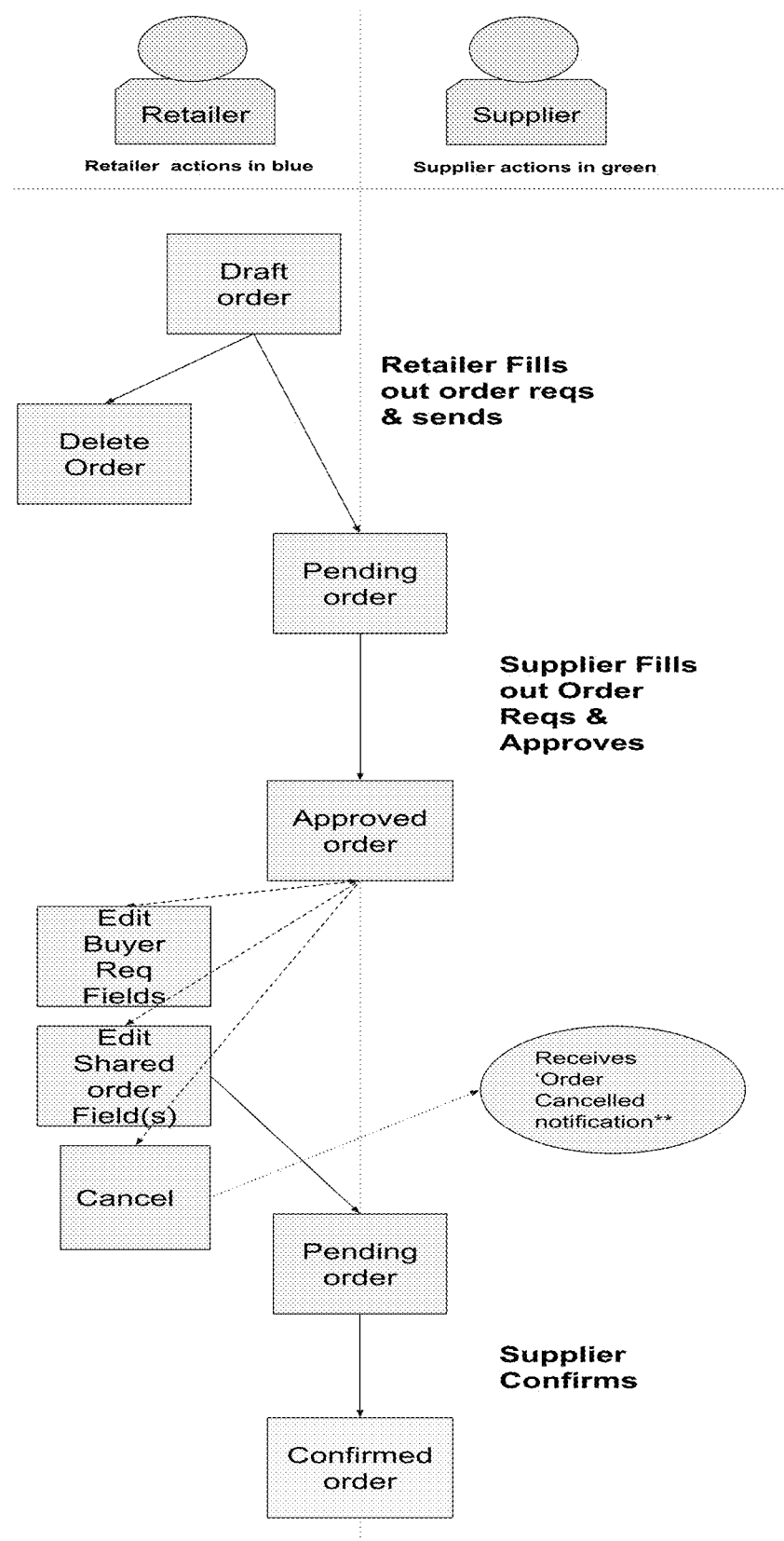
FIG. 4N illustrates an example process.

FIG. 4N illustrates an example order process. The retailer drafts the order (including order details). The retailer may cancel the order or transmit the order to the supplier. If the retailer transmits the order to the retailer, the order status is changed from draft to pending. The supplier may fill out additional needed order details and approve the order. The approved order may be transmitted back to the retailer. In response to detecting that the retailer has activated an order cancel control, the system transmits an order cancellation notification to the supplier. In response to detecting that the retailer has edited buyer required fields or shared order fields, the status of the order may be changed to pending, and transmitted to the supplier for approval or rejection. If the supplier approves the order with the changes, the status of the order is changed to confirmed.

FIGS. 4O, 4P, 4Q1 illustrates example user interfaces usable in a workflow that enables an acquirer (e.g., a retailer) to create one or more requests for quotes (RFQs), setup RFQs for specific products, and invite suppliers to respond to RFQs and RFQs for specific products. The user interfaces enable a user at the acquirer to specify details of products for which a quote is to be requested. The user may add additional information via a note interface, select suppliers to whom the product RFQs are to be transmitted to, and review received responses to the RFQs.

With reference to FIG. 4O, as similarly discussed with respect to FIG. 4A1, the example user interface enables an acquirer (e.g., a retailer) to create, edit, and invite suppliers to one or more Programs. The example user interface includes a left panel that lists programs assigned to a given product category, optionally organized by date. The user may select one of the listed program in order to view and optionally edit the program details. The middle panel displays and enables the user to edit the program details (e.g., using the form illustrated in FIG. 4B). For example, the panel may include program description fields and program relevant dates (e.g., offer due date, commitment due date, start to ship date, in-store date, etc.). A user interface is provided (e.g., a Private control) via which the user can upload, alter, and delete files (e.g., image, video, pdf, word processing, and/or other files) to be shared with other authorized users at the acquirer who have been granted access to the category (but not with suppliers). Optionally a user interface is provided (e.g., a Public control) that enables such files to be shared with an entire channel of suppliers that have been granted access to the program. For example, a list of suppliers may be provided that can be invited, via an invite control, to the program (e.g., using the example invitation to submit offers form illustrated in FIG. 4C). A program progress section may include text and/or graphed data depicting the progress made towards one or more goals (e.g., spending target goals, unit target goals, margin underruns or overruns, etc.). A right-hand panel provides a table of suppliers who have been granted access to the Program. The set of suppliers with access to the Program may be restricted to those suppliers (or a subset thereof) that have been granted access to the corresponding Category (via a Thread). The supplier information provided in the table may include the supplier's name and logo, and associated supplier products. As will be described the user can request a supplier included in the table to provide a quote (RFQ).

Figure 4P:
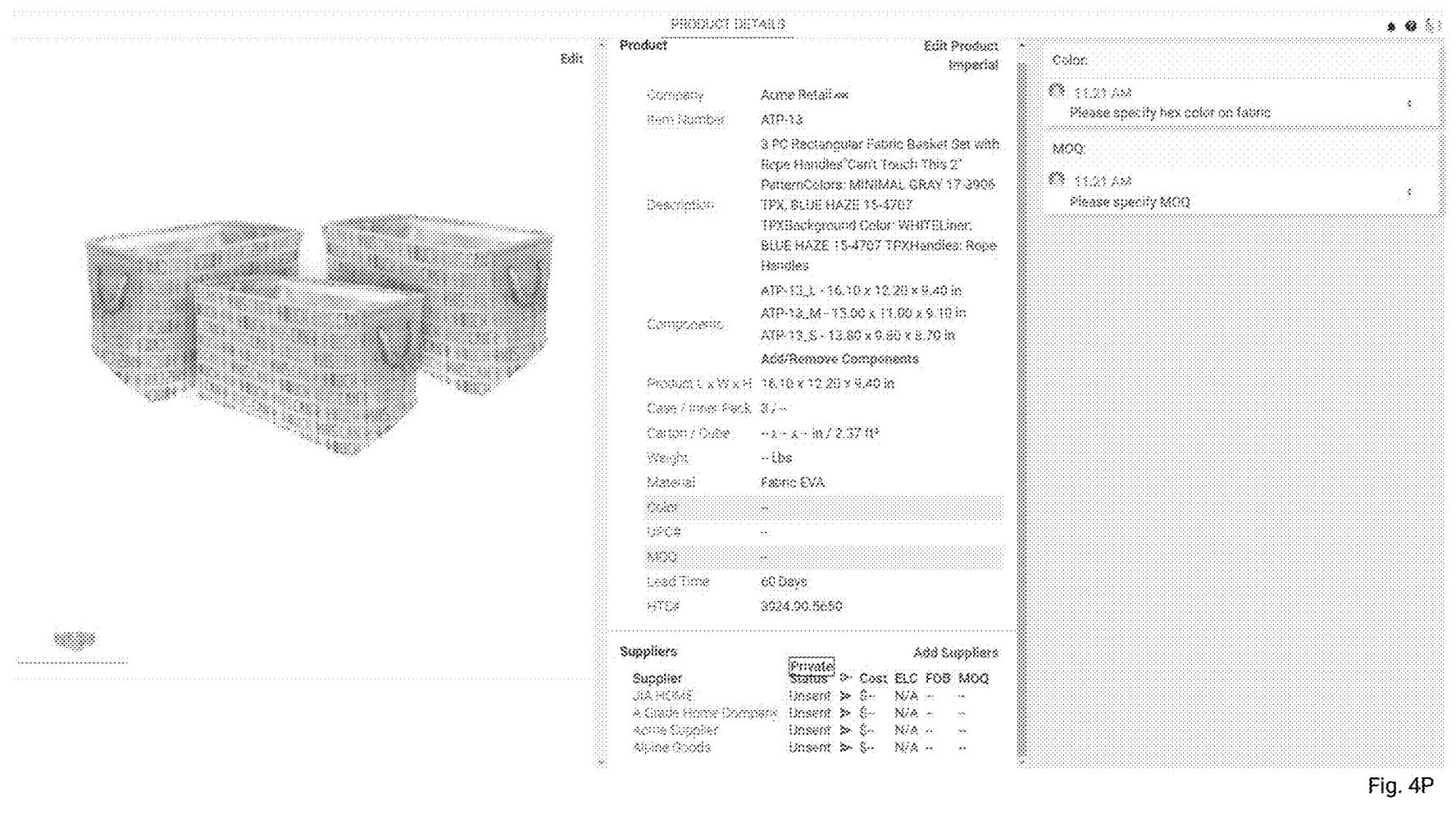

With reference to FIG. 4P, an example RFQ product details page is illustrated. In this example, the left pane includes one or more product images of the product for which the RFQ is being generated. The acquirer users can add to or remove images. The middle panel displays product details (e.g., supplier name, item number, description, components, dimensions, case data, carton/cube dimensions, weight, materials, color, UPC code, MOQ, lead time, and/or HTS number). In addition, the middle pane lists the suppliers that have been requested to provide a quote for the product with corresponding quote terms such as price/cost, minimum order quantity, FOB point, MOQ, and/or the like. Optionally, the status of a given quote request is reported (e.g., unsent, sent, response received, and/or the like). The right pane includes a notes/communication section via which the user can add additional comments, information, instructions or questions regarding the product.

Figure 4Q:
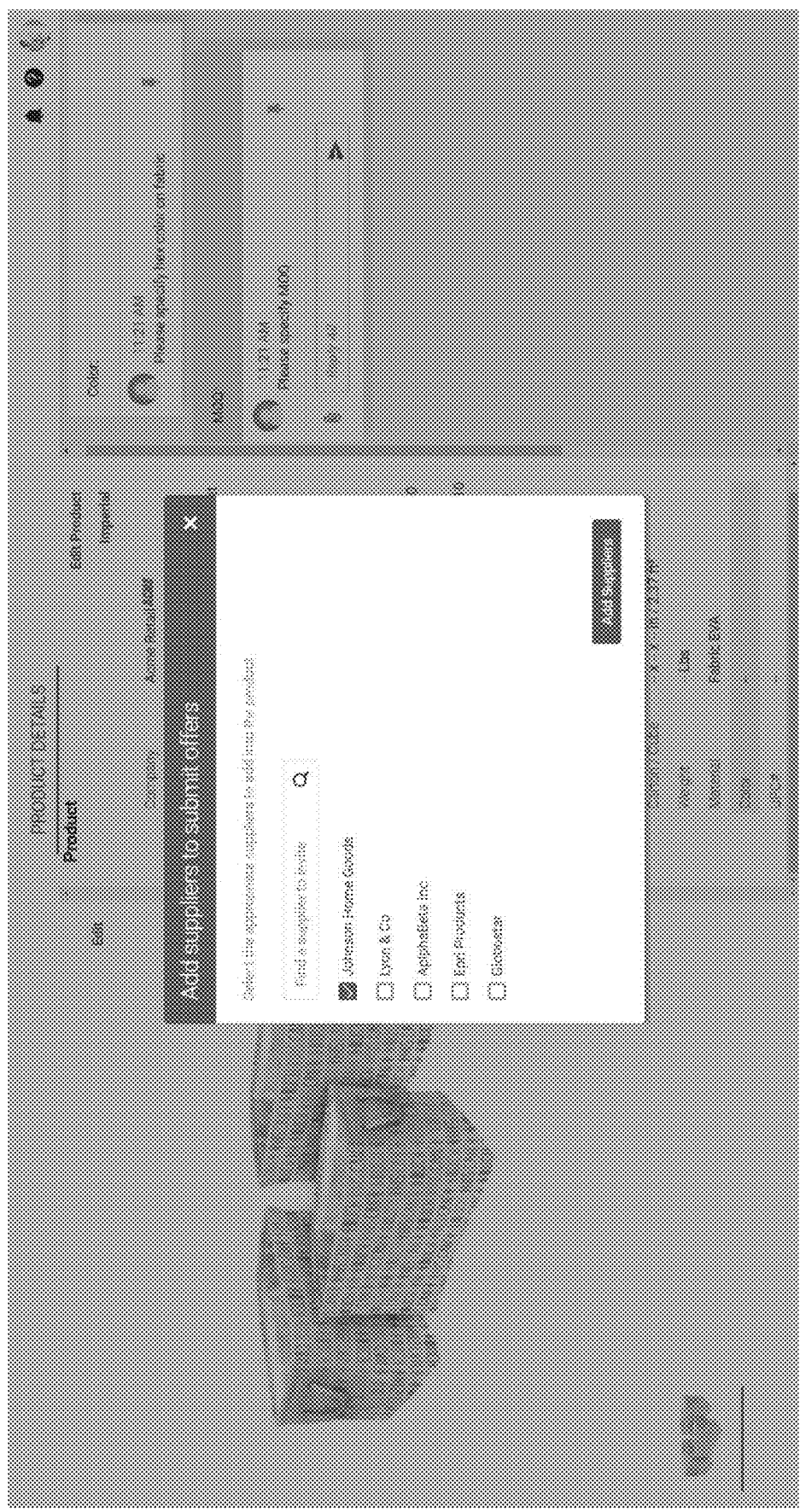

With reference to FIG. 4Q, an example invite user interface is illustrated. A list of potential suppliers is provided. A user can select one or more of the potential suppliers to whom an invite to respond to the specific RFQ will be transmitted.

Figure 4R1:
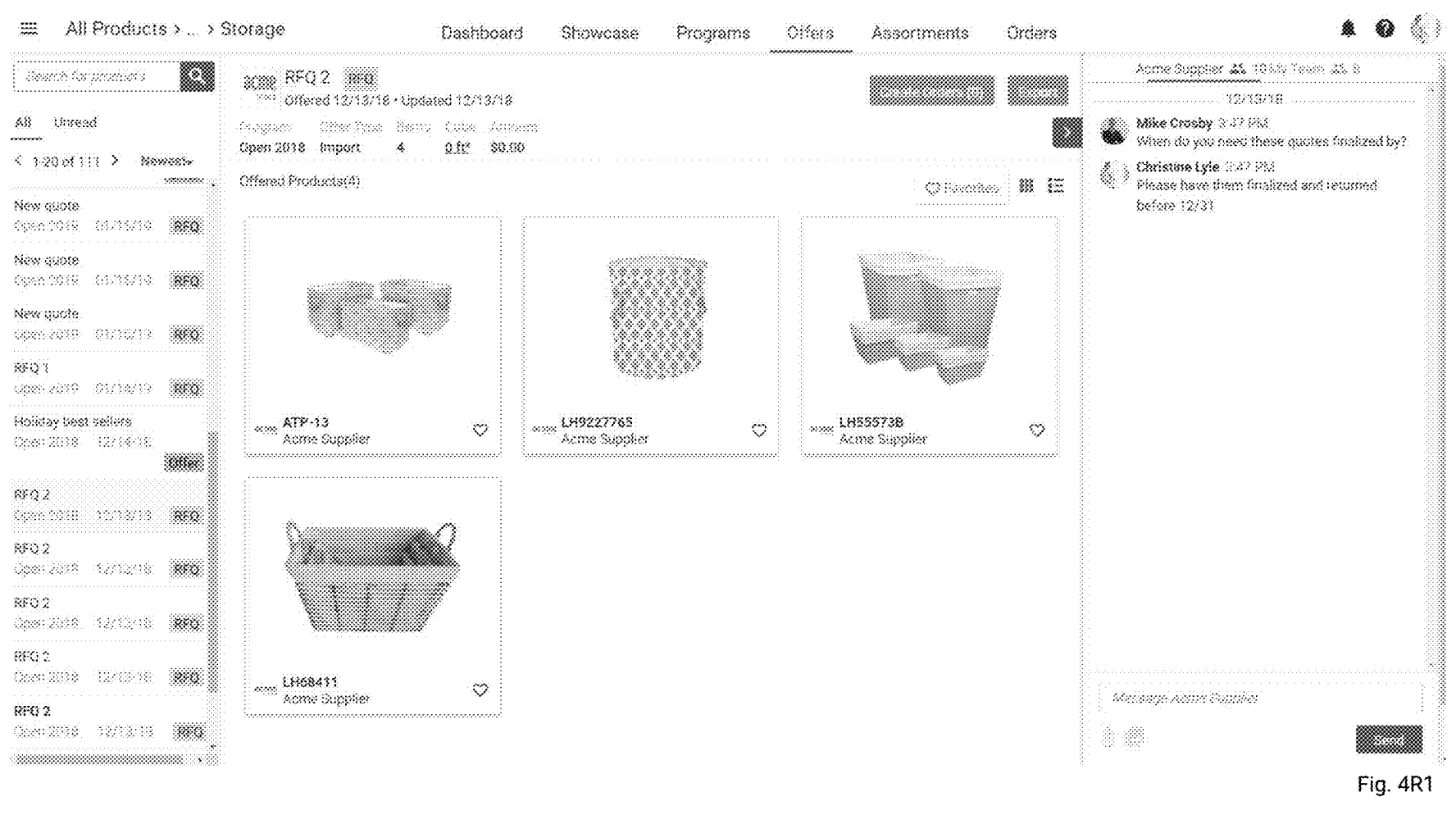
Figure 4R3:
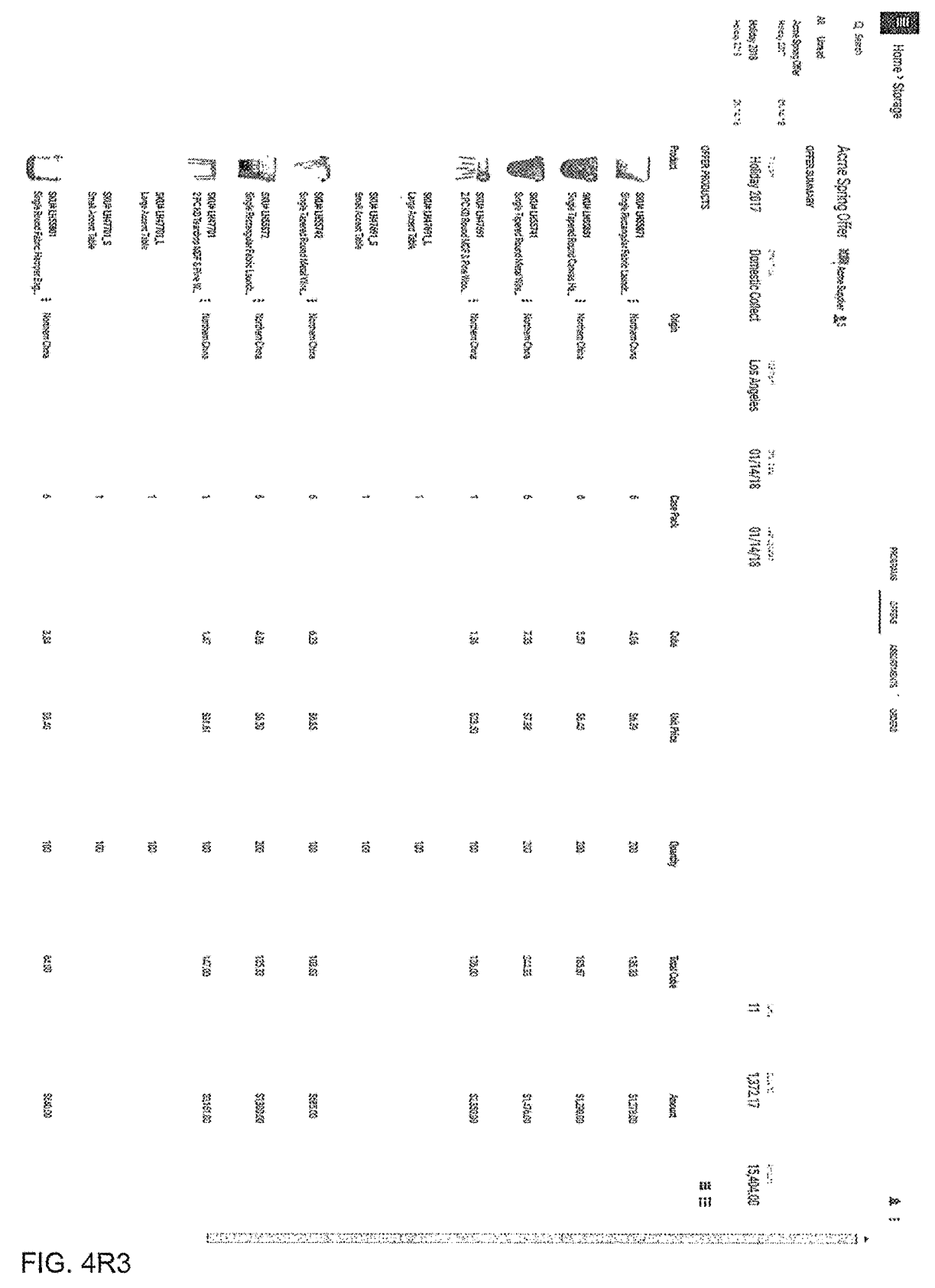

With reference to FIGS. 4R1, 4R2, 4R3, example offers received user interfaces are illustrated. The user interfaces may be intended to be used by an acquirer user to view and manage offers. In this example, the left pane lists offers received in response to an RFQ and RFQ for which offers have not yet been received. The list may include the program name associated with a given offer, and an associated data and/or time. The middle pane may include images of the products being offered displayed in association with the corresponding supplier name and product identifier. The right pane may include a communication section via which the user can view and provide alternate terms, comments, information, instructions or questions regarding the RFQ or product from or to an identifier supplier. Thus, the user interface may be utilized to negotiate the terms of a corresponding RFQ. With reference to FIG. 4R3, an example acquirer's view of an offers received user interface in table format is illustrated.

The "offers" user interfaces illustrated in FIGS. 4R2, 4R3 may be utilized by a user at the acquirer as an inbox of incoming "offers" for products which are sent by supplier users. The illustrated user interfaces enables a user to review recently received and recently updated offers and begin to triage which offered products the user wants to consider further (e.g., by selecting a like control) and which offer products they no longer want to consider to buy (e.g., by activating a delete control). A control is provided that enables the user to toggle between a user interface displaying offers via a product card layout (FIG. 4R2) and the table layout (FIG. 4R3) providing smaller images but more product details. Thus, the user interfaces can be configured to format and provide data so as to provide the most relevant details (e.g., larger images, more text description) needed at a given time.

In these example, a left-hand pane lists received offers, and indicates new and unviewed activity/offers (e.g., via sorting items so that the unviewed items are on top and/or via bolding of text). The user can select a given offer in the left hand pane, and the corresponding offer information is accessed and displayed in the middle pane. The offer information may be in the form of an offer summary, including some or all of the following fields: program name, offer type, FOB point, offer date, offer updated date, items, case pack, quantity, cube, amount, and/or the like. Underneath the offer summary section, a set of offer products may be displayed, laid out in product card or table layout with information. The information may include some or all the following information: the product image, the product item number, notification badge, origin, case pack, unit price, cube, quantity, total cube, and amount. In both representations, offer products that have been "Dismissed" (e.g., via a corresponding control to indicate that the offer products will not be further considered with respect to the RFQ), are distinguished from the other offer products. In the example illustrated in FIG. 4R2, the user can select an item via a corresponding checkbox, and then dismiss or restore the selected product. In the example illustrated in FIG. 4R3, the user can select an item via corresponding vertical ellipses.

Figure 4S:
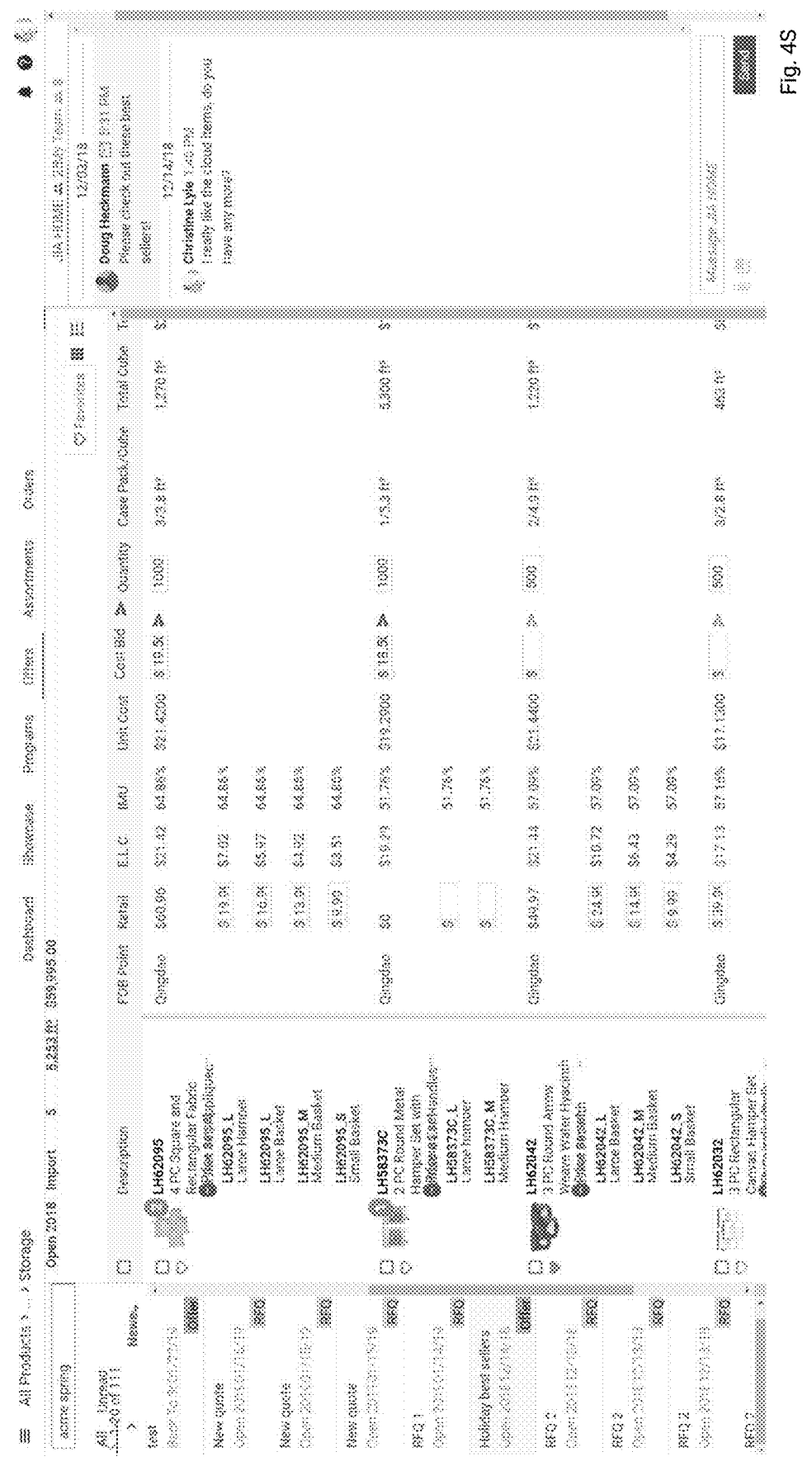

With reference to FIG. 4S, the example offers user interface may be used to negotiate an order and place an order. For example, the acquirer user may change values as a counter-offer to a supplier (e.g., cost bid, quantity, etc.) and/or via a communication via the right hand pane.

Figure 4T:
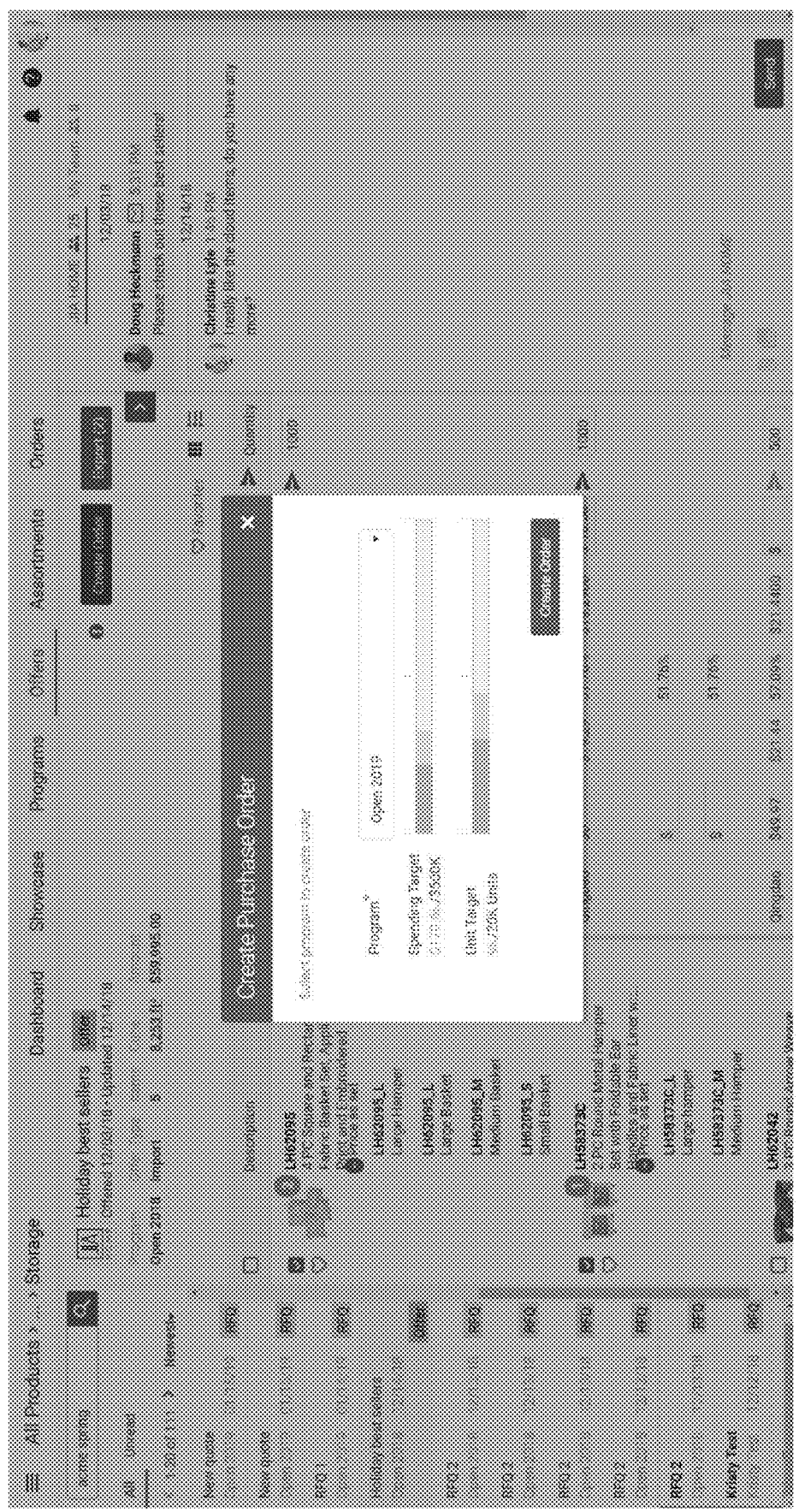

With reference to FIG. 4T, the user may place an order with one of the suppliers. When the user initiates the order operation, a pop-up user interface is presented via which the user can specify which program the order is for. In addition, the spending target and unit target calculations may be re-executed based on the order and presented to the user.

Figure 4U:
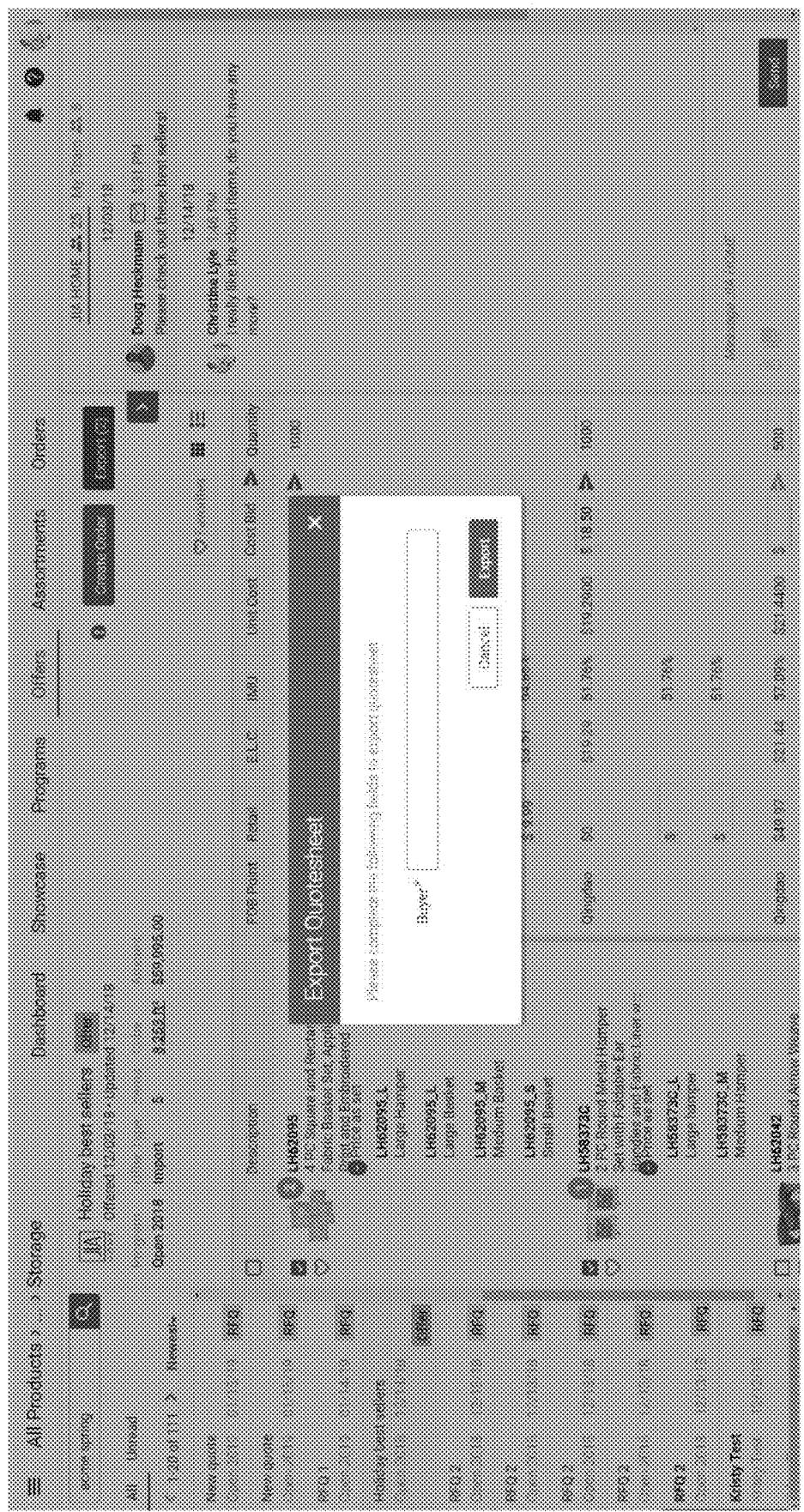

With reference to FIG. 4U, the example user interface enables the user to export quote sheet data for a specified buyer.

Figure 4V:

With reference to FIG. 4V, an example Offer Product Details user interface is illustrated. A pane includes one or more images of the product (e.g., from different perspectives). Another pane provides textual product data (e.g., dimensions, case pack, volume/cube size, material, color, UPC, MOQ, lead time, HTS, duty rate, freight rate, FOB/POE, freight cost, duty cost, offer type, etc.). Another pane may display the negotiation history for the product order. For example, the history may be presented in column format including the negotiation event (e.g., original quoted price, counter offer, supplier counter offer, purchaser requested price), price, margin (as a percentage and/or dollar amount), event date, and/or the like. A calculation pane may be provided. Fields are provided via which the user can enter certain data to be used in the calculations (e.g., freight rate, target retail price, margin, etc.). Functions provided via the user interface may include calculation tools to calculate estimated landed cost, margin, retail price, and the cost the product needs to be purchased at so as to achieve the target margin. A field is provided via which the user request and specify a different price. A communication pane is provided via which additional comments, information, instructions or questions regarding the product or offer may be communicated, and a log of such communications may be presented. For example, the communication pane may be used to message all users that have access to the product, or all users within the user's organization that have access to the product. A control may be provided that enables the user to specify which group the user wants to message (e.g., by toggling the organization buttons directly above the communication input pane). In addition to messages, events such as a cost bid, a price change, and field updates may be displayed in the chat history creating a fluid timeline of communication about and updates to the offer product.

A control may be provided that enables the user to add the offer product to a Program, thereby enabling the offer product to be considered and compared with other products from the same or different suppliers from which the buyer user will make a final purchasing decision.

Figure 5A:
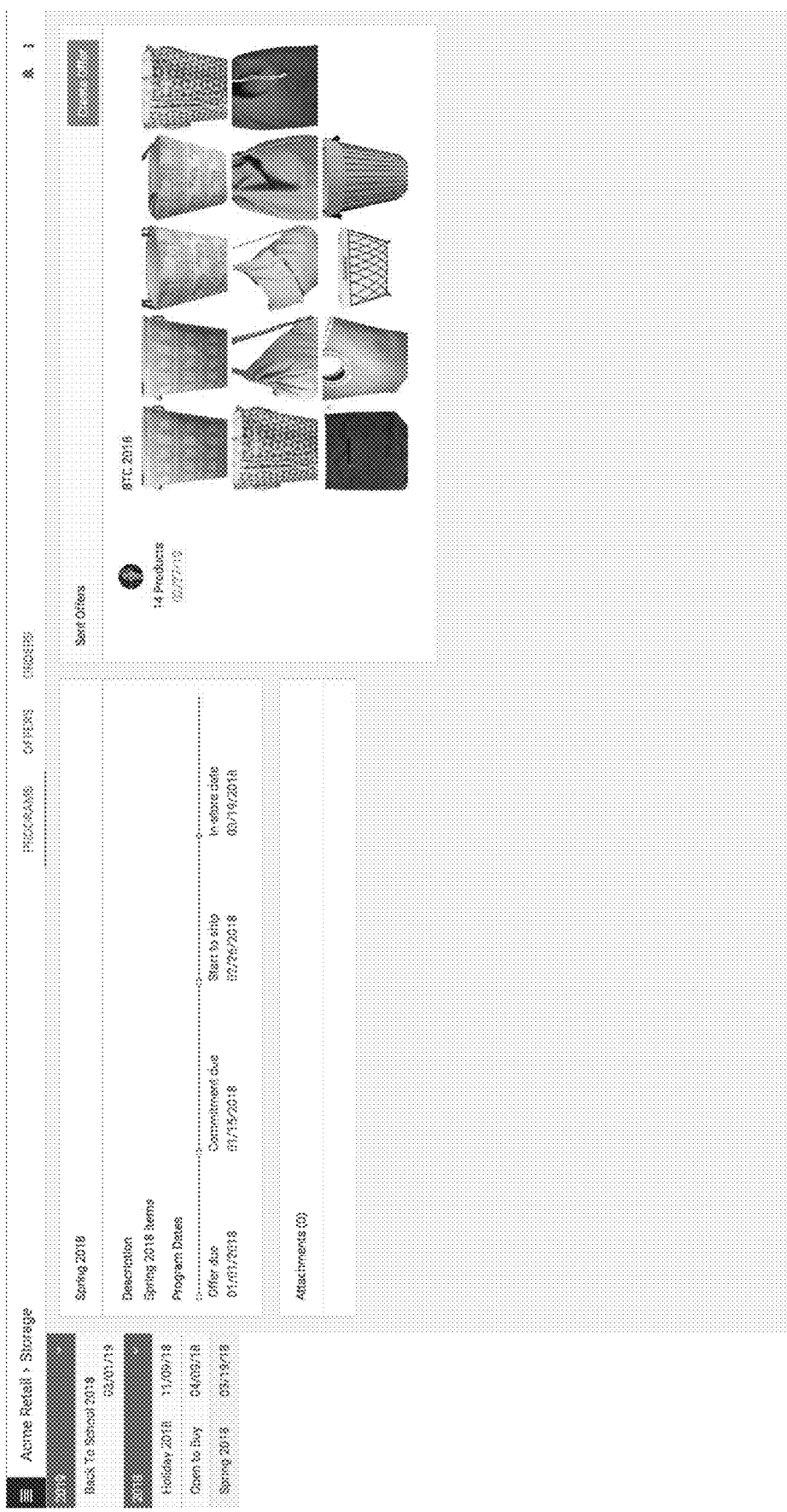
FIGS. 5A-5K illustrates additional example user interfaces.

Certain example user interfaces related to seller/supplier workflow will now be described. FIG. 5A illustrates an example programs user interface-supplier view. The programs user interface will display to supplier users who have access to this retailer Category (Thread) all programs that the retail users have elected to share with the supplier. The supplier users may utilize the user interface to review information, such as dates related to the program and any files the retail user has shared to determine what products to offer and when to offer such products.

The programs user interface, in this representation, is comprised of distinct sections. A left side container, organized by date, with a list of programs assigned to that category. The user selects a program from the list to see the details of the program. The middle section of the user interface displays program information. Example data fields may include a description of the program, dates relevant to the program such as offer due date, commitment due date, start to ship date, and/or in-Store date (optionally listed graphically using a timeline), and any files shared by the retail user. A preview section of the user interface displays previews of offers made by users of the supplier company for this program (e.g., thumbnail images of the products on the offer, the name of the offer, a picture of the user who sent the offer, the date when the offer was sent, and/or other information).

Figure 5B:
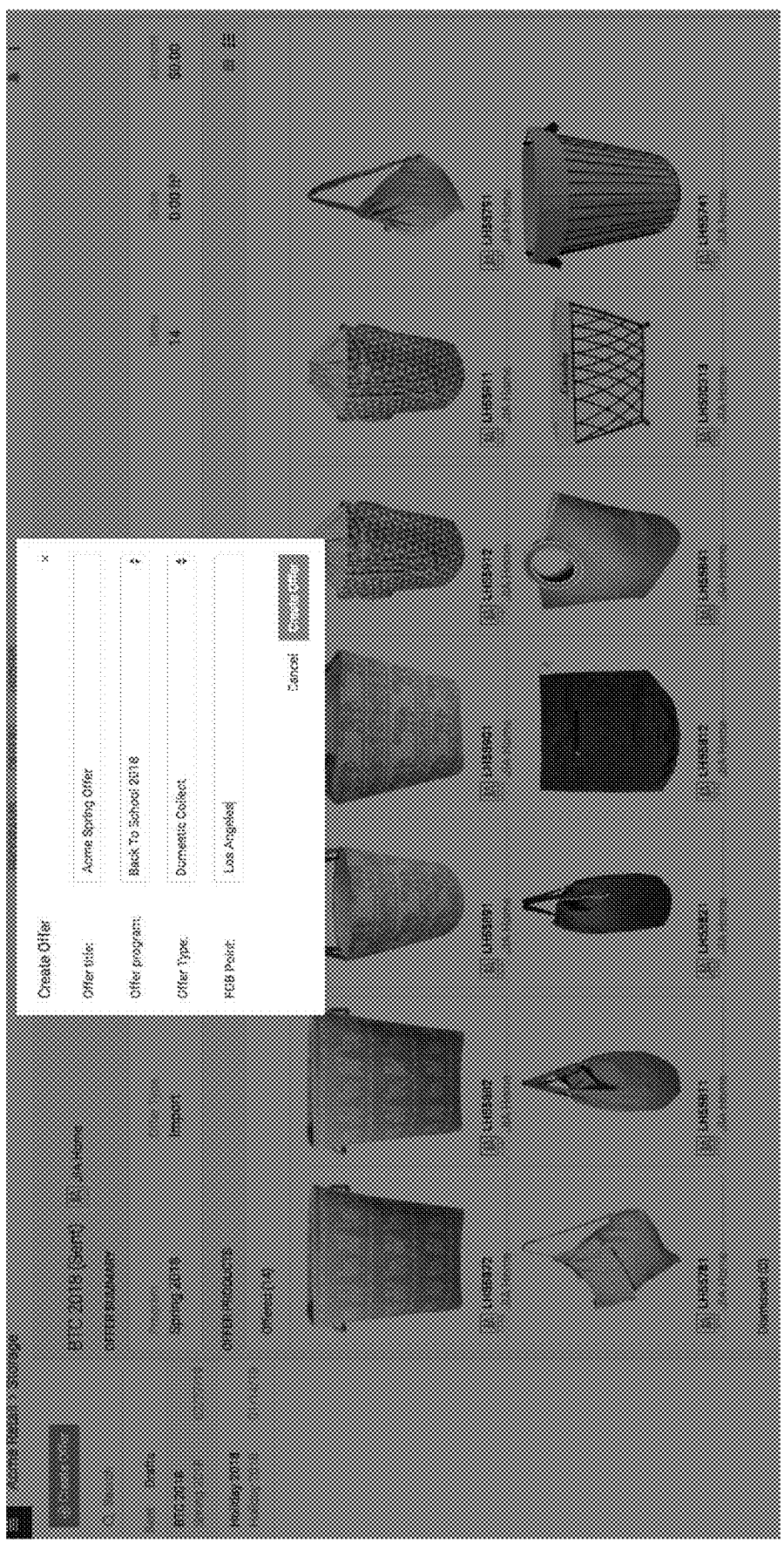

FIG. 5B illustrates an example create offer user interface which may be utilized by supplier users to create a new Offer. An Offer may include Offer Products, and may include values for certain fields (e.g., Title, Program, Offer Type, and if Offer Type is "Domestic", then FOB Point).

After completing the create offer form (FIG. 5B) the supplier user is navigated to the "Add Products to Offer" user interface (see, e.g., FIG. 5C). This user interface enables supplier users to select products from the subset of the product catalog to which they have permission to access. The supplier user may utilize browsing, filtering, and searching, to identify products to add to the offer and may select the desired products via the checkboxes on the product cards. In response to the user clicking on the "Add Products" control, a clone of each product selected may be generated and added to the Offer. Such a product may be referred to as an Offer Product. The Offer Product clones may be generated so that through the course of negotiations with any given customer the Offer Product can be altered and changed without affecting the original product in the catalog and without hindering the ability of the original product to be offered in its original form to another customer or at a different time.

This example Add Products to Offer user interface is comprised of distinct sections. The left hand element is a container of draft and sent offers that functions as an inbox in that it indicates new and unseen activity, in this instance, via sorting and bolding of text. The offers may be sorted according to date/time. A user may select Offers in this element, and in response, corresponding objects, information, and functions for the selected offer are accessed and displayed in a second section of the user interface. The second section of the user interface may display a product catalog-like element that displays the product card view of products the user has permission to access. The user can select/deselect and hover on these cards to expose more information about the product.

FIG. 5D illustrates an example draft offer user interface that enables supplier users to finalize offers before sending the offers to retailers. For example, the user interface may enable supplier users to make adjustments to data fields, such as pricing, quantity, and/or other Offer Product fields. Users can also edit details of an offer product by launching a form from the table.

The example draft offer user interface is comprised of distinct sections. The left hand element is a container of draft and sent offers that functions as an inbox in that it indicates new and unseen activity, in this instance, via sorting and bolding of text. The listed offers may be sorted according to date/time. In response to detecting a user selection of an offer in the inbox, the corresponding objects, information, and functions for the selected offer are accessed and displayed in a second section of the user interface. In this example, the right section of the user interface contains a table of offer products. The table accesses and displays product information such as item number, product image, origin, case pack, cube and provides calculation tools to help supplier users finalize price, freight rate, freight cost, duty cost, estimated landed cost, margin, cube, and/or total amount. This section also contains an offer summary element, optionally including calculations of total amount, total cube, number of SKUs, offer title, offer date, and/or updated date.

Figure 5E:
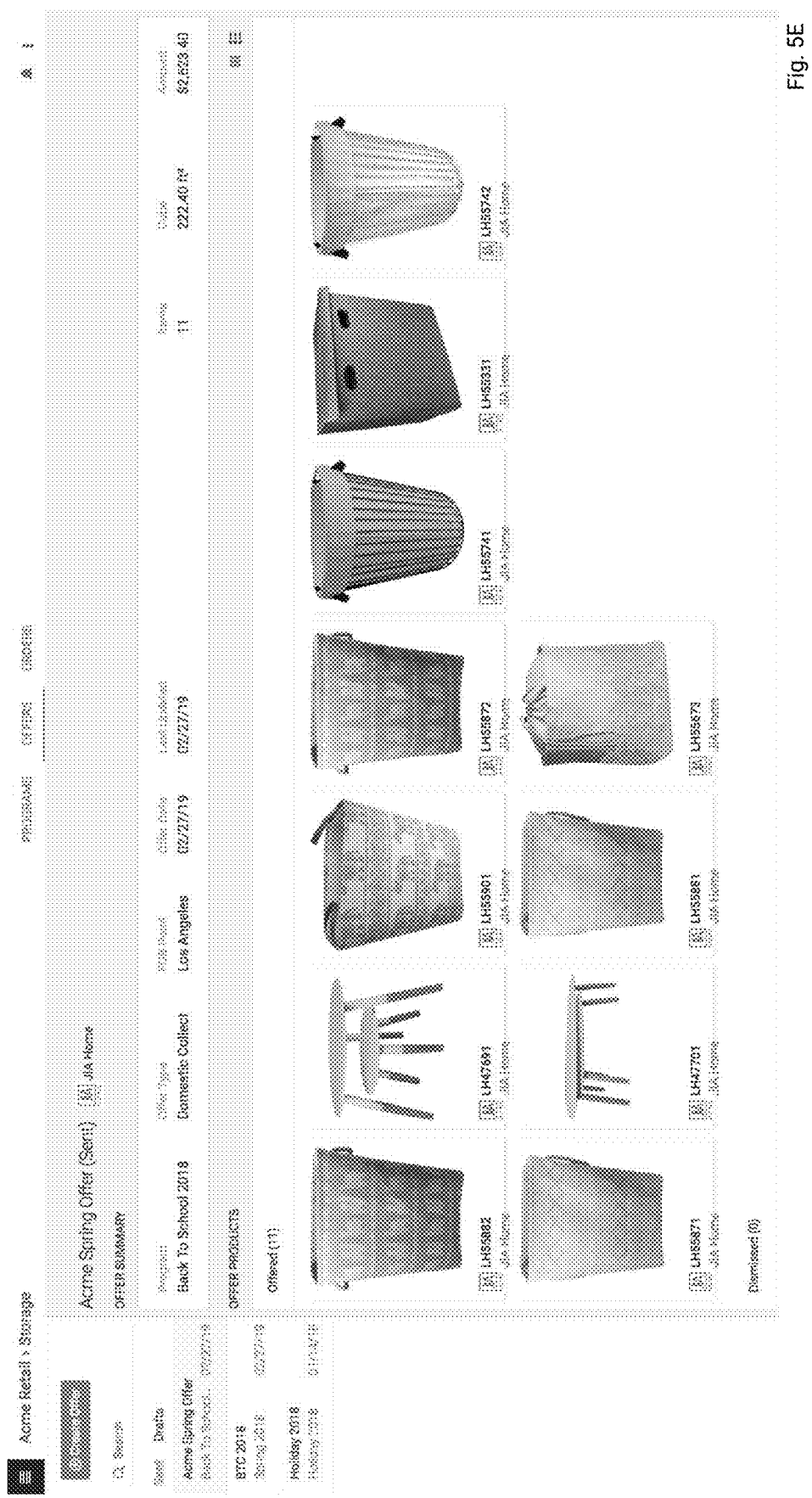
Figure 5F:
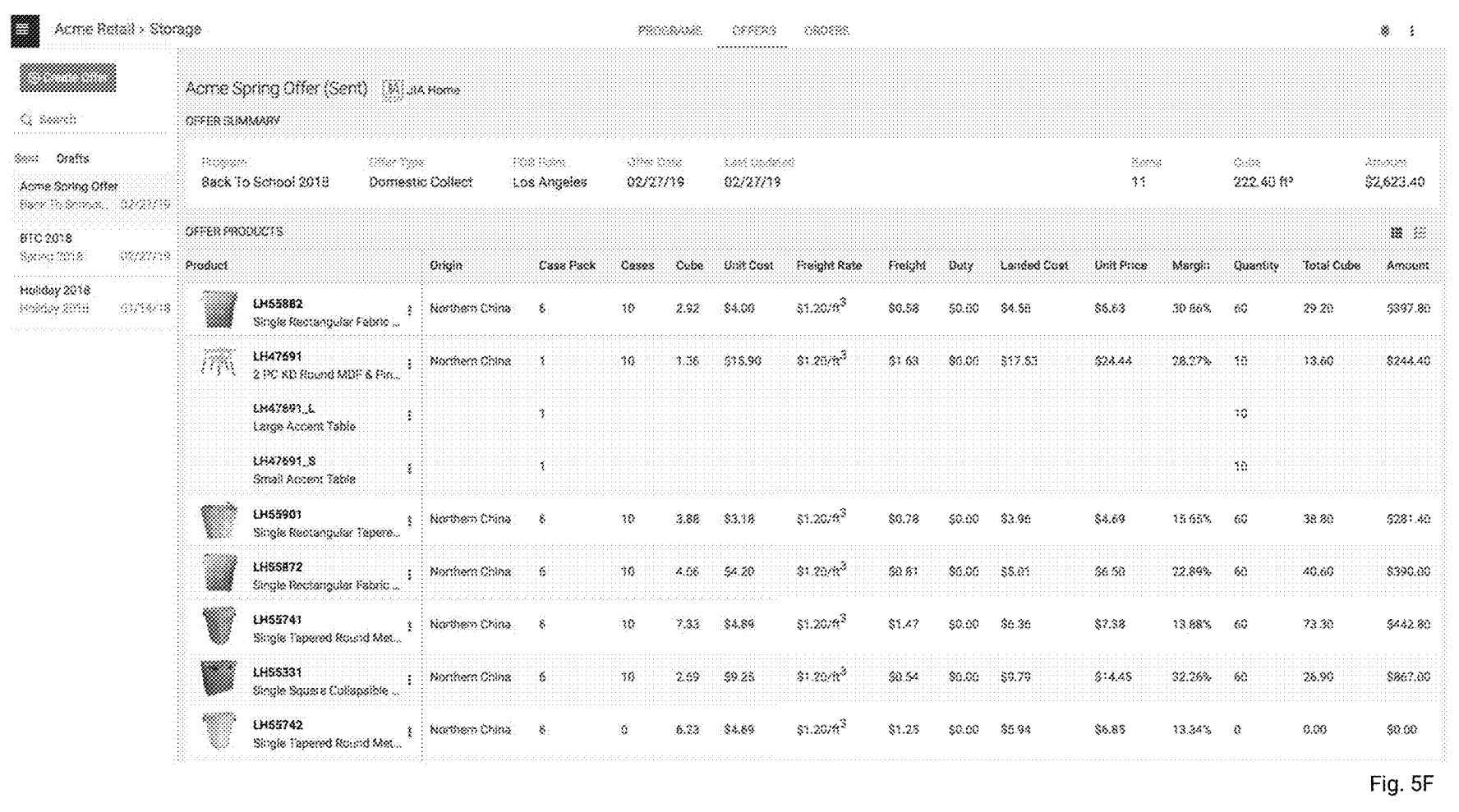

After a supplier user sends an offer, a sent offer product card view may be displayed to the supplier user (see, e.g., FIG. 5E) which serves as the launching point for communication and negotiation about individual offer products. FIG. 5F illustrates an example of the sent offers user interface that utilizes a table view to display addition information on the products (e.g., pricing, origin, duty, margin, and/or other information). Notification elements on both the product cards and in the rows of the product table may be provided that inform users that new activity has occurred on one or more Offer Products.

The user interfaces may include distinct sections. The left hand element is a container of draft and sent offers that functions as an inbox in that it indicates new and unseen activity, in this instance, via sorting and bolding of text. The activity may be sorted by date/time. The inbox element enables a user to select listed Offers, and in response, the corresponding objects, information, and functions for the selected offer are accessed and displayed in a second section of the user interface. The majority of the user interface in this example displays the offer information corresponding to the offer object selected in the first described section. In both the product card and table layouts, this section includes an offer summary (e.g., with fields such as Program, Offer type, FOB Point, Offer date, Updated Date, Items, Cube, and/or Amount). Underneath the offer summary section is a collection of Offer Products, laid out in product card or table layout with corresponding information (e.g., the product image, the product item number, Notification Badge, Origin, Case Pack, Unit Price, Cube, Quantity, Total cube, and/or amount). In both representations, Offer Products that have been "Dismissed" are textually and/or graphically distinguished from the other Offer Products.

Figure 5G:
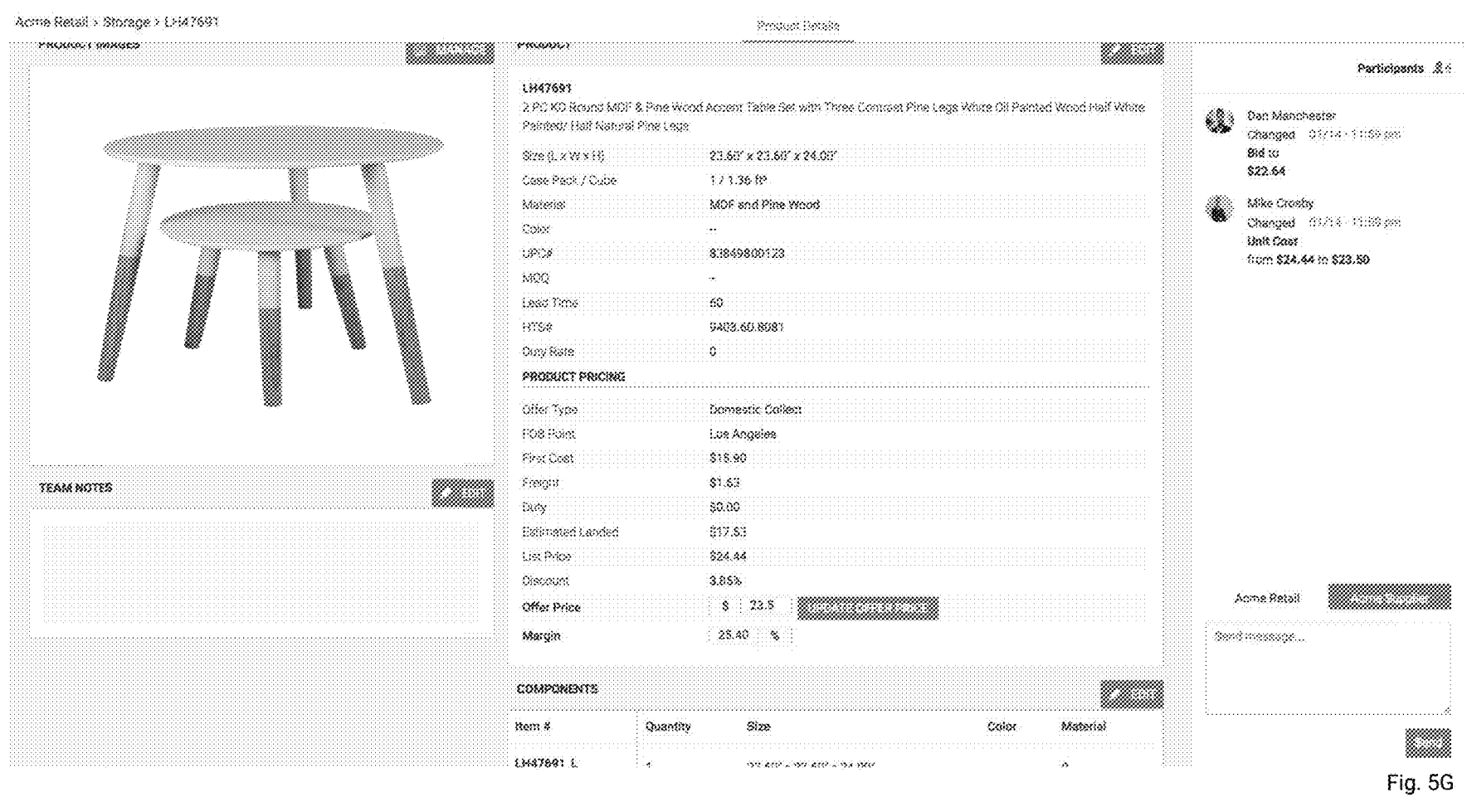

After sending offers, retail users and suppliers may communicate, collaborate, and negotiate deals utilizing an offer product details user interface. FIG. 5G illustrates an example offer product details user interface—supplier view. A subset of supplier users (those that are authorized) will see this representation of the Offer Product Details user interface, in this example, Supplier Administrator and Sales manager. Often, buyers will request changes in physical attributes and/or price. Those changes can be easily addressed by the supplier user by editing this information via the Offer Product Details user interface. Elements of this user interface, such as the middle product details panel as well as the messaging log, show the history of each change made to the product by the supplier. The supplier and retailer user may go back and forth in negotiation using this user interface until a retailer user ultimately decides to add this Offer Product to a Program or to dismiss it from consideration.

Figure 5H:
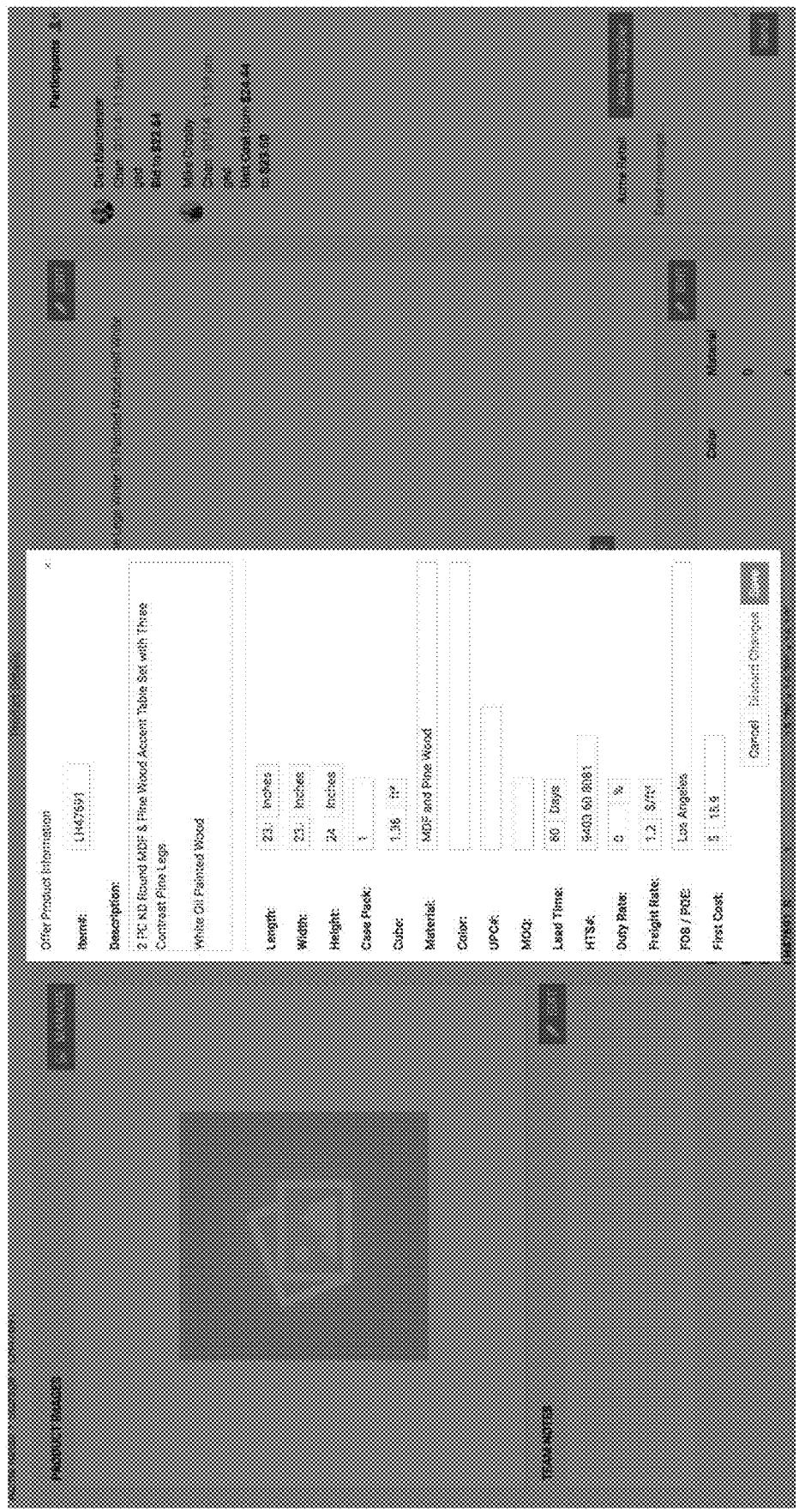
Figure 5L:
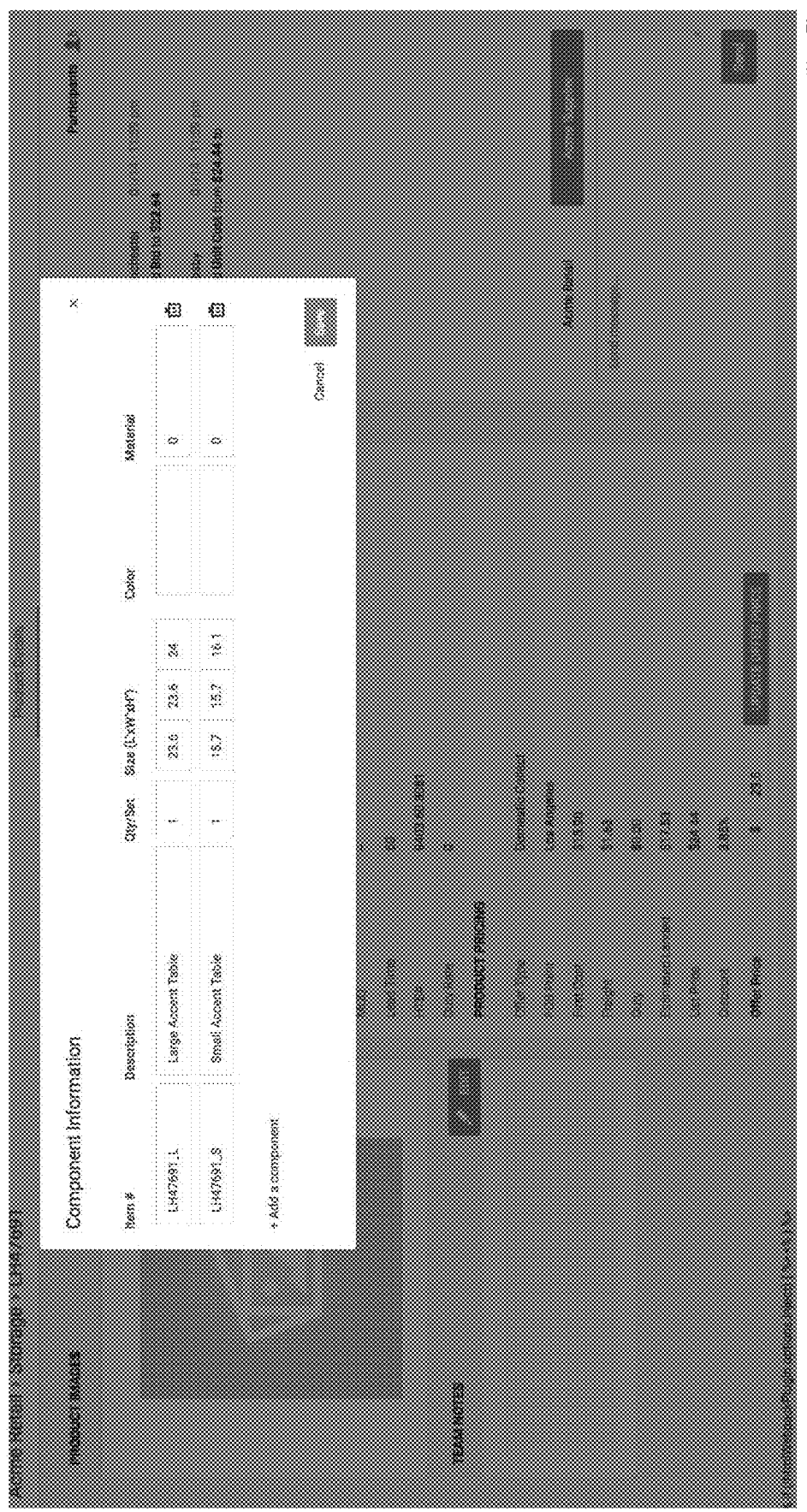

The illustrated example Offer Product Details user interface is comprised of distinct sections. The leftmost section contains a panel displaying images of the product and of product components (if any), while also affording a subset of supplier users the ability to manage/edit those images (e.g., using the user interface illustrated in FIG. 5H). This section of the user interface also contains a private notes interface via which supplier users may add notes on the offer product that will be only visible to users within their company who have access to this Offer Product (and not to the retailer users).

The middle section of the example user interface is primarily comprised of a table of the Offer product information (e.g., description, size, material, HTS, color, cube, case pack, and/or other information). This section of the user interface also contains calculation tools which may be utilized to aid the supplier user during negotiation. One subset of supplier users (in this example supplier administrators and sales managers) will be provided with access and may view the full pricing information including, for example, cost of the product, fright cost, and margin, while another subset of supplier users (in this example, sales reps) will instead see only a list price and discount percentage in the calculation tools. This portion of the user interface also contains a table of Offer Product Components—which are used for products that are sold as a set. This middle section of the user interface also has functions to launch forms to edit offer product information, including calculation tools (FIG. 5H) and edit Offer Product Component information (FIG. 5I). Optionally, the supplier users are provided the sole ability and discretion to edit/alter Offer Products and Offer Product Components. The rightmost section of the user interface is comprised of a chat/messaging panel that users utilize to communicate with every user that has access to this offer product as well as to only users within the user's same company with access to this Offer Product. This chat/messaging panel also includes a log of all the changes made to the Offer Product information.

FIG. 5I illustrates an example component edit user interface that enables a user to edit component information for an Offer Product.

After supplier users and retailer users finalize the product details and pricing, retailer users may send supplier users an Order with one or more Order Products contained on the order. Optionally, attributes of Order Products are locked at this stage so that no details may change once the supplier and retailer users have progressed to this step. Supplier users may review, via a pending order—supplier view user interface (FIG. 5J) the information contained on the order such as quantity of products ordered, terms, ship date, destination, and other information and decide whether or not they can fulfill this order as written. If they need to request an adjustment from the retailer users they may communicate with the retail users via the chat/messaging panel. Changes to the order are detected and displayed via the chat/messaging panel. Once acceptable to supplier users, a subset of supplier users (in this example, authorized users such as supplier administrators and sales managers) are enabled to approve the order.

Figure 5J:
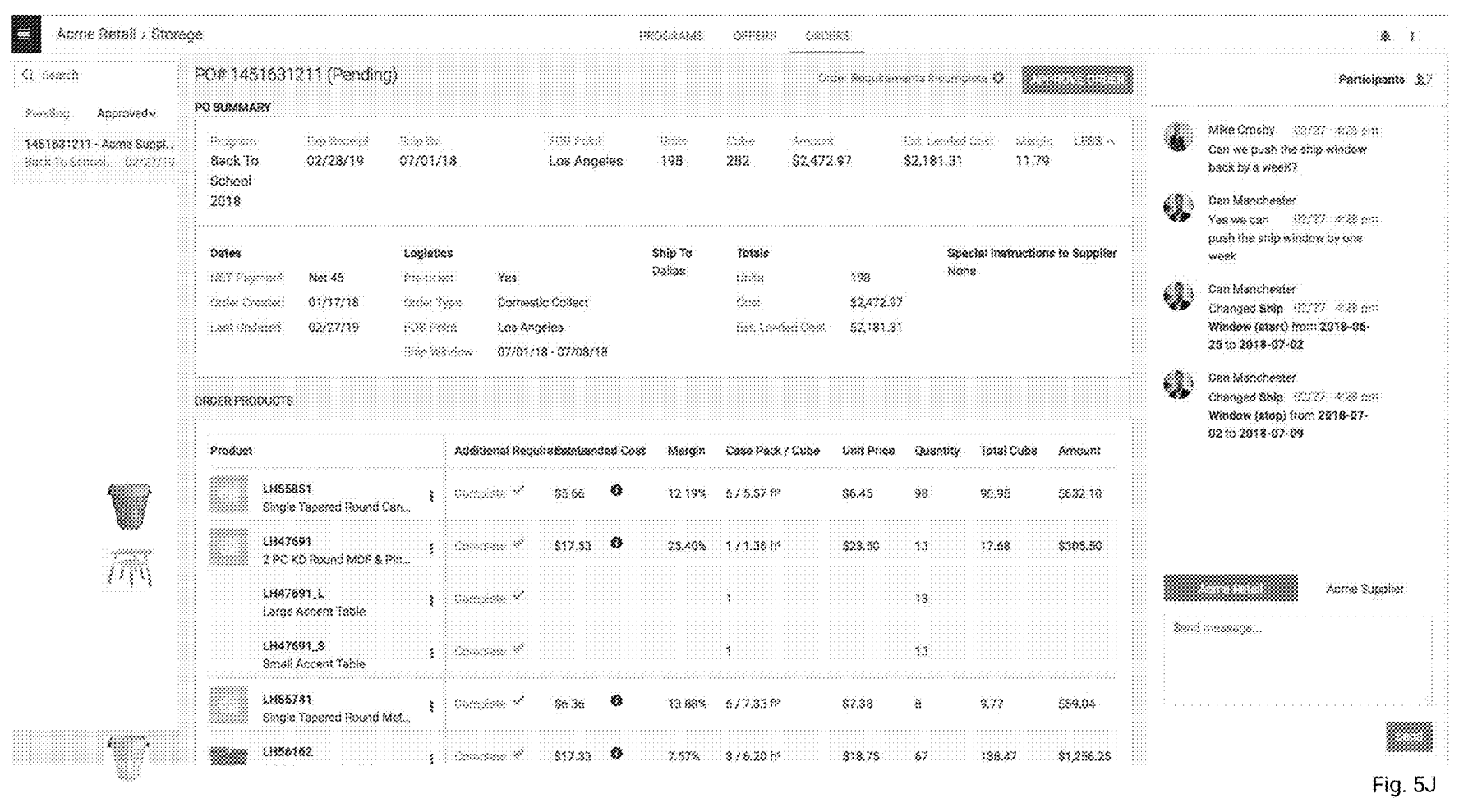

The example Pending Order user interface illustrated in FIG. 5J is comprised of distinct sections. A container of orders on the left side of the user interface functions similarly to an email inbox and similarly to the container of offers described in FIGS. 5A, 5B. The middle section of the user interface contains information, objects and functions related to the order selected via the order container. The objects may include a table of Order Products and Order Product Components with details about each (e.g., Unit Price, Margin, Quantity, and/or other information) and a summary of the order. Functions provided may include calculation tools to calculate Estimated Landed Cost, Margin, Total Cost, and/or Total cube. Here the suppliers also have the ability to provide any information needed to execute a purchase order that may not have been necessary to the purchasing decision, such as providing UPC for new products. This type of information is collected via Order Requirements, Order Product Requirements, and Order Product Component Requirements, and any existing requirements will need to be completed by supplier users before they are enabled to approve an order. The rightmost section of the user interface is comprised of a chat/messaging panel where users can message all other users who have access to this Order or all other users from their own company who have access to this Order. This panel also displays a change history/revisions log of any changes to the order information.

After a supplier user has approved the order the retail user is enabled to export the order into an existing ERP (Enterprise Resource Planning) system to execute and transmit the approved order. Supplier users and retail users are still enabled to communicate with each other about the order via the chat/messaging panel, but any material changes to the information of the order (which optionally only retail users are enabled to make) will change the order status back to "Pending" and may require additional approval from the supplier user.

Figure 5K:
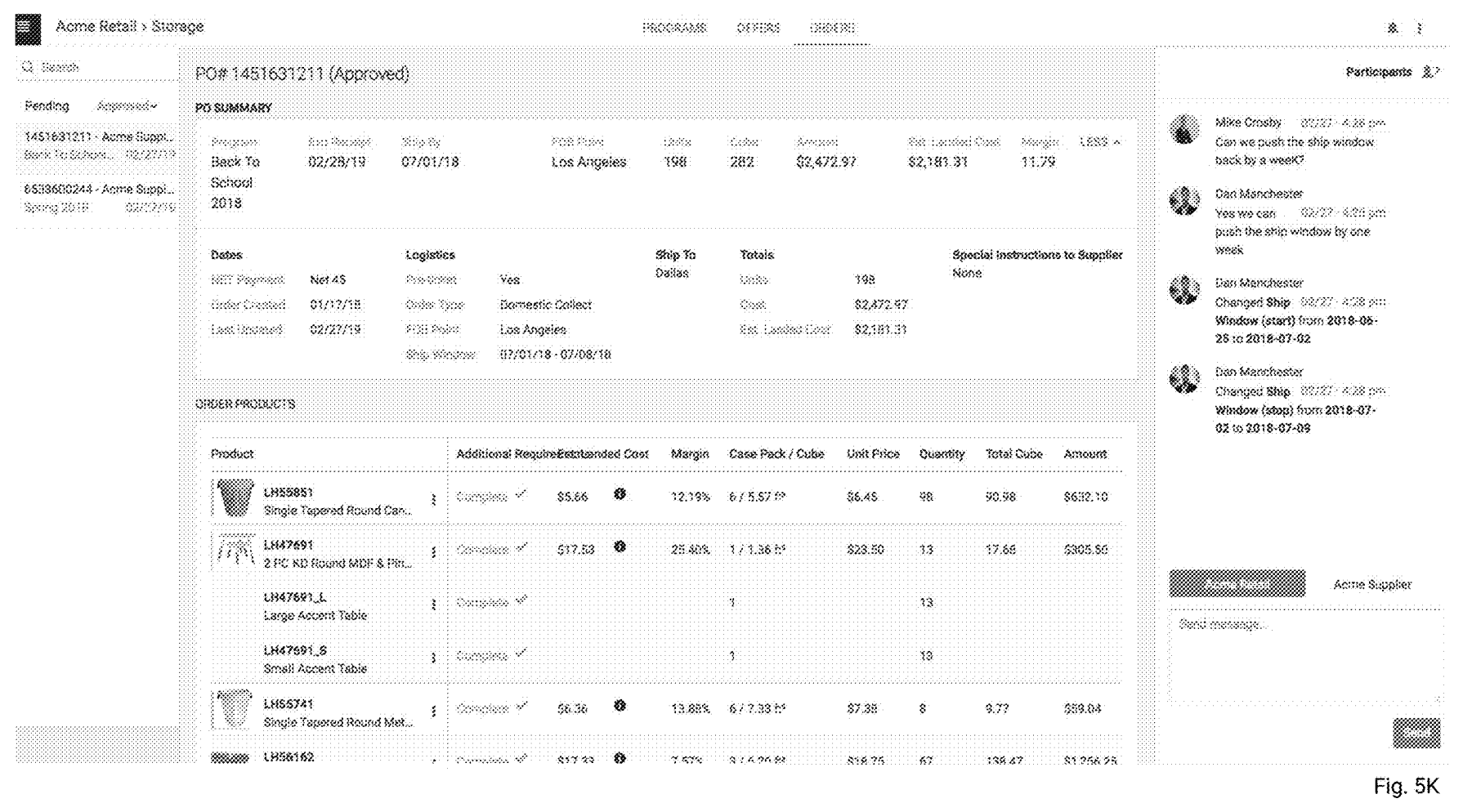

FIG. 5K illustrates an example Approved order user interface, comprised of distinct sections. A container of orders on the left side of the user interface functions similarly to an email inbox and similarly to the container of offers described above. The middle section of the user interface contains information, objects and functions related to the order selected via the order container section. The objects may include a table of Order Products and Order Product Components with details about each (e.g., Unit Price, Margin, Quantity, and/or other information) and a summary of the order. Functions available may include calculation tools to calculate Estimated Landed Cost, Margin, Total Cost, and/or Total cube. The rightmost section of the example user interface is comprised of a chat/messaging panel where users can message all other users who have access to this Order or all other users from their own company who have access to this Order. This panel also displays a change history/revisions log of any changes to the order information.

As discussed above a given entity may perform both acquisition functions (e.g., purchaser of items) and supplier functions (a seller of items). FIGS. 6A-6F illustrate example user interfaces that may be used by an entity that performs both acquisition and supplier functions. The user interfaces may be used as part of a workflow utilized buy different users in different business units (e.g., a business unit that performs acquisition functions and a business unit that performs supplier functions) within the same entity to pass information back and forth for specific functions available only to either set of users in either business unit.

For example, when an entity is in the process of suppling a product to a customer, the customer may have made related requests (e.g., regarding color, size, materials, configuration, packaging, etc.) that can affect how the product is manufactured. Such requests and other related information can be useful information for future product development and item procurement. A notes/comments section may be provided within certain user interface that enables users at the entity to make notes on products. Such product notes may optionally be segmented in threads by using different fields as segmentors. Users at the entity can transfer such information to other users within the entity who have access to different business units (e.g., procurement/acquisition units). Users can also highlight (e.g., "Pin") such notes to call additional attention to individual notes.

Data in acquirer and supplier workflows may include multiple subsets of data and multiple subsets of communications. For example, there may be data that is private to users at a first business unit within a first entity. There may be data that is private to users at a second business unit within a second entity. There may be data that is shared by both users in the first business unit within the first entity, and users in the second business unit within the second entity. There may be communications that are private to users at the first business unit within the first entity. There may be communications that are private to users at the second business unit within the second entity. There may be communications that are shared by both users in the first business unit within the first entity, and users in the second business unit within the second entity.

Figure 6A:
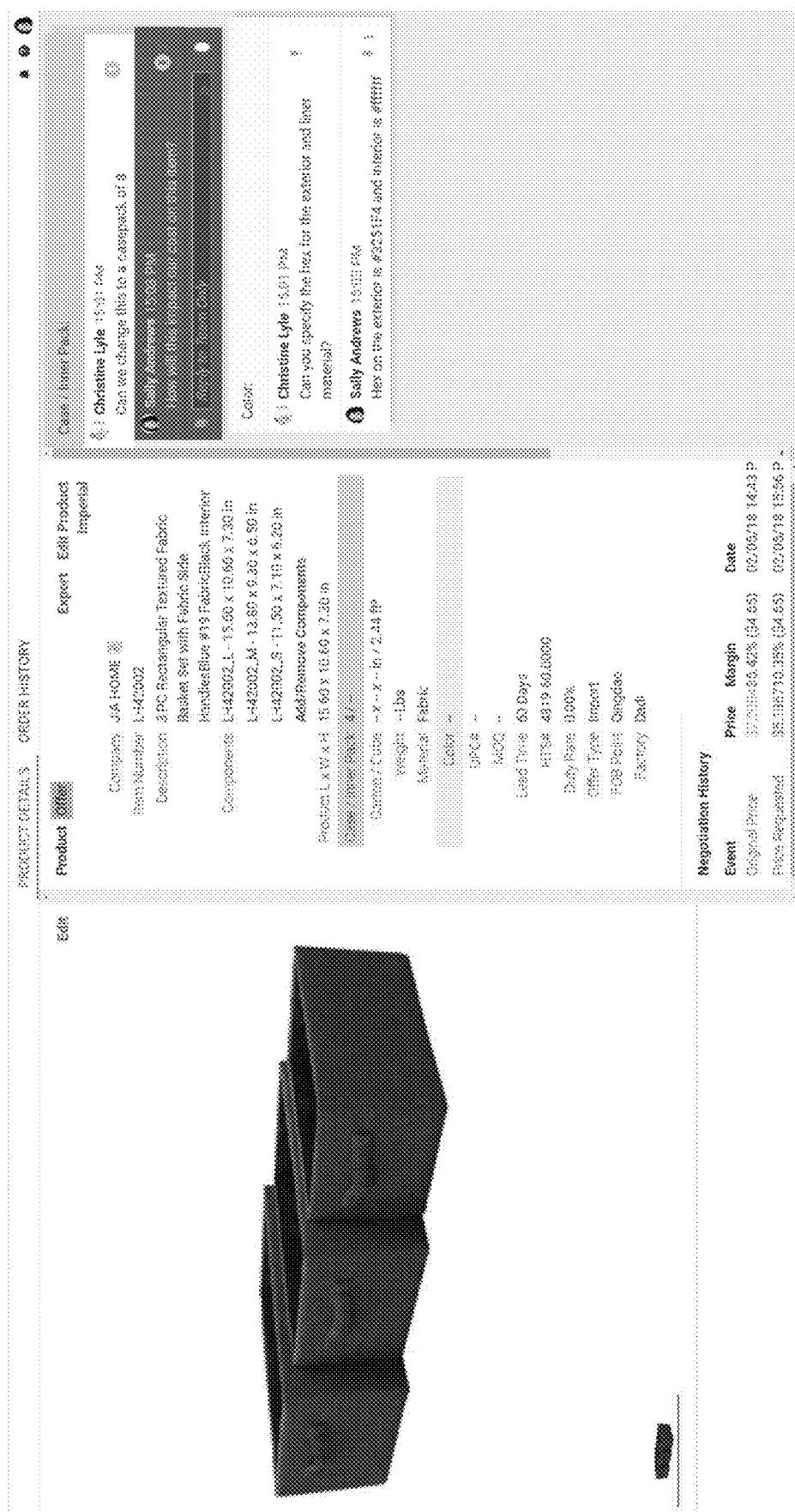
Figure 6B:
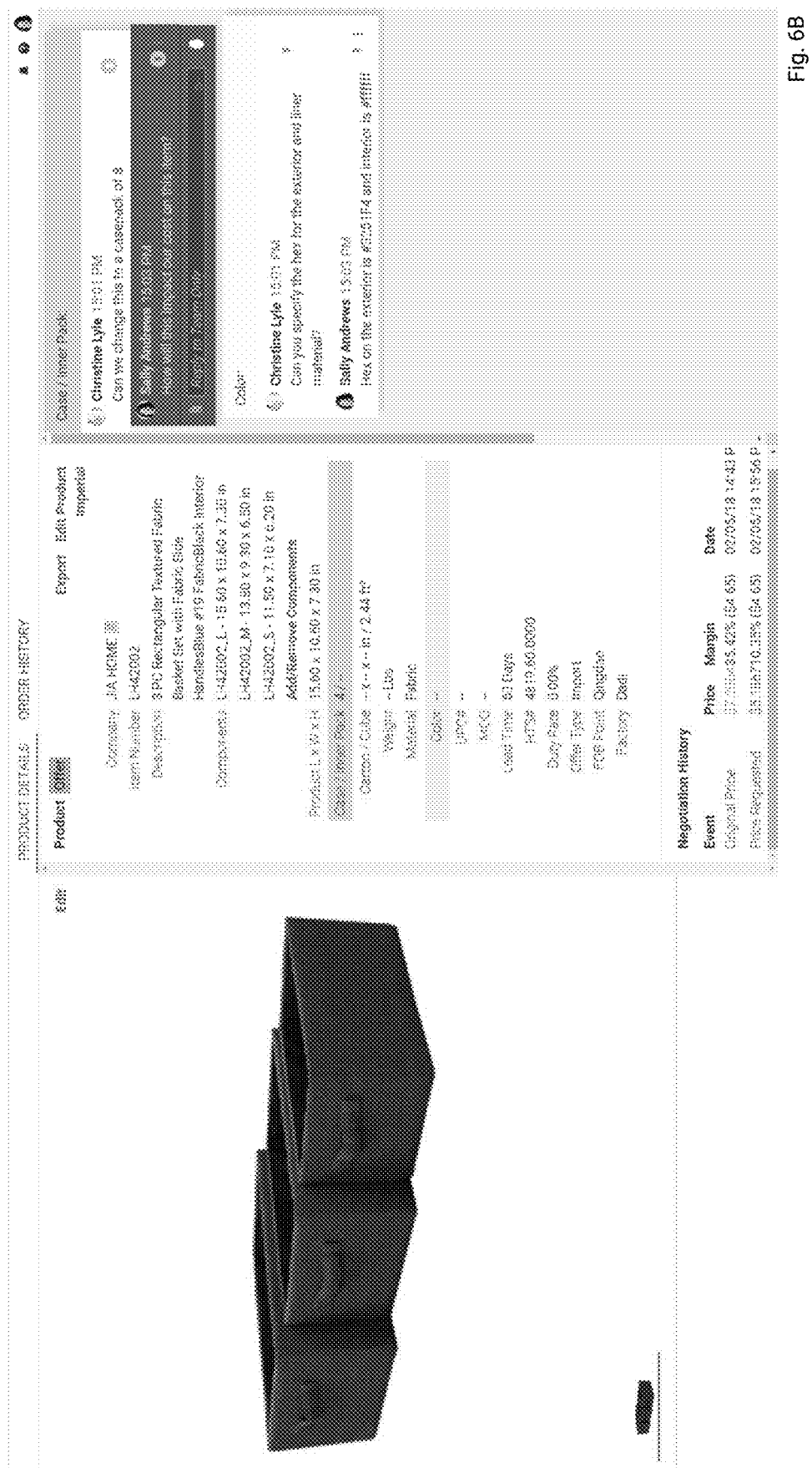

Referring now to FIGS. 6A, 6B, the illustrated user interfaces include a left pane wherein one or more images of the Offer Product are displayed. Supplier-side users may update the images that appear in this pane, add images to the pane, or delete images from the pane. The middle pane in this example includes a table containing product details such as item number, description, case pack, cube, lead time, color, material, size, HTS, MOQ, product components, and/or additional data. The middle pane may optionally also include pricing tools that enable the supplier user to quickly and accurately determine such data as estimated landed cost, margin, unit price, and what sales price for the product needed in order to achieve the desired target margin. A supplier-side user may edit/modify the product related data displayed in this section.

The right panel in this example includes a communication interface and event log via which users can message either all users that have access to this product, or all users within their own company that have access to this product. These messages (e.g., with questions regarding the product, regarding changes to the product, regarding packing the product for shipment, regarding cost impact of changes, and the like, answers to such questions, comments, etc.) are grouped into notes which are segmented into different threads using the fields of the product data as segmentors. For example, communications/notes may be analyzed and grouped as relating to product components, product dimensions, case/inner pack, carton/cube, weight, material, color UPC, MOQ, lead time, HTS, duty rate, offer type, FOB point, factory, etc. The user interface enables a user, via a control associated with a new message form, to selectively transmit a given note (or all notes) to just the user's team members (e.g., on the supply side) or to team members on both teams (e.g., supply side and procurement teams). Advantageously, such notes may also serve as a change log of changes to the product information, where a change is displayed in the corresponding changed field's note thread/category.

Figure 6C:
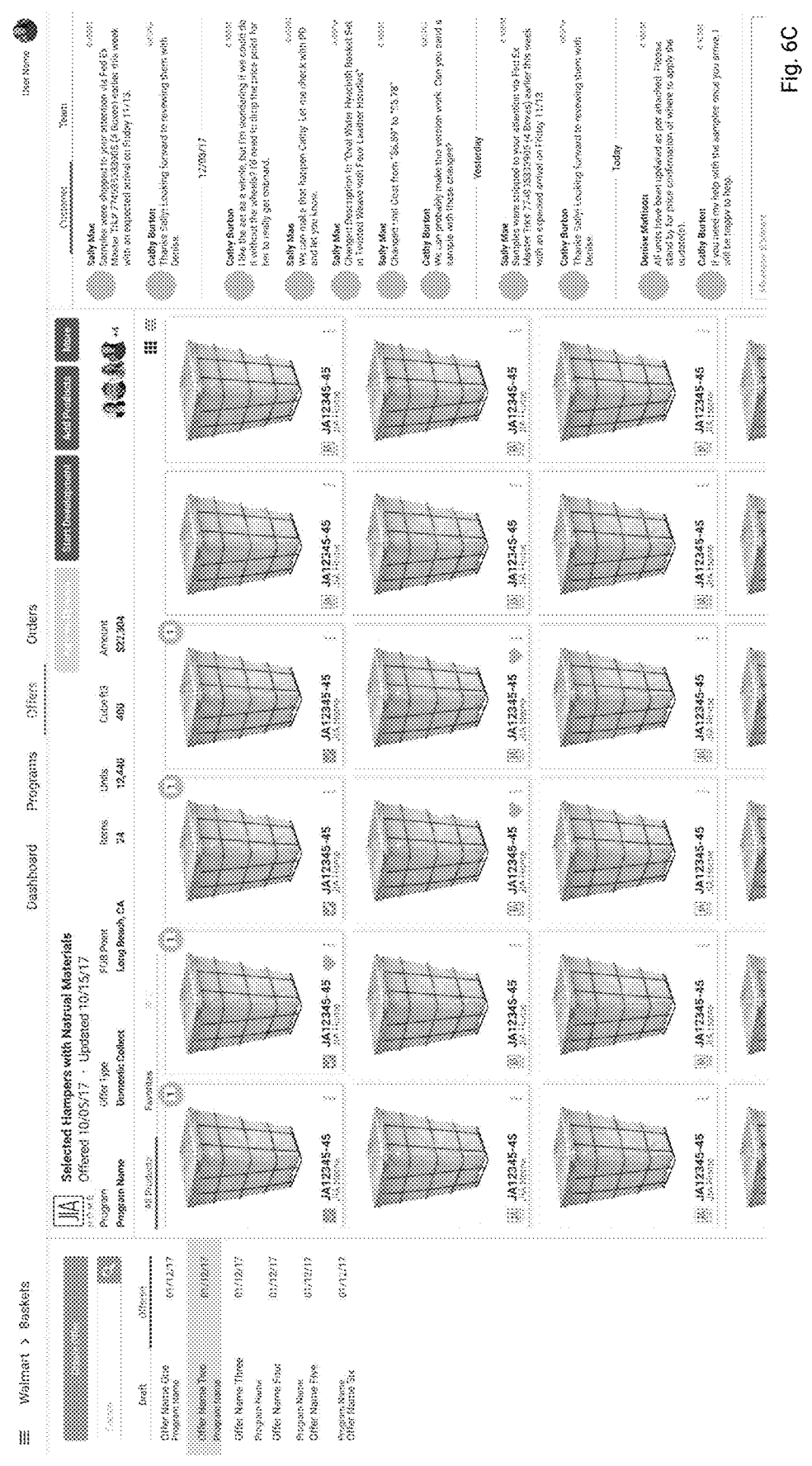
Figure 6D:
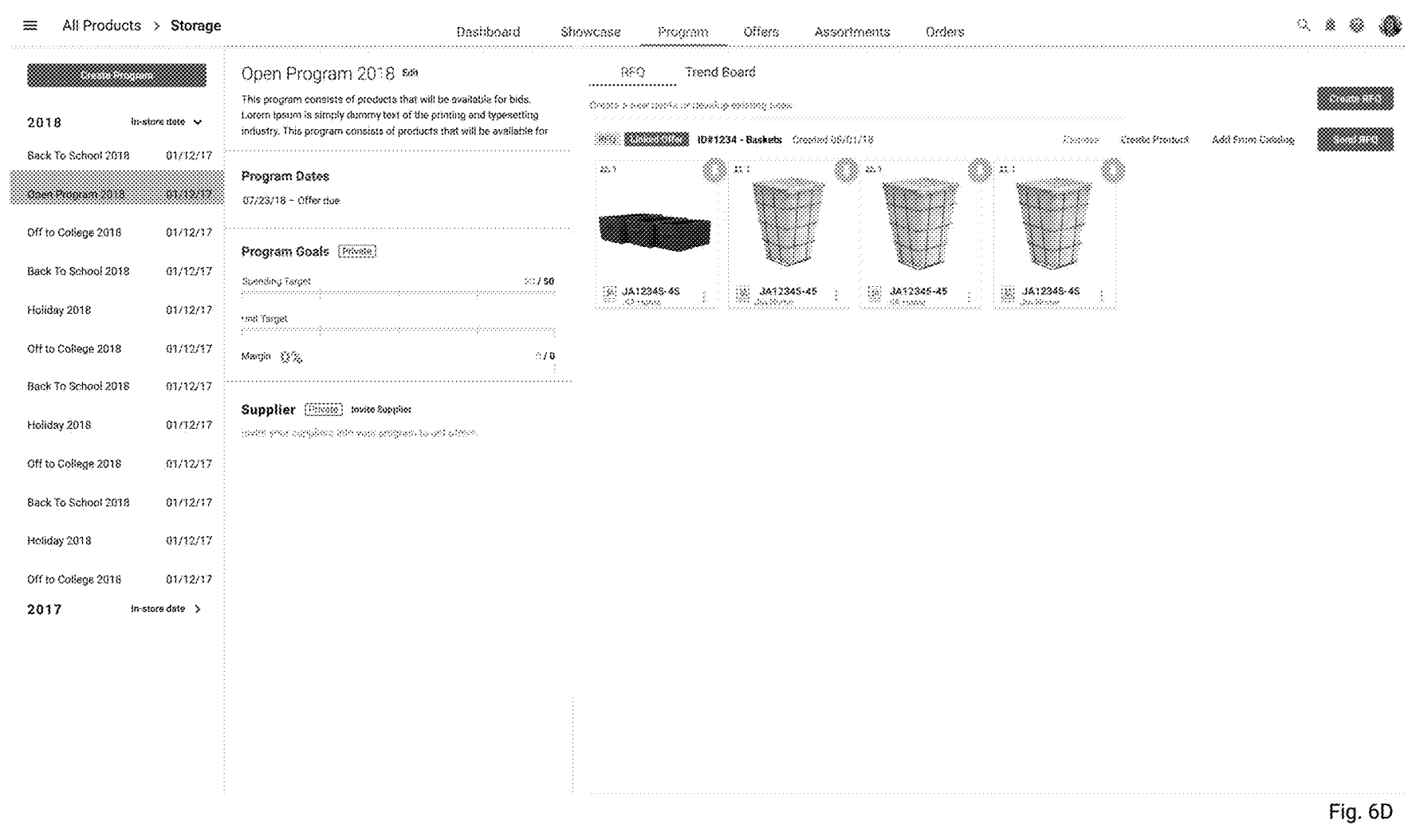

Referring to FIG. 6C, an example user interface is illustrated depicting an offer where a set of products has been selected by users on the supply side of an entity. The selected set product may be transmitted to an acquirer or to product development users within the entity to update the entity products. For example, a supply-side user selects which products are to be sent to one or more buying business unit(s) within the entity, calls out (e.g., via notes, pins, or messages) any specific information, then shares these products with one or more buying-side business units. The buying business units that receive these products can utilize them as part of an request for quote (RFQ), such as is illustrated in FIG. 6D, where the products can be easily quoted and sourced from multiple suppliers from different entities. Once the users in the acquisition-side business unit are satisfied with the updates to the products, they can select the products and send them back to the original supplier business unit within their entity for the supplier-side users to review and either accept or reject the products, using for example, the user interfaces illustrated in FIGS. 6E, 6F.

Figure 6E:
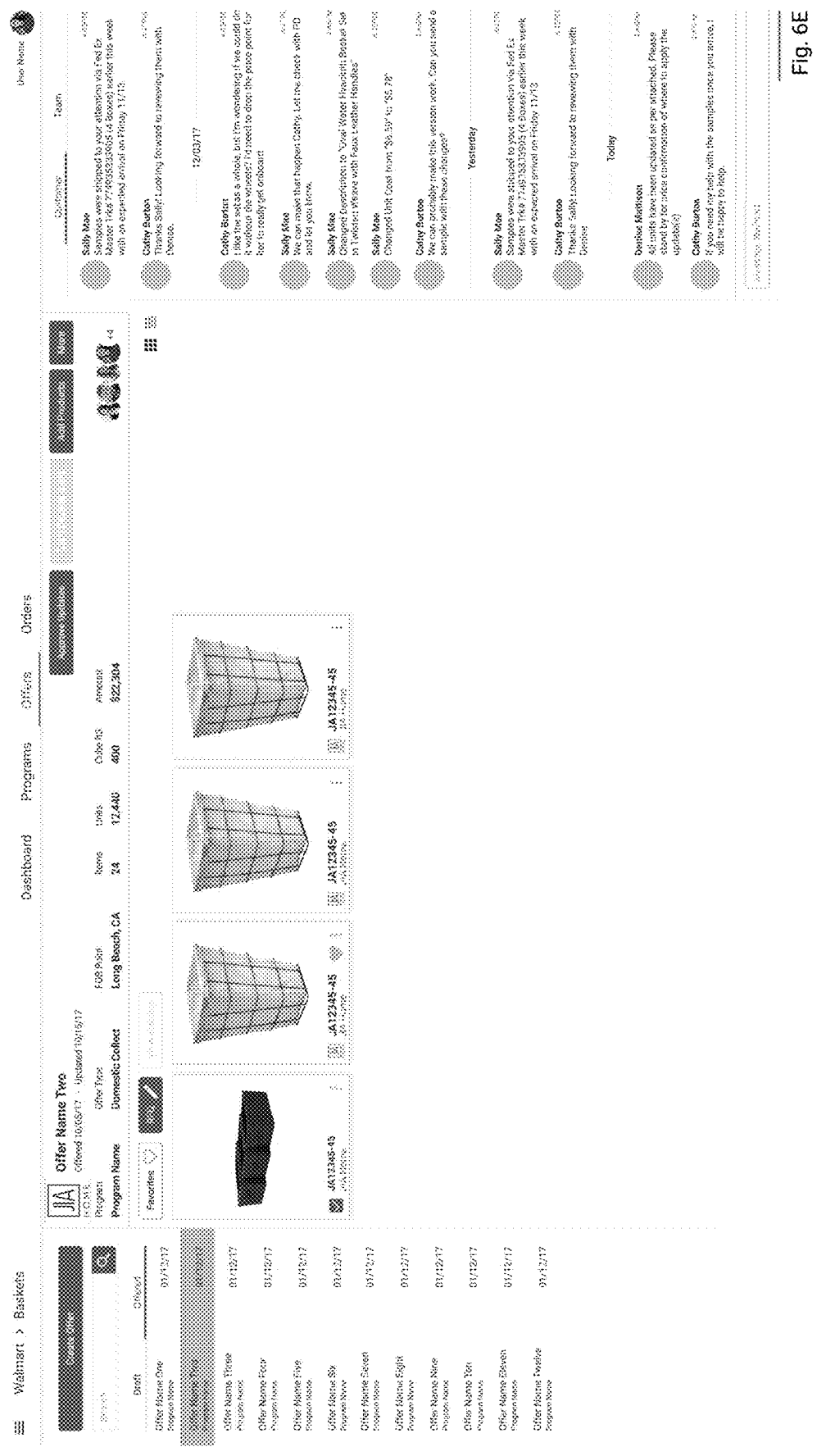

Referring to FIG. 6E, an example offer development review user interface is illustrated. The left pane includes a list of offers, including offer name, associated program name, and offer date. The middle pane depicts offer details of an offer selected by a user from the left pane. The offer details may include the offer name, associated program name, offer date, update date, offer type (e.g., domestic, imported, etc.), FOB point, number of items, number of units, cube size, total dollar amount, images of the offer product with associated product identifiers, and selection controls associated with the images that enable a user to select and/or like a given product. Controls are provided to approve product updates, start product development, and add products. A right pane enables the user to selectively communicate with the customer or the user's team.

Figure 6F:
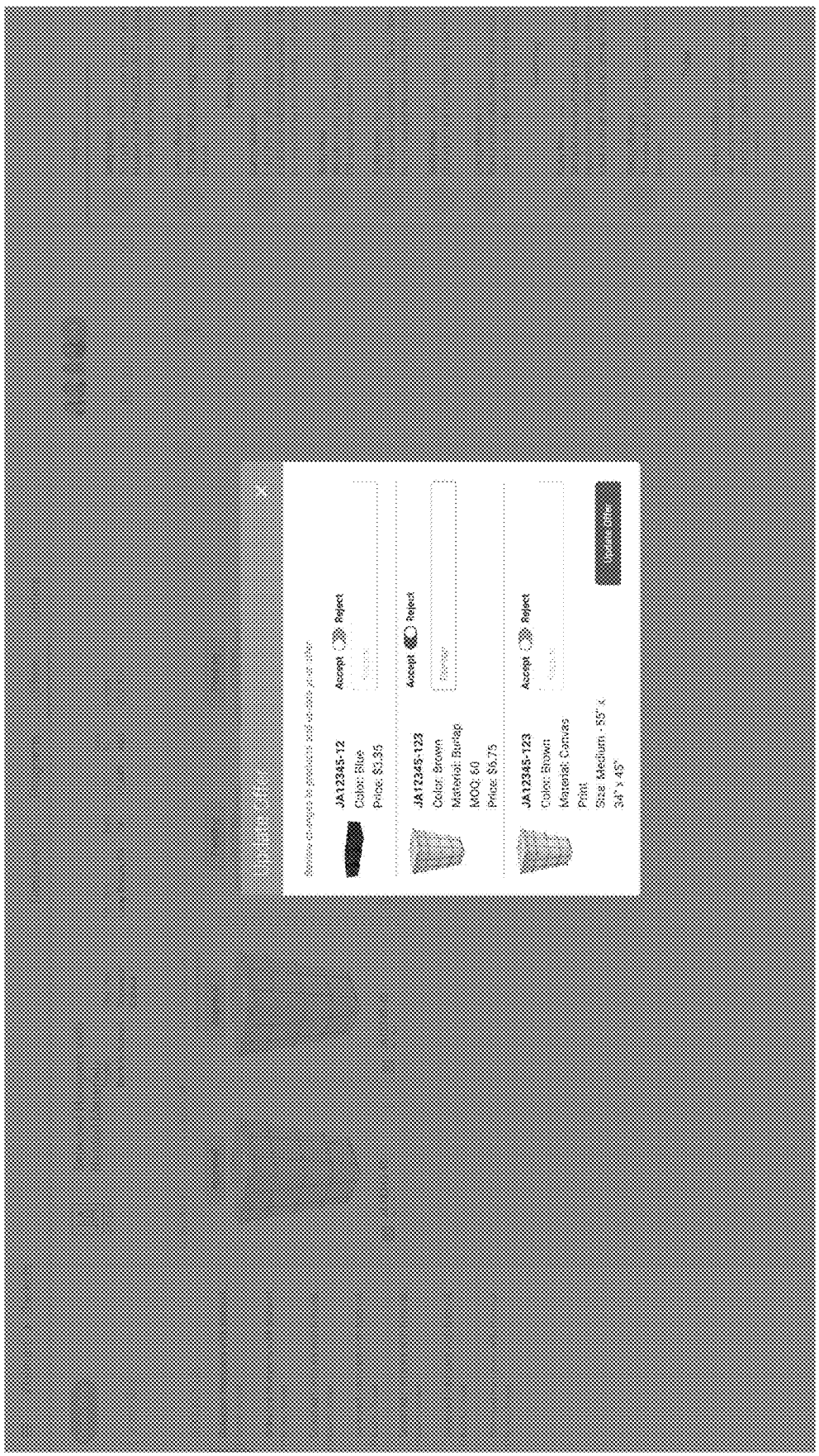

Referring to FIG. 6F, an example offer update user interface is presented via which the user may accept or reject changes to a given product via controls presented in association with product images and a list of changed product details. If the user activates a reject control, a reason field is dynamically generated and presented via which the user may enter a reason for rejection, which may then be transmitted to the product development team. An update control is provided via which the user can initiate an update to the offer.

Following are descriptions of example user interface and data fields:

| | |
|---|---|
| Duty Rate | Percentage of tax paid to import a product |
| Estimated Landed Cost | Total realized cost to either deliver or receive a product at a specified location under specified terms. First cost + Freight Cost + Duty Cost |
| First Cost | The initial price a supplier or buyer pays for a product before factoring in Freight and duty costs |
| FOB Point | The point where products transfer ownership |
| Freight Cost | Cost of freight for a specified product |
| Freight Rate | Dollar per cubic foot paid to ship a product |
| HTS | US Harmonized Tariff Schedule Code denoting how much duty a product is subject to |
| In-store Date | Date when a product is expected to be on store shelves |
| Item | Product, good |
| Duty Rate | Percentage of tax paid to import a product |
| Item Number | Unique identifier for a product in the system. Must be unique within a catalog of a single supplier company but not globally |
| Lead Time | The amount of time necessary to manufacture and ship a product, time until soonest availability |
| Margin | 1-cost of a product/price product is sold |
| MOQ | Minimum Order Quantity for which an item will be sold |
| Notification | An alert generated by the software platform |
| Notification Badge | An indicator than an object has had an alert/notification generated |
| Object First Communication | Pattern of organizing communication and artifacts such that the artifact or object is the independent variable the communication is organized by |
| Offer | A collection of products available for purchase, presented from supplier to buyer |
| Offer Due Date | Date when buyer wishes to have received all offers by for a given program |
| Offer Product | An object in the system that lives solely in the workflow between one supplier company and one retailer category |
| Offer Type | The terms of an offer shipment and pricing, (e.g., import or domestic) |
| Order | Object comprised of products to be purchased |
| Order Product Component Requirement | Information requirement necessary to complete a purchase order- associated with an order product component object |
| Order Product Duty Rate Requirement | Information requirement necessary to complete a purchase order-associated with an order product object Percentage of tax paid to import a product order-associated with an order product object |
| Order Requirement | Information requirement necessary to complete a purchase order-associated with an order object |
| Origin | Port closest to where a product is manufactured |
| Product | Good/item for purchase |
| Product Card | Image centric representation of a product, offer product, or order product |
| Product Catalog | Set of all products a supplier maintains in the system, organized by product categories |
| Product Category | Essentially folders/grouping of products within a product catalog |
| Product Component | An item that is being sold as part of a set |
| Program | An organizational tool buyers use to segment purchasing goals and purchases |
| Program Suppliers | A supplier company that has been granted access to a buyer's program |
| Restore | The action of changing a product status from dismissed to active |
| Retailer | A company type within the system, comprised of Departments and Categories |
| Retailer Admin | User type within the system- sets up company and users |
| Revision | A logged change on an object such as a product or order |
| Sales Manager | User type within the system, has full access to supplier product catalog |
| Sales Rep | User type within the system, has conditionally restricted access to supplier product catalog, and restricted access to some information such as product costs |
| Ship Window | Period of Time when transfer of products is expected |
| Size | physical dimensions of a product |
| SKU | Stock Keeping Unit, a unique item |
| Start to Ship Date | Date at the beginning of a ship window |
| Supplier | A company type within the system, comprised of products, product categories |
| Supplier Admin | User type within the system- sets up company and users |
| Supplier ID | A unique identifier for the relationship between one retailer and one supplier, unique to that retailer not necessarily globally |
| Thread | The connection between one supplier company and one retailer category |
| Total Units | Sum number of items purchased |
| Unit Price | Price at which seller agrees to sell a product to a buyer |
| UPC | Universal Product Code |

Thus, methods and systems are disclosed for facilitating communication among users at different entities. It is understood that although certain examples are described with respect to retailer and supplier collaboration, the methods and systems may be used for service collaboration, content collaboration, design collaboration, and other collaboration applications.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

User interfaces described herein are optionally presented (and user instructions may be received) via a user computing device using a browser, other network resource viewer, or otherwise. For example, the user interfaces may be presented (and user instructions received) via an application (sometimes referred to as an "app"), such as an app configured specifically for building plan-related activities, installed on the user's mobile phone, laptop, pad, desktop, television, set top box, or other terminal. Various features described or illustrated as being present in different embodiments or user interfaces may be combined into the same embodiment or user interface. While the disclosure may reference to a user hovering over, pointing at, or clicking on a particular item, other techniques may be used to detect an item of user interest. For example, the user may touch the item via a touch screen, or otherwise indicate an interest. Further, while certain interfaces may be described for selecting an item, such as a checkbox, other selection interfaces may be used, such as a link, radio button, or voice command input. Similarly, while certain references may be made to a user interface pane, the user interfaces may be utilized using other sectioning technologies (e.g., pop-up interfaces) or no sectioning technology may be used within a given user interface.

While the foregoing discussion and figures may illustrate various types of menus, other types of menus may be used. For example, menus may be provided via a drop down menu, a tool bar, a pop up menu, interactive voice response system, or otherwise.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others.

What is claimed is:

1. A communication and collaboration system, comprising:
   one or more processing devices;
   a network interface;
   non-transitory memory that stores instructions that when executed by the one or more processing devices are configured to cause the communication and collaboration system to perform operations comprising:
      enable a first entity to establish a first hierarchy of permissions comprising communication permissions with respect to users of the first entity;
      enable a second entity to establish a second hierarchy with corresponding permissions comprising communication permissions with respect to users of the second entity;
      detect a first user of the first entity accessing the communication and collaboration system, the first user at a first position in the first hierarchy;
      enable the first user to define a first collaboration object;

access the first hierarchy with corresponding permissions;
enable the first user to invite a second entity to collaborate on the first collaboration object in accordance with the first hierarchy with corresponding permissions;
in response to receiving over a network via the network interface from a first computer system of the first user an invite instruction for the second entity, the invite instructions regarding collaboration on the first collaboration object, transmit the invitation to collaborate on the first collaboration object to the second entity, the second entity associated with a second user;
receive from a second computer system of the second user an acceptance of the invitation to collaborate on the first collaboration object;
access the second hierarchy with corresponding permissions the second user at a first position in the second hierarchy;
enable the second user to collaborate on the first collaboration object in accordance with the second hierarchy with corresponding permissions;
generate a log of communications regarding the collaboration between the first user and the second user on the first collaboration object;
generate a log of communications regarding the first collaboration object between the first user and one or more other users at the first entity;
generate a log of communications regarding the first collaboration object between the second user and one or more other users at the second entity;
provide for display on the first computer system of the first user the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and
provide for display on the second computer system of the second user the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

2. The communication and collaboration system as defined in claim 1, the operations further comprising:
establish a virtual private network to communicate with the first computer system of the first user;
use a secure transfer tunnel to encrypt communications to the first computer system of the first user; and
store communications from the first computer system using file encryption in a cloud-based data store.

3. The communication and collaboration system as defined in claim 1, the operations further comprising:
generate a virtual page associated with the first collaboration object, the virtual page comprising a plurality of modules, the plurality of modules comprising:

a first module configured to access and render the log of communications regarding the collaboration between the first user and the second user;
a second module configured to access and render the log of communications regarding the first collaboration object between the first user and one or more other users at the first entity;
a third module configured to access and render the log of communications regarding the first collaboration object between the second user and one or more other users at the second entity;
cause a first user interface to be displayed by the first computer system using the first module and the second module, and excluding the third module; and
cause a second user interface to be displayed by the second computer system using the second module and the third module, and excluding the first module.

4. The communication and collaboration system as defined in claim 1, the operations further comprising:
enable a third user at the first entity to access a first set of data related to the first collaboration object, the third user at a position higher than the first user in the first hierarchy and associated with greater access rights than those granted to the first user; and
enable the first user at the first entity to access only a subset of the first set of data related to the first collaboration object.

5. The communication and collaboration system as defined in claim 1, the operations further comprising:
enable the first user to invite a plurality of respective different entities to collaborate on the first collaboration object in accordance with the first hierarchy;
receive acceptances invitations to collaborate on the first collaboration object from one or more of the plurality of entities;
receive communications from one or more of the plurality of entities;
determine which of the communications have not been responded to; and
cause a listing of the received communications to be displayed by the first computer system of the first user wherein the communications that have not been responded to are emphasized via a sort operation and/or a visual highlight.

6. The communication and collaboration system as defined in claim 1, the operations further comprising:
enable the first user to invite a plurality of respective different entities to collaborate on the first collaboration object in accordance with the first hierarchy;
receive acceptances invitations to collaborate on the first collaboration object from one or more of the plurality of entities;
receive communications from one or more of the plurality of entities, the communications including images, the images comprising still images, animations, videos, and/or emojis;
cause at least a portion of the images received from the plurality of entities to be displayed together in association with respective selection controls; and
filter the display of images based on least in part on the first user's interaction with one or more of the respective selection controls.

7. The communication and collaboration system as defined in claim 1, the operations further comprising:
receive a first communication from the second user directed to the first user, the first communication comprising chat text;

receive separate from the first communication a first image and/or first video file from the second user directed to the first user;

cause the first communication to be displayed by the first computer system of the first user in a chat pane, cause the first image and/or first video to be displayed at the same time in a second pane, and cause details regarding the collaboration object to be displayed at the same time in a third pane.

8. The communication and collaboration system as defined in claim 1, the operations further comprising:

detect that a first collaboration action is complete; and at least partly in response to detecting that the first collaboration action is complete, cause the first system and/or the second system to generate a predetermined sound, video, video, and/or emoji.

9. The communication and collaboration system as defined in claim 1, further comprising a neural network configured to identify trends with respect to at least a first item using data related to a plurality of collaboration objects, the neural network comprising an input layer, an output layer, and one or more levels of hidden layers between the input and output layers, wherein the neural network is configured as a feed forward network.

10. A communication system:

one or more processing devices;

a network interface;

non-transitory memory that stores instructions that when executed by the one or more processing devices are configured to cause the communication system to perform operations comprising:

detect a first user of a first entity accessing the communication system;

access permissions associated with the first user;

enable the first user to define a first collaboration object;

enable the first user to invite a second entity to collaborate on the first collaboration object in accordance with the permissions associated with the first user;

in response to receiving over a network via the network interface from a computer system of the first user an invite instruction for the second entity, the invite instructions regarding collaboration on the first collaboration object, transmit the invitation to collaborate on the first collaboration object to the second entity, the second entity associated with a second user;

enable the second user to collaborate on the first collaboration object in accordance permissions associated with the second user;

maintain a log of communications regarding the collaboration between the first user and the second user on the first collaboration object;

maintain a log of communications regarding the first collaboration object between the first user and one or more other users at the first entity;

maintain a log of communications regarding the first collaboration object between the second user and one or more other users at the second entity;

enable the first computer system of the first user to display the log of communications regarding the collaboration between the first user and the second user on the first collaboration object, together with the log of communications regarding the first collaboration object between the first user and one or more other users at the first entity, and excluding from display on the first computer system the log of communications regarding the first collaboration object between the second user and one or more other users at the second entity; and enable the second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

11. The communication and collaboration system as defined in claim 10, the operations further comprising:

establish a virtual private network to communicate with the first computer system of the first user;

use a secure transfer tunnel to encrypt communications to the first computer system of the first user; and store communications from the first computer system using file encryption in a cloud-based data store.

12. The communication system as defined in claim 10, the operations further comprising:

generate a virtual page associated with the first collaboration object, the virtual page comprising a plurality of modules, the plurality of modules comprising:

a first module configured to access and render the log of communications regarding the collaboration between the first user and the second user;

a second module configured to access and render the log of communications regarding the first collaboration object between the first user and one or more other users at the first entity;

a third module configured to access and render the log of communications regarding the first collaboration object between the second user and one or more other users at the second entity;

cause a first user interface to be displayed by the first computer system using the first module and the second module, and excluding the third module; and cause a second user interface to be displayed by the second computer system using the second module and the third module, and excluding the first module.

13. The communication system as defined in claim 10, the operations further comprising:

enable a third user at the first entity to access a first set of data related to the first collaboration object, the third user at a position higher than the first user in the first hierarchy and associated with greater access rights than those granted to the first user; and enable the first user at the first entity to access only a subset of the first set of data related to the first collaboration object.

14. The communication system as defined in claim 10, the operations further comprising:

enable the first user to invite a plurality of respective different entities to collaborate on the first collaboration object in accordance with the first hierarchy;

receive communications from one or more of the plurality of entities;

determine which of the communications have not been responded to; and cause a listing of the received communications to be displayed by the first computer system of the first user wherein the communications that have not been responded to are emphasized.

15. The communication system as defined in claim 10, the operations further comprising:

enable the first user to invite a plurality of respective different entities to collaborate on the first collaboration object in accordance with the first hierarchy;

receive communications from one or more of the plurality of entities, the communications including images, the images comprising still images, animations, videos, and/or emojis;

cause at least a portion of the images received from the plurality of entities to be displayed together in association with respective selection controls; and filter the display of images based on least in part on the first user's interaction with one or more of the respective selection controls.

16. The communication system as defined in claim 10, the operations further comprising:

receive a first communication from the second user directed to the first user, the first communication comprising chat text;

receive separate from the first communication a first image and/or first video file from the second user directed to the first user; and cause the first communication to be displayed by the first computer system of the first user in an chat interface and cause the first image and/or first video file to be rendered at the same time separate from the chat interface.

17. The communication system as defined in claim 10, further comprising a neural network configured to identify trends with respect to at least a first item using data related to a plurality of collaboration objects, the neural network comprising an input layer, an output layer, and one or more levels of hidden layers between the input and output layers, wherein the neural network is configured as a feed forward network.

18. The communication system as defined in claim 10, the operations further comprising:

provide for display on a system of a given entity a user interface that enables a user to select one or more other entities; and enable the given entity to broadcast at the same time a notification regarding a first item.

19. The communication system as defined in claim 10, the operations further comprising:

detect that a first collaboration action is complete; and at least partly in response to detecting that the first collaboration action is complete, cause the first system and/or the second system to emit a predetermined sound, video, video, and/or emoji.

20. The communication system as defined in claim 10, the operations further comprising:

detect that a first event has occurred;

in response to detecting that the first event has occurred, perform a synchronization of data store in a data store of the first computer system with a data store of the communication system; and in response to detecting a first conflict type while performing the synchronization, cause a first action to occur.

21. A computer-implemented method, the method comprising:

accessing permissions associated with a first user;

enabling the first user to define a first collaboration object;

enabling the first user to invite a second entity to collaborate on the first collaboration object in accordance with the permissions associated with the first user;

in response to receiving over a network via the network interface from a computer system of the first user an invite instruction for the second entity, the invite instructions regarding collaboration on the first collaboration object, causing the invitation to collaborate on the first collaboration object to be transmitted to the second entity, the second entity associated with a second user;

enabling the second user to collaborate on the first collaboration object with the first user;

maintaining a log of communications regarding the collaboration between the first user and the second user on the first collaboration object;

maintaining a log of communications regarding the first collaboration object between the first user and one or more other users at the first entity;

enabling the first computer system of the first user to display the log of communications regarding the collaboration between the first user and the second user on the first collaboration object, together with the log of communications regarding the first collaboration object between the first user and one or more other users at the first entity; and enabling the second computer system of the second user to display the log of communications regarding the collaboration between the second user and the second user on the first collaboration object, together with the log of communications regarding the first collaboration object between the second user and one or more other users at the second entity, and excluding the log of communications regarding the first collaboration object between the first user and one or more other users at the first entity.

22. The computer-implemented method as defined in claim 21, the method further comprising:

establishing a virtual private network to communicate with the first computer system of the first user;

using a secure transfer tunnel to encrypt communications to the first computer system of the first user; and storing communications from the first computer system using file encryption in a cloud-based data store.

23. The computer-implemented method as defined in claim 21, the method further comprising:

providing a control that enables the first user to cause only one of:

the log of communications regarding the collaboration between the first user and the second user, the log of communications regarding the first collaboration object between the first user and one or more other users at the first entity to be displayed.

24. The computer-implemented method as defined in claim 21, the method further comprising:

enabling a third user at the first entity to access a first set of data related to the first collaboration object, the third user at a position higher than the first user in the first hierarchy and associated with greater access rights than those granted to the first user; and enabling the first user at the first entity to access only a subset of the first set of data related to the first collaboration object.

25. The computer-implemented method as defined in claim 21, the method further comprising:

enabling the first user to invite a plurality of respective different entities to collaborate on the first collaboration object in accordance with the first hierarchy;

receiving communications from one or more of the plurality of entities;

determining which of the communications have not been responded to; and causing a listing of the received communications to be displayed by the first computer system of the first user wherein the communications that have not been viewed are emphasized.

26. The computer-implemented method as defined in claim 21, the method further comprising:
   enabling the first user to invite a plurality of respective different entities to collaborate on the first collaboration object in accordance with the first hierarchy;
   receiving communications from one or more of the plurality of entities, the communications including images, the images comprising still images, animations, videos, and/or emojis;
   causing at least a portion of the images received from the plurality of entities to be displayed together in association with respective selection controls; and
   filtering the display of images based on least in part on the first user's interaction with one or more of the respective selection controls.

27. The computer-implemented method as defined in claim 21, the method further comprising:
   receiving a first communication from the second user directed to the first user, the first communication comprising chat text;
   receiving separate from the first communication a first image from the second user directed to the first user; and
   causing the first communication to be displayed by the first computer system of the first user in a chat interface and cause the image to be displayed at the same time separate from the chat interface.

28. The computer-implemented method as defined in claim 21, the method further comprising:
   generating a virtual page associated with the first collaboration object, the virtual page comprising a plurality of modules;
   causing a first user interface to be displayed by the first computer system using a first subset of the plurality of modules; and
   cause a second user interface to be displayed by the second computer system using a second subset of the plurality of modules, the second subset of the plurality of modules partially overlapping the first subset of the plurality of modules.

* * * * *